US009955438B2

(12) United States Patent
Ghosh et al.

(10) Patent No.: US 9,955,438 B2
(45) Date of Patent: Apr. 24, 2018

(54) METHOD AND APPARATUS FOR CARRIER ALLOCATION AND MANAGEMENT IN MULTI-CARRIER COMMUNICATION SYSTEMS

(75) Inventors: Donna Ghosh, San Diego, CA (US); Rashid Ahmed Akbar Attar, San Diego, CA (US); Christopher Gerard Lott, San Diego, CA (US); Ramin Rezaiifar, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 563 days.

(21) Appl. No.: 11/528,192

(22) Filed: Sep. 26, 2006

(65) Prior Publication Data

US 2007/0070908 A1    Mar. 29, 2007

Related U.S. Application Data

(60) Provisional application No. 60/721,343, filed on Sep. 27, 2005.

(51) Int. Cl.
*G06F 15/173* (2006.01)
*H04W 52/34* (2009.01)
(Continued)

(52) U.S. Cl.
CPC ............ *H04W 52/34* (2013.01); *H04L 5/006* (2013.01); *H04L 5/0007* (2013.01);
(Continued)

(58) Field of Classification Search
CPC .................................................. H04W 52/146
(Continued)

(56) References Cited

U.S. PATENT DOCUMENTS 5,101,501 A    3/1992  Gilhousen et al.
5,832,387 A   11/1998  Bae et al.
(Continued)

FOREIGN PATENT DOCUMENTS

CN         1187930        7/1998
CN         1484806 A      3/2004
(Continued)

OTHER PUBLICATIONS

International Search Report—PCT/US06/037998—International Search Authority, European Patent Office—dated Feb. 28, 2007.
(Continued)

*Primary Examiner* — Hamza Algibhah
(74) *Attorney, Agent, or Firm* — MG-IP Law, P.C.

(57) ABSTRACT

Embodiments disclosed herein relate to carrier allocation and management in multi-carrier communication systems. In some embodiments, the number of carriers assigned to an access terminal on a forward link may be determined by an access network, and the number of carriers assigned to the access terminal on a reverse link may be based on a cooperative process between the access terminal and the access network. In other embodiments, the number of carriers assigned to the access terminal on the reverse link may also be determined by the access network, e.g., in relation to the scheduling information received from the access terminal.

94 Claims, 31 Drawing Sheets

(51) Int. Cl.
*H04W 28/18* (2009.01)
*H04L 5/00* (2006.01)

(52) U.S. Cl.
CPC .......... *H04L 5/0046* (2013.01); *H04L 5/0094* (2013.01); *H04W 28/18* (2013.01); *H04L 5/0005* (2013.01)

(58) Field of Classification Search
USPC ....................................................... 709/225
See application file for complete search history.

(56) References Cited

U.S. PATENT DOCUMENTS

| | | | |
|---|---|---|---|
| 5,923,650 A * | 7/1999 | Chen et al. ................... 370/331 |
| 6,061,568 A | 5/2000 | Dent |
| 6,223,206 B1 | 4/2001 | Dan et al. |
| 6,236,864 B1 | 5/2001 | McGowan et al. |
| 6,418,148 B1 | 7/2002 | Kumar et al. |
| 6,477,388 B1 | 11/2002 | Schmutz |
| 6,510,133 B1 * | 1/2003 | Uesugi ......................... 370/208 |
| 6,563,806 B1 | 5/2003 | Yano et al. |
| 6,741,862 B2 * | 5/2004 | Chung et al. ............... 455/452.1 |
| 6,751,187 B2 | 6/2004 | Walton et al. |
| 6,751,444 B1 * | 6/2004 | Meiyappan ..................... 455/69 |
| 6,845,246 B1 | 1/2005 | Steer |
| 6,952,411 B2 | 10/2005 | Sinnarajah et al. |
| 6,970,437 B2 | 11/2005 | Lott et al. |
| 7,058,400 B2 * | 6/2006 | Brooks ................ H04W 28/22 370/333 |
| 7,126,913 B1 | 10/2006 | Patel et al. |
| 7,260,415 B1 * | 8/2007 | Oh ..................... H04W 52/283 455/404.2 |
| 7,289,832 B1 * | 10/2007 | Enoki .................... H04W 60/02 455/343.1 |
| 7,292,825 B2 | 11/2007 | Beale et al. |
| 7,302,265 B1 * | 11/2007 | Chalishazar .......... H04W 72/02 370/328 |
| 7,418,055 B2 | 8/2008 | Wenzel et al. |
| 7,522,846 B1 * | 4/2009 | Lewis et al. ................... 398/197 |
| 7,787,519 B2 | 8/2010 | Suwa et al. |
| 2001/0012785 A1 * | 8/2001 | Esteves et al. ............... 455/522 |
| 2001/0041570 A1 * | 11/2001 | Kim ..................... H04W 36/32 455/437 |
| 2001/0052012 A1 | 12/2001 | Rinne et al. |
| 2002/0048334 A1 * | 4/2002 | Hasegawa ..................... 375/360 |
| 2002/0082021 A1 * | 6/2002 | Chen et al. ................... 455/450 |
| 2002/0089952 A1 | 7/2002 | Cao et al. |
| 2002/0142773 A1 * | 10/2002 | Rudrapatna et al. ......... 455/440 |
| 2002/0181436 A1 * | 12/2002 | Mueckenheim ...... H04L 1/1812 370/349 |
| 2003/0086397 A1 * | 5/2003 | Chen ............................. 370/335 |
| 2003/0125069 A1 * | 7/2003 | Lee .............................. 455/522 |
| 2003/0137955 A1 * | 7/2003 | Kim .................... H04L 1/0029 370/332 |
| 2003/0193906 A1 * | 10/2003 | Andrews ............ H04L 12/5693 370/329 |
| 2003/0232621 A1 * | 12/2003 | Brooks ......................... 455/424 |
| 2004/0038697 A1 * | 2/2004 | Attar ..................... H04W 52/12 455/522 |
| 2004/0042460 A1 * | 3/2004 | Gruhl et al. ................ 370/395.4 |
| 2004/0058646 A1 * | 3/2004 | Courtney et al. ............. 455/12.1 |
| 2004/0062206 A1 * | 4/2004 | Soong ..................... H04L 47/30 370/252 |
| 2004/0066772 A1 * | 4/2004 | Moon et al. ................... 370/342 |
| 2004/0090948 A1 * | 5/2004 | Forssell et al. ............... 370/349 |
| 2004/0102202 A1 * | 5/2004 | Kumaran ............... H04W 28/14 455/515 |
| 2004/0106413 A1 * | 6/2004 | Sambin ................ G01S 5/0036 455/456.1 |
| 2004/0109424 A1 * | 6/2004 | Chheda ......................... 370/331 |
| 2004/0120347 A1 * | 6/2004 | Lee ....................... H04J 3/1682 370/468 |
| 2004/0125768 A1 * | 7/2004 | Yoon ..................... H04L 5/026 370/331 |
| 2004/0141466 A1 * | 7/2004 | Kim ..................... H04B 17/336 370/252 |
| 2004/0162097 A1 * | 8/2004 | Vijayan et al. ............... 455/522 |
| 2004/0203857 A1 * | 10/2004 | Wang ........................ 455/456.1 |
| 2004/0203991 A1 * | 10/2004 | Chen ..................... H04B 7/022 455/522 |
| 2004/0208138 A1 | 10/2004 | Hayashi et al. |
| 2004/0242231 A1 | 12/2004 | Tang et al. |
| 2005/0025039 A1 | 2/2005 | Hwang et al. |
| 2005/0037766 A1 * | 2/2005 | Hans et al. ................... 455/450 |
| 2005/0037775 A1 * | 2/2005 | Moeglein ............. G01S 5/0036 455/456.1 |
| 2005/0047259 A1 * | 3/2005 | Ahn et al. ..................... 365/232 |
| 2005/0054359 A1 | 3/2005 | Ishii et al. |
| 2005/0099937 A1 * | 5/2005 | Oh ............................ H04L 1/06 370/207 |
| 2005/0135247 A1 | 6/2005 | Scott |
| 2005/0157678 A1 * | 7/2005 | Mantha et al. ................ 370/329 |
| 2005/0232156 A1 * | 10/2005 | Kim ..................... H04L 1/0029 370/236 |
| 2005/0249138 A1 * | 11/2005 | Heo et al. ..................... 370/311 |
| 2005/0255892 A1 * | 11/2005 | Wong et al. ................ 455/562.1 |
| 2005/0277422 A1 * | 12/2005 | Baker et al. .................. 455/450 |
| 2005/0288027 A1 * | 12/2005 | Cho ..................... H04W 36/18 455/442 |
| 2006/0003775 A1 * | 1/2006 | Bull ..................... G01S 5/0205 455/456.1 |
| 2006/0007883 A1 * | 1/2006 | Tong et al. .................... 370/328 |
| 2006/0007886 A1 * | 1/2006 | Lee et al. ....................... 370/329 |
| 2006/0007887 A1 * | 1/2006 | Kwon .................... H04L 1/1867 370/329 |
| 2006/0009224 A1 * | 1/2006 | Lim ..................... H04W 28/26 455/442 |
| 2006/0014543 A1 * | 1/2006 | Drakos ......................... 455/450 |
| 2006/0050625 A1 * | 3/2006 | Krasner ......................... 370/208 |
| 2006/0067258 A1 * | 3/2006 | Golestani et al. ............. 370/310 |
| 2006/0120322 A1 * | 6/2006 | Lindskog ................ H04W 72/06 370/329 |
| 2006/0142051 A1 * | 6/2006 | Purnadi et al. ............. 455/552.1 |
| 2006/0146867 A1 * | 7/2006 | Lee ..................... H04L 1/0618 370/465 |
| 2006/0153110 A1 * | 7/2006 | Morgan et al. ............... 370/310 |
| 2006/0154684 A1 * | 7/2006 | Meiyappan ........... H04L 5/0037 455/522 |
| 2006/0165091 A1 * | 7/2006 | Arima ...................... H04B 7/26 370/395.21 |
| 2006/0203724 A1 | 9/2006 | Ghosh et al. |
| 2006/0203779 A1 * | 9/2006 | Attar ..................... H04W 28/18 370/335 |
| 2006/0250935 A1 * | 11/2006 | Hamamoto ........... H04L 5/0032 370/203 |
| 2006/0258357 A1 * | 11/2006 | Bi ...................... H04W 36/0055 455/437 |
| 2006/0268764 A1 * | 11/2006 | Harris .................. H04W 72/0486 370/328 |
| 2006/0274839 A1 * | 12/2006 | Fukuta ................... H04L 5/0007 375/260 |
| 2007/0004420 A1 * | 1/2007 | Reudink ........................ 455/450 |
| 2007/0060179 A1 * | 3/2007 | Yamauchi et al. ............ 455/509 |
| 2007/0121542 A1 * | 5/2007 | Lohr et al. .................... 370/329 |
| 2007/0259668 A1 * | 11/2007 | Legg ............................ 455/450 |
| 2007/0274335 A1 * | 11/2007 | Miyata et al. ................ 370/458 |
| 2008/0009244 A1 * | 1/2008 | Lee ................................ 455/69 |
| 2008/0032725 A1 * | 2/2008 | Usuda et al. .................. 455/509 |
| 2008/0045226 A1 * | 2/2008 | Liu ............................... 455/450 |
| 2008/0102873 A1 * | 5/2008 | Kumar .......................... 455/522 |
| 2008/0159202 A1 * | 7/2008 | Hang .................... H04W 56/001 370/324 |
| 2008/0238764 A1 * | 10/2008 | Han ......................... G01S 5/145 342/357.29 |
| 2008/0287138 A1 * | 11/2008 | Yoon et al. ................. 455/452.2 |
| 2009/0016278 A1 * | 1/2009 | Wakabayashi ................ 370/329 |

FOREIGN PATENT DOCUMENTS

| | | |
|---|---|---|
| CN | 1484906 | 3/2004 |
| CN | 1516942 A | 7/2004 |

(56) References Cited

FOREIGN PATENT DOCUMENTS

| | | |
|---|---|---|
| EP | 0882377 A1 | 12/1998 |
| EP | 1192732 A2 | 4/2002 |
| JP | 865731 | 3/1996 |
| JP | 9224276 A | 8/1997 |
| JP | 1023517 | 1/1998 |
| JP | 10191431 A | 7/1998 |
| JP | 2001521699 A | 11/2001 |
| JP | 2006523075 | 10/2006 |
| JP | 2007535201 | 11/2007 |
| JP | 2008533833 | 8/2008 |
| RU | 2205510 | 5/2003 |
| WO | 1997001256 A1 | 1/1997 |
| WO | 9830057 A1 | 7/1998 |
| WO | WO0052951 A1 | 9/2000 |
| WO | 0249305 A2 | 6/2002 |
| WO | WO-2003017621 | 2/2003 |
| WO | 2004075444 A2 | 9/2004 |
| WO | 2005015769 A2 | 2/2005 |
| WO | WO 2005/015769 A2 | 2/2005 |
| WO | WO05018181 | 2/2005 |
| WO | WO2005020475 A1 | 3/2005 |
| WO | WO-2007014037 A2 | 2/2007 |

OTHER PUBLICATIONS

Written Opinion—PCT/US06/037998—International Search Authority, European Patent Office—dated Feb. 28, 2007.
International Preliminary Report on Patentability—PCT/US06/037998—The International Bureau of WIPO, Geneva, Switzerland—dated Apr. 1, 2008.
Taiwanese Search Report—TW095135848—TIPO—dated Jan. 20, 2010.
Chan.Y.T. et al.,"Linear and approximate maximum likelihood localization from TOA measurements", IEEE Seventh International Symposium on Signal Processing and Its Applications, 2003 Proceedings, Jul. 1-4, 2003, vol. 2, pp. 295-298.
European Search Report—EP10177448—Search Authority—Munich—dated Mar. 25, 2014.

\* cited by examiner

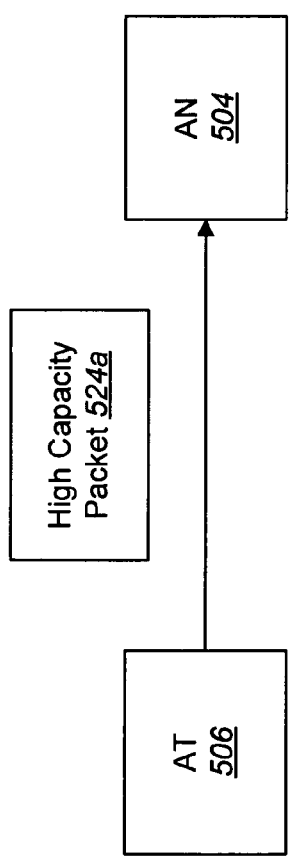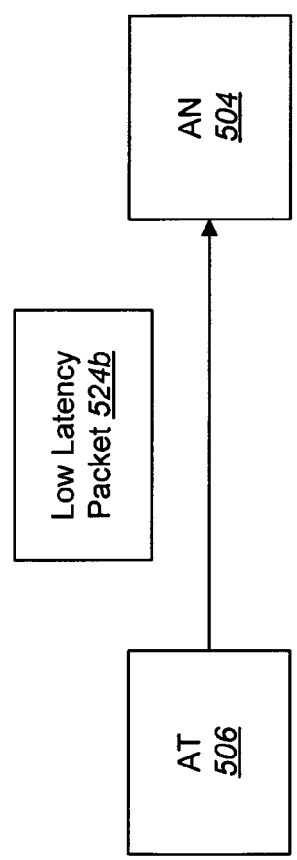

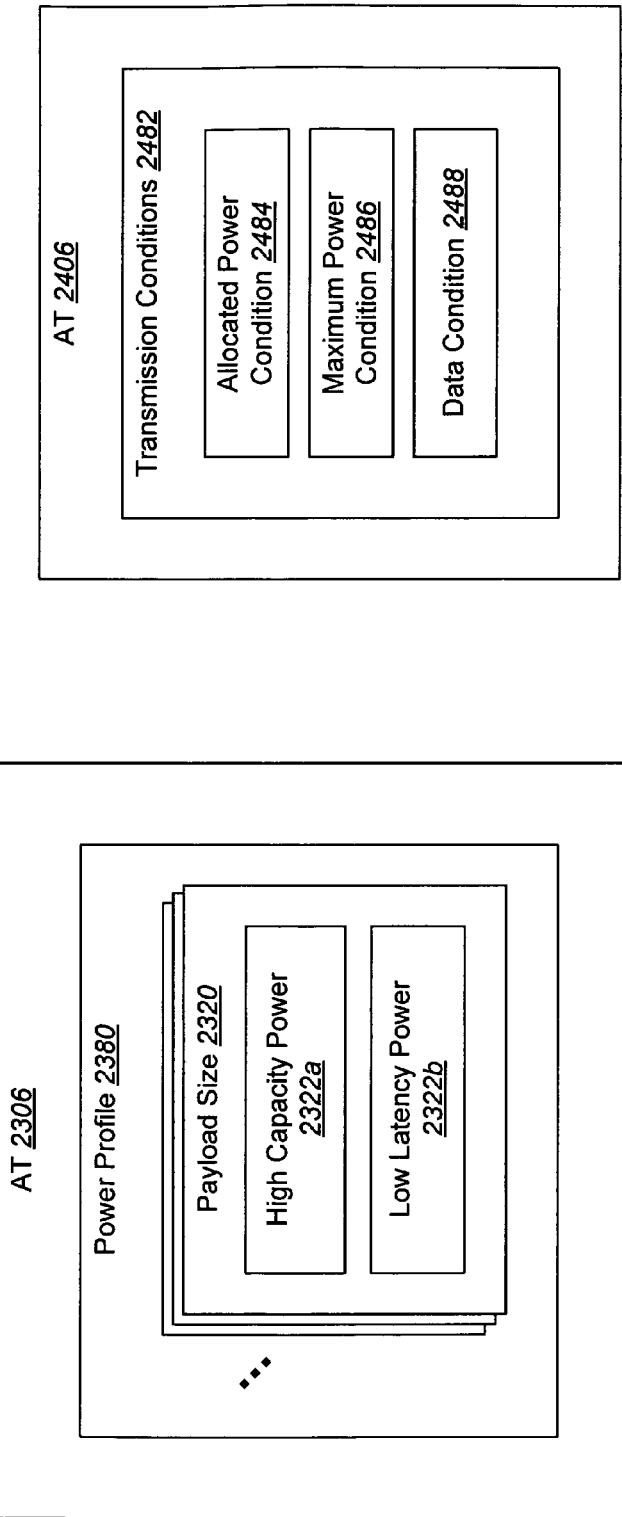

METHOD AND APPARATUS FOR CARRIER ALLOCATION AND MANAGEMENT IN MULTI-CARRIER COMMUNICATION SYSTEMS

CLAIM OF PRIORITY UNDER 35 U.S.C. § 119

This Application for Patent claims priority to Provisional Patent Application No. 60/721,343, entitled "Location-based Carrier Allocation in a Multi-carrier Wireless Communication System," filed on Sep. 27, 2005, which is assigned to the Assignee hereof and hereby expressly incorporated by reference herein.

CROSS REFERENCE TO RELATED APPLICATIONS

This Application for Patent is related to U.S. patent application Ser. No. 11/371,274, filed on Mar. 7, 2006, entitled "Multi-carrier, Multi-flow, Reverse Link Medium Access Control For a Communication System," which claims priority under 35 U.S.C. § 119 to Provisional Patent Application No. 60/659,989, filed on Mar. 8, 2005, entitled "Multi-carrier, Multi-flow Reverse Link Medium Access Control For a Communication System."

BACKGROUND

Field

This disclosure relates generally to wireless communications systems. More specifically, embodiments disclosed herein relate to carrier allocation and management in multi-carrier communication systems.

Background

Communication systems have been developed to allow transmission of information signals from an origination station to a physically distinct destination station. In transmitting information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, e.g., simultaneous transmission and/or reception, of several signals over a common communication channel. For example, multiple-access communication systems may include a plurality of remote subscriber units (or access terminals) requiring intermittent service rather than continuous access to the common communication channel. Multiple access techniques may include code division multiple-access (CDMA), time division multiple-access (TDMA), frequency division multiple-access (FDMA), orthogonal frequency division multiple-access (OFDMA), and other multiple-access techniques.

A multiple-access communication system may be a wireless and/or wire-line, and may carry voice, data, etc. A communication system may be designed to implement one or more standards.

As the demand for multimedia services and high-rate data rapidly grow, multi-carrier modulation has been proposed in wireless communication systems. There lies a challenge to provide efficient and robust multi-carrier communication systems.

BRIEF DESCRIPTION OF THE DRAWINGS

FIG. 5A is a block diagram illustrating a high capacity packet being transmitted to the access network;

FIG. 5B is a block diagram illustrating a low latency packet being transmitted to the access network;

FIG. 23 is a block diagram illustrating a power profile that may be stored at the access terminal;

FIG. 24 is a block diagram illustrating a plurality of transmission conditions that may be stored at the access terminal;

DETAILED DESCRIPTION

Embodiments disclosed herein relate to method and apparatus for carrier allocation and management in communication systems.

An access point (AP) disclosed herein may include and/or implement functions of a base-station transceiver system (BTS), an access network transceiver (ANT), a modem pool transceiver (MPT), or a Node B (e.g., in a W-CDMA type system), etc. A cell may refer to a coverage area serviced by an AP. A cell may further include one or more sectors. For simplicity and clarity, the term "sector" may be used herein to refer a cell, or a section of a cell, serviced by an AP. Further, an access network controller (ANC) may refer to the portion of a communication system configured to interface with a core network (e.g., a packet data network) and route data packets between access terminals (ATs) and the core network, perform various radio access and link maintenance functions (such as soft handoff), control radio transmitters and receivers, and so on. An ANC may include and/or implement the functions of a base station controller (BSC), such as found in a $2^{nd}$, $3^{rd}$, or $4^{th}$ generation wireless network. An ANC and one or more APs may constitute part of an access network (AN).

An access terminal (AT) described herein may refer to various types of devices, including (but not limited to) a wireless phone, a cellular phone, a laptop computer, a multimedia wireless device, a wireless communication personal computer (PC) card, a personal digital assistant (PDA), an external or internal modem, etc. An AT may be any data device that communicates through a wireless channel and/or through a wired channel (e.g., by way of fiber optic or coaxial cables). An AT may have various names, such as access unit, access node, subscriber unit, mobile station, mobile device, mobile unit, mobile phone, mobile, remote station, remote terminal, remote unit, user device, user equipment, handheld device, etc. Different ATs may be incorporated into a system. ATs may be mobile or stationary, and may be dispersed throughout a communication system. An AT may communicate with one or more APs on a forward link and/or a reverse link at a given moment. The forward link (or downlink) refers to transmission from an AP to an AT. The reverse link (or uplink) refers to transmission from the AT to the AP.

Figure 1:
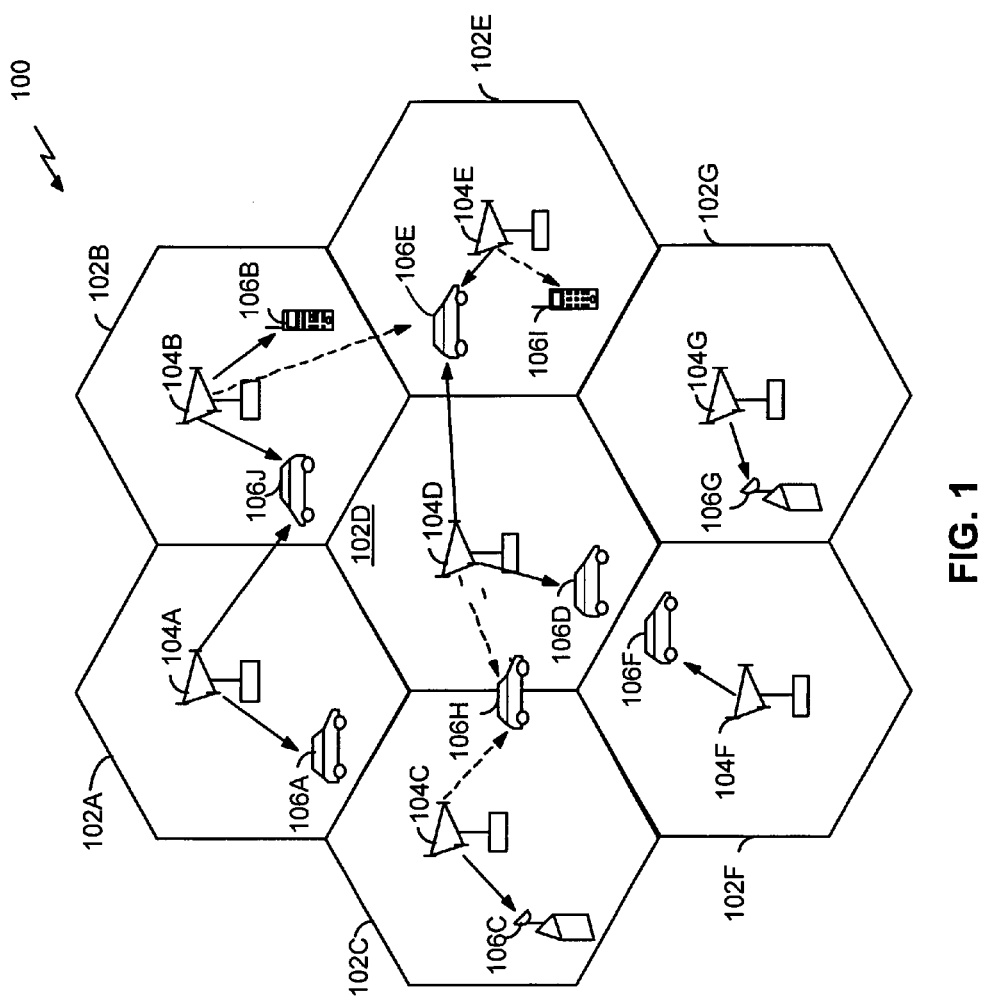
FIG. 1 illustrates an example of a communications system that supports a number of users and is capable of implementing at least some aspects of the embodiments discussed herein.

FIG. 1 illustrates a wireless communication system 100 configured to support a number of users, in which various disclosed embodiments and aspects may be implemented, as further described below. By way of example, system 100 provides communication for a number of cells 102, including cells 102A-102G, with each cell being serviced by a corresponding AP 104 (such as APs 104A-104G). Each cell may be further divided into one or more sectors. Various ATs 106, including ATs 106A-106K, are dispersed throughout the system. Each AT 106 may communicate with one or more APs 104 on a forward link and/or a reverse link at a given moment, depending upon whether the AT is active and whether it is in soft handoff, for example.

By way of example in FIG. 1, a solid line with an arrow may indicate information (e.g., data) transmission from an AP to an AT. A broken line with an arrow may indicate that the AT is receiving the pilot and other signaling/reference signals (but not data transmission) from the AP. For clarity and simplicity, the reverse link communication is not explicitly shown in FIG. 1.

APs 104 may each be equipped with one or more receive antennas, and one or more transmit antennas. There may be any combination of transmit antennas and receive antennas at AP 104. Similarly, each AT 106 may be equipped with one or more receive and transmit antennas, or a combination thereof.

System 100 may be configured to support one or more standards, e.g., IS-95, cdma2000, IS-856, W-CDMA, TD-SCDMA, IEEE 802.11a, 802.11g, 802.11n, 802.16e, 802.20, other standards, or a combination thereof. In an embodiment, for example, system 100 may be a high rate packet data (HRPD) system, such as specified in "cdma2000 High Rate Packet Data Air Interface Specification," 3GPP2 C.S0024-B, Version 1, May 2006 (also referred to as a "1×EV-DO" or "IS-856" type system). Further, a variety of algorithms and methods may be used to schedule transmissions and facilitate communications in system 100. Further described below are the details of these algorithms and methods used in 1×EV-DO system.

Figure 2:
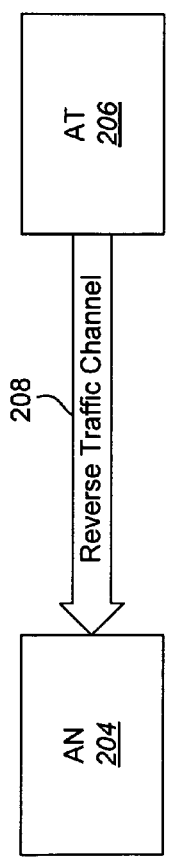
FIG. 2 is a block diagram illustrating an access network and an access terminal in a high data rate communication system.

FIG. 2 illustrates an embodiment of AN 204 and AT 206 in a communication system. By way of example, AT 206 may be in wireless communication with AN 204, e.g., on a reverse link including a reverse traffic channel 208. The reverse traffic channel 208 is the portion of the reverse channel that carries information from AT 206 to AN 204. The reverse channel may include other channels in addition to the reverse traffic channel 208. Further, AT 206 may be in wireless communication with AN 204 on a forward link including a plurality of channels (e.g., pilot, traffic, and other channels), which is not explicitly shown in FIG. 2.

Figure 3:
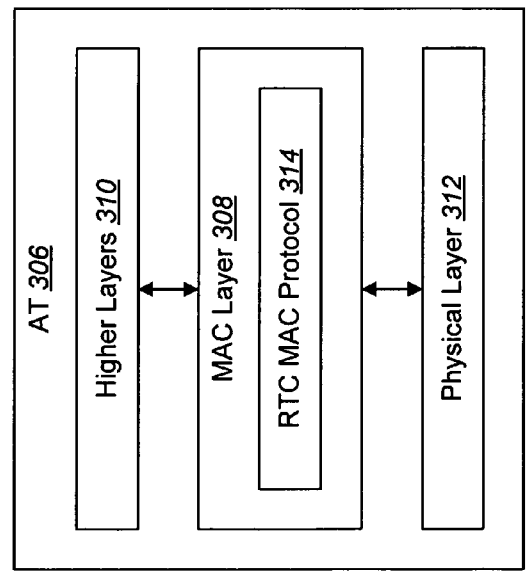
FIG. 3 is a block diagram illustrating a stack of layers on an access terminal.

Functionality performed by the AT 206 may be organized as a stack of layers. FIG. 3 illustrates a stack of layers on the AT 306. Among the layers is a medium access control (MAC) layer 308. Higher layers 310 are located above the MAC layer 308. The MAC layer 308 offers certain services to the higher layers 310, including services that are related to the operation of the reverse traffic channel 208. The MAC layer 308 includes an implementation of the reverse traffic channel (RTC) MAC protocol 314. The RTC MAC protocol 314 provides the procedures followed by the AT 306 to transmit, and by the AN 204 to receive, the reverse traffic channel 208.

A physical layer 312 is located below the MAC layer 308. The MAC layer 308 requests certain services from the physical layer 312. These services are related to the physical transmission of packets to the AN 204.

Figure 4:
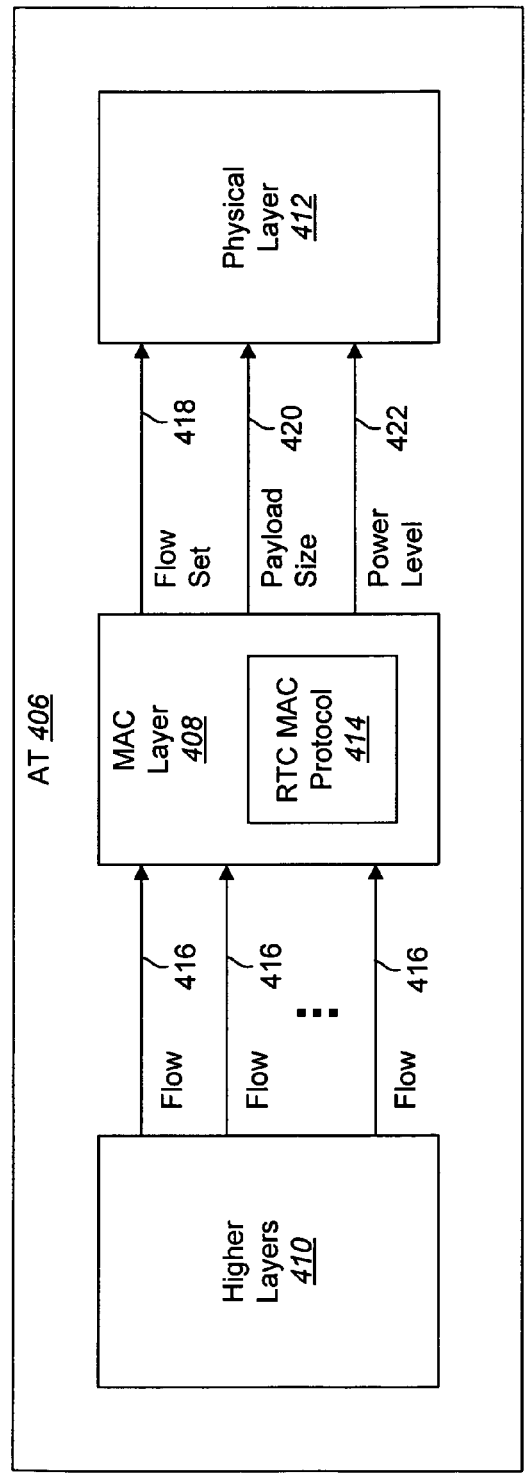
FIG. 4 is a block diagram illustrating exemplary interaction between higher layers on an access terminal, the medium access control layer, and the physical layer.

FIG. 4 illustrates exemplary interaction between the higher layers 410 on the AT 406, the MAC layer 408, and the physical layer 412. As shown, the MAC layer 408 receives one or more flows 416 from the higher layers 410. A flow 416 is a stream of data from a user source, with predetermined transmission requirements (e.g., associated with particular applications). For example, a flow 416 corresponds to a specific application, such as voice over IP (VoIP), video-telephony, file transfer protocol (FTP), gaming, etc.

Data from the flows 416 on the AT 406 is transmitted to the AN 204 in packets. In accordance with the RTC MAC protocol 414, the MAC layer determines a flow set 418 for each packet. Sometimes multiple flows 416 on the AT 406 have data to transmit at the same time. A packet may include data from more than one flow 416. However, sometimes there may be one or more flows 416 on the AT 406 that have data to transmit, but that are not included in a packet. The flow set 418 of a packet indicates the flows 416 on the AT 406 that are to be included in that packet. Exemplary methods for determining the flow set 418 of a packet will be described below.

The MAC layer 408 also determines the payload size 420 of each packet. The payload size 420 of a packet indicates how much data from the flow set 418 is included in the packet.

The MAC layer 408 also determines the power level 422 of the packet. In some embodiments, the power level 422 of the packet is determined relative to the power level of the reverse pilot channel.

For each packet that is transmitted to the AN 204, the MAC layer 408 communicates the flow set 418 to be included in the packet, the payload size 420 of the packet, and the power level 422 of the packet to the physical layer 412. The physical layer 412 then effects transmission of the packet to the AN 204 in accordance with the information provided by the MAC layer 408.

FIGS. 5A and 5B illustrate packets 524 being transmitted from the AT 506 to the AN 504. A packet 524 may be transmitted in one of several possible transmission modes (TM). For example, in some embodiments there are two possible transmission modes, a high capacity transmission mode and a low latency transmission mode. FIG. 5A illustrates a high capacity packet 524*a* (i.e., a packet 524*a* that is transmitted in high capacity mode) being transmitted to the AN 504. FIG. 5B illustrates a low latency packet 524*b* (i.e., a packet 524*b* that is transmitted in low latency mode) being transmitted to the AN 504.

Data from delay-sensitive flows (LoLat flows) may be sent using the low latency (LoLat) transmission mode. Data from delay-tolerant flows (HiCap flows) may be sent using the high capacity (HiCap) transmission mode. A low latency packet 524*b* is transmitted at a higher power level 422 than a high capacity packet 524*a* of the same packet size. Therefore, it is probable that a low latency packet 524*b* will arrive more quickly at the AN 504 than a high capacity packet 524*a*. However, a low latency packet 524*b* causes more loading on the system 100 than a high capacity packet 524*a*.

Figure 6:
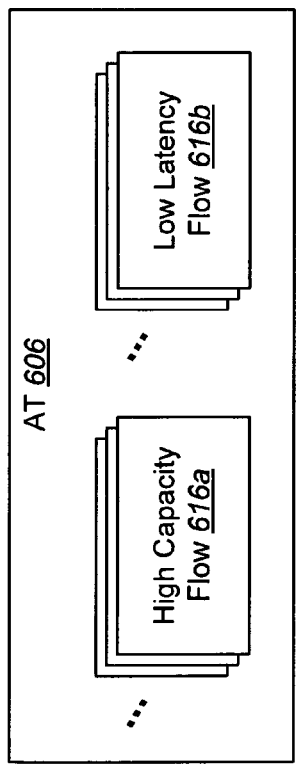
FIG. 6 is a block diagram illustrating different types of flows that may exist on an access network.

FIG. 6 illustrates different types of flows 616 that may exist on an AT 606. In some embodiments, each flow 616 on an AT 606 is associated with a particular transmission mode. Where the possible transmission modes are a high capacity transmission mode and a low latency transmission mode, an AT 606 may include one or more high capacity flows 616*a* and/or one or more low latency flows 616*b*. It is preferable for a high capacity flow 616*a* to be transmitted in a high capacity packet 524*a*. It is preferable for a low latency flow 616*b* to be transmitted in a low latency packet 524*b*.

Figure 7:
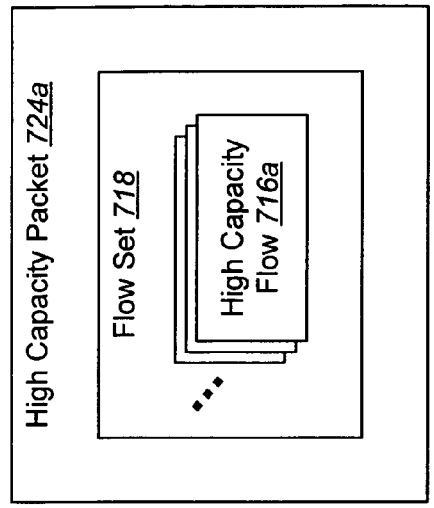
FIG. 7 is a block diagram illustrating an exemplary flow set for a high capacity packet.

FIG. 7 illustrates an example of flow set 718 for a high capacity packet 724*a*. In some embodiments, a packet 724*a* is transmitted in high capacity mode only if all of the flows 716 that have data to transmit are high capacity flows 716*a*. Accordingly, in such embodiments, the flow set 718 in a high capacity packet 724*a* only includes high capacity flows 716*a*. Alternatively, low latency flows 616*b* may be included in high capacity packets 724*a*, at the discretion of the AT 606. One exemplary reason to do this is when the low latency flow 616*b* is not getting enough throughput. For example, it might be detected that the queue of the low latency flow 616*b* is building up. The flow may improve its throughput by using high capacity mode instead, at the expense of increased latency.

Figure 8:
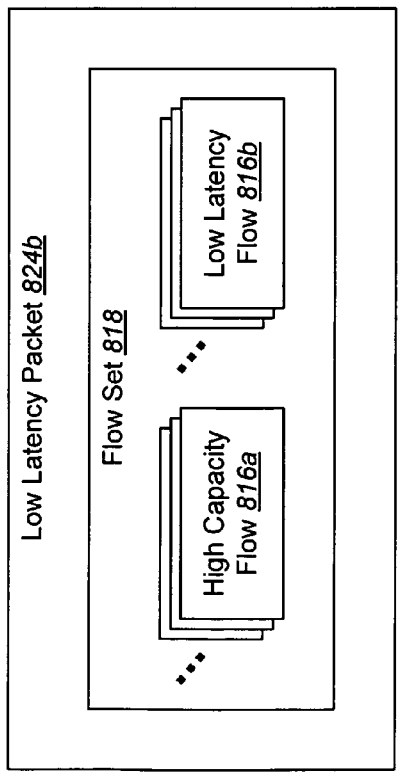
FIG. 8 is a block diagram illustrating an exemplary flow set for a low latency packet.

FIG. 8 illustrates an exemplary flow set 818 for a low latency packet 824*b*. In some embodiments, if there is at least one low latency flow 816*b* that has data to transmit, then the packet 824*b* is transmitted in low latency mode. The flow set 818 in a low latency packet 824*b* includes each low latency flow 816*b* that has data to transmit. One or more of the high capacity flows 816*a* that have data to transmit may also be included in the flow set 818. However, one or more of the high capacity flows 816*a* that have data to transmit may not be included in the flow set 818.

Figure 9:
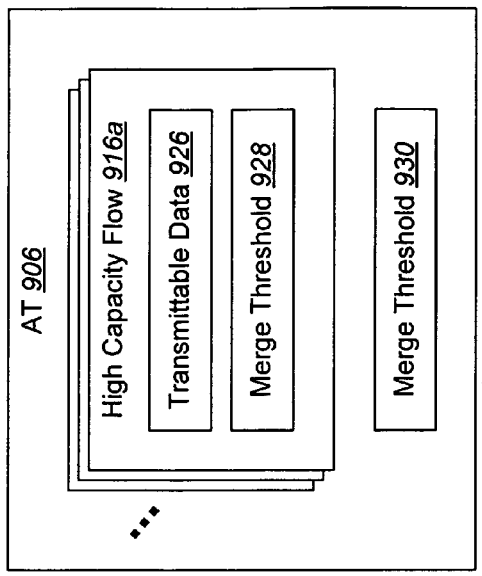
FIG. 9 is a block diagram illustrating information that may be maintained at an access terminal in order to determine whether a high capacity flow is included in the flow set of a low latency packet.

Merging Concurrent Low Latency and High Capacity Flows in a Physical Layer Packet in Each Reverse Link Carrier Merging arises when an AT 906 contains multiple flows of different termination targets. Because each physical packet may have one termination target, rules may be used to determine when flows may be merged into the same packet. Rules for merging concurrent low latency and high capacity flows into a packet depend on the flow priorities and the sector loading. FIG. 9 illustrates information that may be maintained at the AT 906 in order to determine whether a high capacity flow 916*a* is included in the flow set 818 of a low latency packet 824*b*. Each high capacity flow 916*a* on the AT 906 has a certain amount of data 926 that is available for transmission. Also, a merge threshold 928 may be defined for each high capacity flow 916*a* on the AT 906. In addition, a merge threshold 930 may be defined for the AT 906 as a whole. Finally, a merging of high capacity flows may occur when an estimate of the loading level of the sector is less than a threshold value. (How the estimate of the loading level of the sector is determined will be discussed below.) That is, when the sector is sufficiently lightly loaded, the efficiency loss of merging is not important and aggressive usage is allowed.

In some embodiments, a high capacity flow 916a is included in a low latency packet 524b if either of two conditions is satisfied. The first condition is that the sum of the transmittable data 926 for all of the high capacity flows 916a on the AT 906 exceeds the merge threshold 930 that is defined for the AT 906. The second condition is that the transmittable data 926 for the high capacity flow 916a exceeds the merge threshold 928 that is defined for the high capacity flow 916a.

The first condition relates to the power transition from low latency packets 824b to high capacity packets 724a. If high capacity flows 916a are not included in low latency packets 824b, data from the high capacity flows 916a builds up as long as there is data available for transmission from at least one low latency flow 816b. If too much data from the high capacity flows 916a is allowed to accumulate, then the next time that a high capacity packet 724a is transmitted, there may be an unacceptably sharp power transition from the last low latency packet 824b to the high capacity packet 724a. Therefore, in accordance with the first condition, once the amount of transmittable data 926 from the high capacity flows 916a on the AT 906 exceeds a certain value (defined by the merge threshold 930), "merging" of data from the high capacity flows 916a into low latency packets 824b is allowed.

The second condition relates to the quality of service (QoS) requirements for the high capacity flows 916a on the AT 906. If the merge threshold 928 for a high capacity flow 916a is set to a very large value, this means that the high capacity flow 916a is rarely, if ever included in a low latency packet 824b. Consequently, such a high capacity flow 916a may experience transmission delays, because it is not transmitted whenever there is at least one low latency flow 816b with data to transmit. Conversely, if the merge threshold 928 for a high capacity flow 916a is set to a very small value, this means that the high capacity flow 916a is almost always included in a low latency packet 824b. Consequently, such high capacity flows 916a may experience very little transmission delay. However, such high capacity flows 916a use up more sector resources to transmit their data.

In some embodiments, the merge threshold 928 for some of the high capacity flows 916a on the AT 906 may be set to a very large value, while the merge threshold 928 for some other high capacity flows 916a on the AT 906 may be set to a very small merge threshold 928. Such a design is advantageous because some types of high capacity flows 916a may have strict QoS requirements, while others may not. An example of a flow 916 that has strict QoS requirements and that may be transmitted in high capacity mode is real-time video. Real-time video has a high bandwidth requirement, which may make it inefficient for transmission in low latency mode. However, arbitrary transmission delays are not desired for real-time video. An example of a flow 916 that does not have strict QoS delay requirements and that may be transmitted in high capacity mode is a best effort flow 916.

Setting Power Levels of Packets in a Given Reverse Link Carrier

Figure 10:
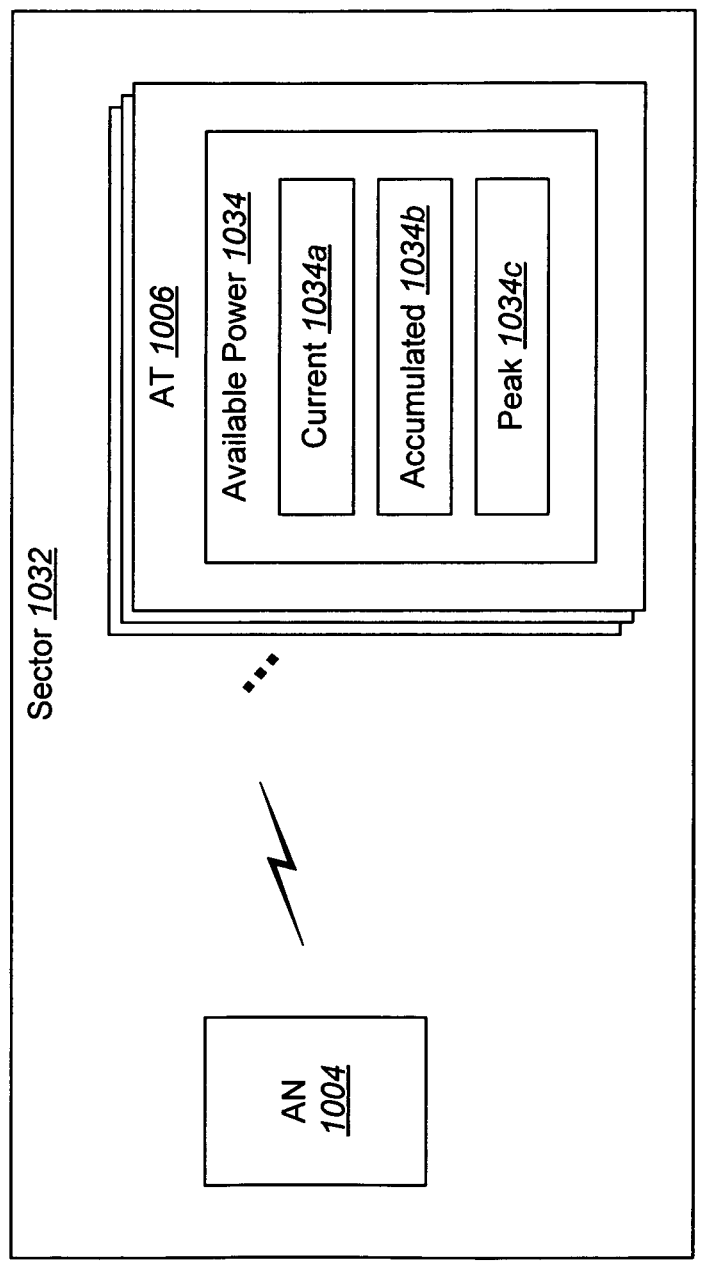
FIG. 10 is a block diagram illustrating an access network and a plurality of access terminals within a sector.

FIG. 10 illustrates an AN 1004 and a plurality of ATs 1006 within a sector 1032. A sector 1032 is a geographic region in which the signals from an AN 1004 may be received by an AT 1006, and vice versa.

One property of some wireless communication systems, such as CDM systems, is that transmissions interfere with each other. Therefore, to ensure that there is not too much interference between ATs 1006 within the same sector 1032, there is a limited amount of power received at the AN 1004 that the ATs 1006, collectively, may use. To ensure that the ATs 1006 stay within this limit, a certain amount of power 1034 is available to each AT 1006 within the sector 1032 for transmissions on the reverse traffic channel 208. Each AT 1006 sets the power level 422 of the packets 524 that it transmits on the reverse traffic channel 208 so as not to exceed its total available power 1034.

The power level 1034 that is allocated to an AT 1006 may not be exactly equal to the power level 422 that the AT 1006 uses to transmit packets 524 on the reverse traffic channel 208. For example, in some embodiments there is a set of discrete power levels that the AT 1006 selects from in determining the power level 422 of a packet 524. The total available power 1034 for an AT 1006 may not be exactly equal to any of the discrete power levels.

The total available power 1034 that is not used at any given time is allowed to accumulate, so that it may be used at a subsequent time. Thus, in such embodiments, the total available power 1034 for an AT 1006 is (roughly) equal to a current power allocation 1034a plus at least some portion of an accumulated power allocation 1034b. The AT 1006 determines the power level 422 of a packet 524 so that it does not exceed the total available power 1034 for the AT 1006.

The total available power 1034 for an AT 1006 may not always equal the AT's 1006 current power allocation 1034a plus the AT's 1006 accumulated power allocation 1034b. In some embodiments, the AT's 1006 total available power 1034 may be limited by a peak allocation 1034c. The peak allocation 1034c for an AT 1006 may be equal to the current power allocation 1034a for the AT 1006 multiplied by some limiting factor. For example, if the limiting factor is two, then the AT's 1006 peak allocation 1034c is equal to twice its current power allocation 1034a. In some embodiments, the limiting factor is a function of the current power allocation 1034a for the AT 1006.

Providing a peak allocation 1034c for the AT may limit how "bursty" the AT's 1006 transmissions are allowed to be. For example, it may occur that an AT 1006 does not have data to transmit during a certain period of time. During this period of time, power may continue to be allocated to the AT 1006. Because there is no data to transmit, the allocated power accumulates. At some point, the AT 1006 may suddenly have a relatively large amount of data to transmit. At this point, the accumulated power allocation 1034b may be relatively large. If the AT 1006 were allowed to use the entire accumulated power allocation 1034b, then the AT's 1006 transmitted power 422 may experience a sudden, rapid increase. However, if the AT's 1006 transmitted power 422 increases too rapidly, this may affect the stability of the system 100. Accordingly, the peak allocation 1034c may be provided for the AT 1006 to limit the total available power 1034 of the AT 1006 in circumstances such as this. Note that the accumulated power allocation 1034b is still available, but its use is spread out over more packets when the peak allocation 1034c is limited.

Policing Data Flow in a Single Reverse Link Carrier

Figure 11:
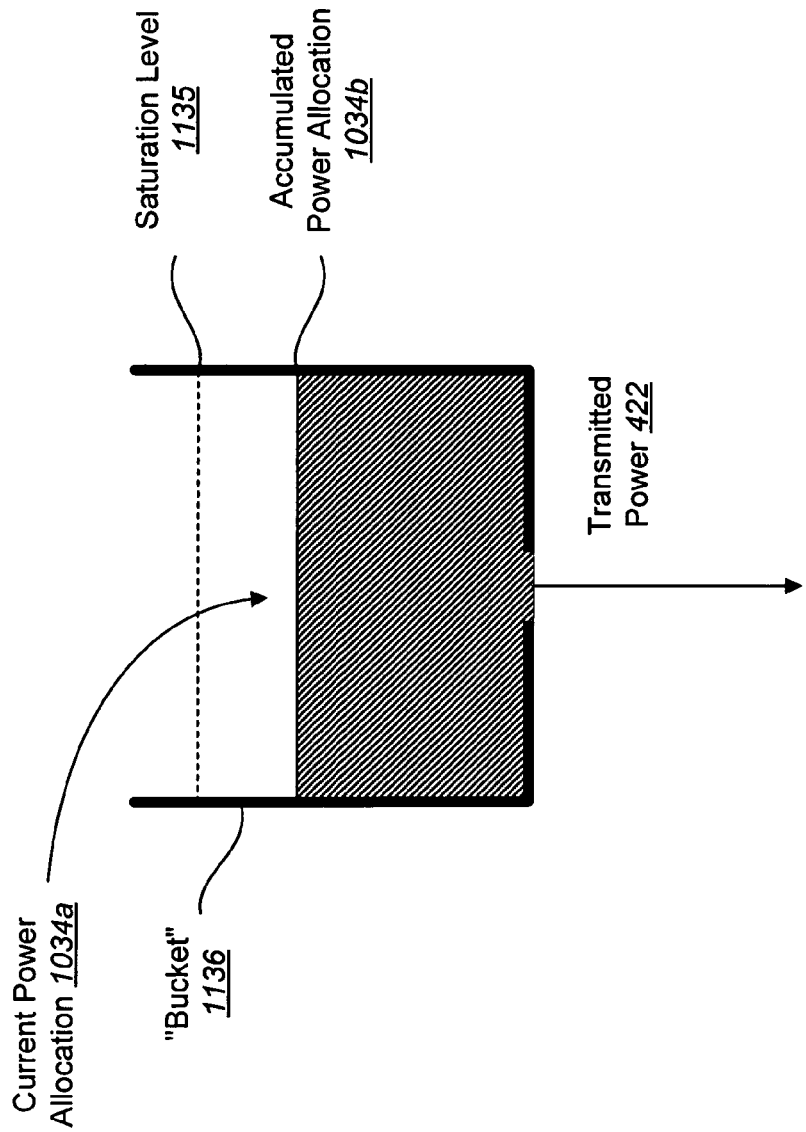
FIG. 11 illustrates an exemplary mechanism that may be used to determine the total available power for an access terminal.

FIG. 11 illustrates an exemplary mechanism that may be used to determine the total available power 1034 for an AT 206. The mechanism involves the use of a virtual "bucket" 1136. This RLMAC bucket is used for each data flow to police data flow as well as control flow access. The data generated by an application flow is first regulated in the data domain. The policing function ensures that average and peak resources utilized by a flow is less than or equal to a limit.

Policing data flow operates using the following method. At periodic intervals, a new current power allocation 1034a is added to the bucket 1136. Also at periodic intervals, the power level 422 of the packets 524 transmitted by the AT 206 exits the bucket 1136. The amount by which the current power allocation 1034a exceeds the power level 422 of the packets is the accumulated power allocation 1034b. The accumulated power allocation 1034b remains in the bucket 1136 until it is used.

The total power available 1034 minus the current power allocation 1034a is the total potential withdrawal from the bucket 1136. The AT 1006 ensures that the power level 422 of the packets 524 that it transmits does not exceed the total available power 1034 for the AT 1006. As indicated previously, under some circumstances the total available power 1034 is less than the sum of the current power allocation 1034a and the accumulated power allocation 1034b. For example, the total available power 1034 may be limited by the peak power allocation 1034c.

The accumulated power allocation 1034b may be limited by a saturation level 1135. In some embodiments, the saturation level 1135 is a function of an amount of time that the AT 1006 is permitted to utilize its peak power allocation 1034c. A bucket 1136 in excess of saturation level 1135 may indicate over allocation due to one of three reasons: i) PA headroom or data limit, ii) T2PInflow 1035 decays down to an AN 1004 controlled minimum value, or iii) T2Pflow 1035 starts increasing when flow is no longer over-allocated. T2PInflow 1035 is defined as the resource level in the network that is currently assigned to the flow. Thus, T2PInflow 1035=new resource inflow (long Term T2P resource based on AN 1004 assigned flow priority).

Figure 12:
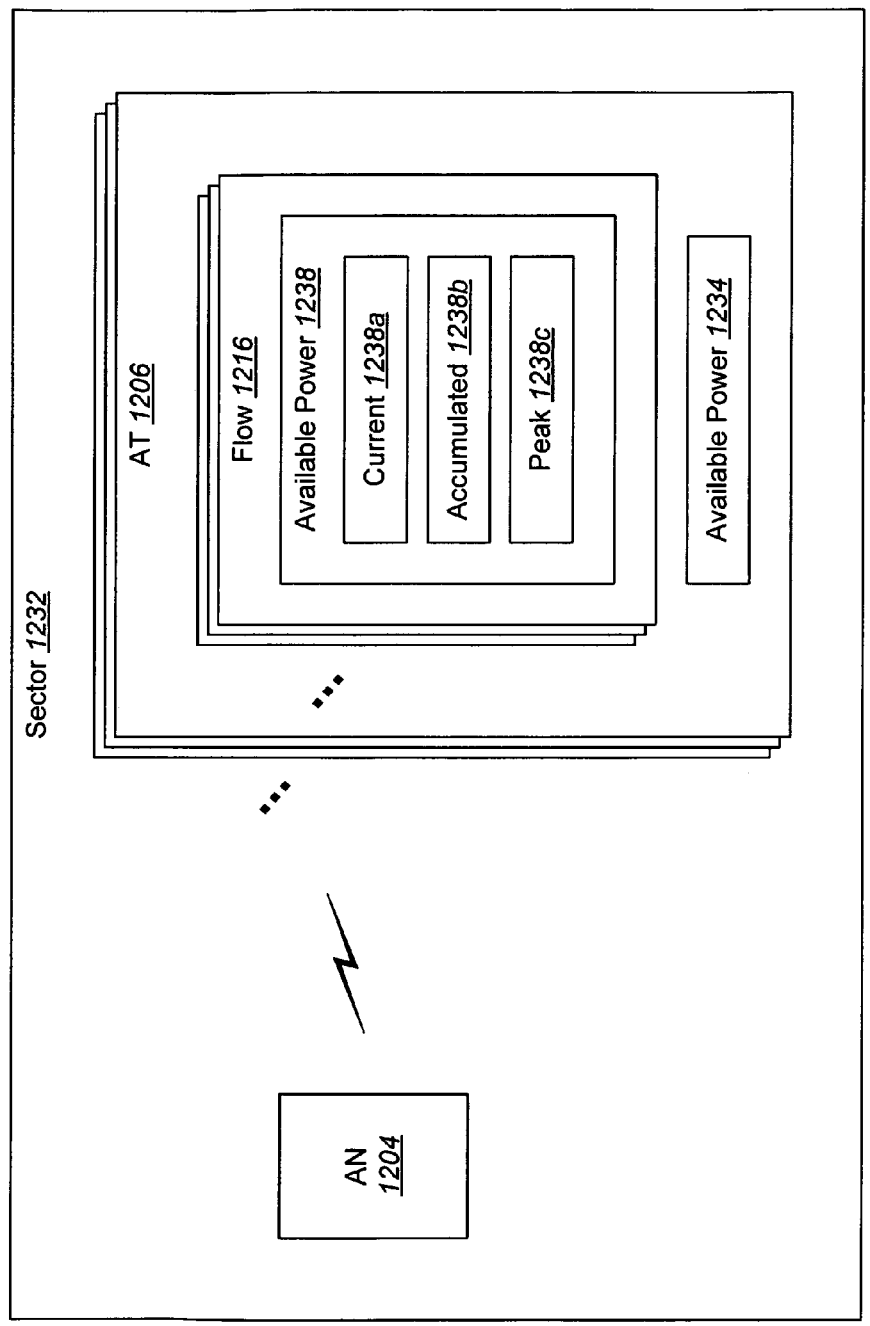
FIG. 12 is a block diagram illustrating an embodiment in which at least some of the access terminals within a sector include multiple flows.

Flow Access Control by Allocating Resources Among the Multiple Flows Associated with AT 1206 in Each Reverse Link Carrier FIG. 12 illustrates an embodiment in which at least some of the ATs 1206 within a sector 1232 include multiple flows 1216. Resources among the multiple flows associated with the AT 1206 are allocated in a manner that maintains quality assurance (QoS). In such an embodiment, a separate amount of available power 1238 may be determined for each flow 1216 on the AT 1206. The power available 1238 for a flow 1216 on the AT 1206 may be determined in accordance with the methods described previously in connection with FIGS. 10-11. Each flow maintains a bucket for storing unused T2P resource, up to some maximum level. As flow data arrives, bucket resource is used to allocate packets, subject to a maximum bucket withdrawal rate based on peak-to-average access control. In this way, average resource usage is bounded by T2PInflow 1035, but locally bursty allocations can be made for data sources that benefit from them. Peak-to-average control, referred to as BucketFactor, restricts how bursty the AN 1004 received power can be from each flow.

For example, the total available power 1238 for a flow 1216 may include a current power allocation 1238a for the flow 1216 plus at least some portion of an accumulated power allocation 1238b for the flow 1216. In addition, the total available power 1238 for a flow 1216 may be limited by a peak allocation 1238c for the flow 1216. A separate bucket mechanism (which utilizes parameters BucketLevel and T2PInflow 1235 described below), such as shown in FIG. 11, may be maintained for each flow 1216 in order to determine the total available power 1238 for each flow 1216.

The total available power 1234 for the AT 1206 may be determined by taking the sum of the total available power 1238 for the different flows 1216 on the AT 1206.

The following provides a mathematical description of various formulas and algorithms that may be used in the determination of the total available power 1238 for a flow 1216 on the AT 1206. In the equations described below, the total available power 1238 for each flow i on the AT 1206 is determined once every sub-frame. (In some embodiments, a sub-frame is equal to four time slots, and a time slot is equal to 5/3 ms.) The total available power 1238 for a flow is referred to in the equations as Potential T2POutflow.

The total available power 1238 for flow i transmitted in a high capacity packet 524a may be expressed as:

$$PotentialT2POutflow_{i,HC} = \max\left(0, \min\left(\begin{array}{l}\left(1+AllocationStagger\times r_n\right)\times \\ \left(\left(\frac{BucketLevel_{i,n}}{4}\right)+T2PInflow_{i,n}\right) \\ BucketFactor(T2Inflow_{i,n}, FRAB_{i,n})\times \\ T2PInflow_{i,n}\end{array}\right)\right) \quad (1)$$

The total available power 1238 for flow i transmitted in a low latency packet 524b may be expressed as:

$$PotentialT2POutflow_{i,LL} = \max\left(0, \min\left(\begin{array}{l}\left(1+AllocationStagger\times r_n\right)\times \\ \left(\left(\frac{BucketLevel_{i,n}}{4}\right)+T2PInflow_{i,n}\right) \\ BucketFactor(T2Inflow_{i,n}, FRAB_{i,n})\times \\ T2PInflow_{i,n}\end{array}\right)\right) \quad (2)$$

BucketLevel$_{i,n}$ is the accumulated power allocation 1238b for flow i at sub-frame n. T2PInflow$_{i,n}$ is the current power allocation 1238a for flow i at sub-frame n. The expression BucketFactor(T2PInflow$_{i,n}$,FRAB$_{i,n}$)×T2PInflow$_{i,n}$ is the peak power allocation 1238c for flow i at sub-frame n. BucketFactor(T2PInflow$_{i,n}$,FRAB$_{i,n}$) is a function for determining the limiting factor for the total available power 1238, i.e., the factor by which the total available power 1238 for flow i at sub-frame n is permitted to exceed the current power allocation 1238a for flow i at sub-frame n. Filtered Reverse Activity Bit flow i at sub-frame n (FRAB$_{i,n}$) is an estimate of the loading level of the sector 1232, and will be discussed in greater detail below. AllocationStagger is the amplitude of a random term that dithers allocation levels, to avoid synchronization problems, and r$_n$ is a real-valued uniformly distributed random number in the range [−1,1].

The accumulated power allocation 1238b for flow i at sub-frame n+1 may be expressed as:

BucketLevel$_{i,n+1}$=min((BucketLevel$_{i,n}$+T2PInflow$_{i,n}$−T2POutflow$_{i,n}$),BucketLevelSat$_{i,n+1}$)   (3).

T2POutflow$_{i,n}$ 425 is the portion of the transmitted power 422 that is apportioned to flow i at sub-frame n. An exemplary equation for T2POutflow$_{i,n}$ is provided below. BucketLevelSat$_{i,n+1}$ is the saturation level 1135 for the accumulated power allocation 1238*b* for flow i at sub-frame n+1. An exemplary equation for BucketLevelSat$_{i,n+1}$ is provided below.

T2POutflow$_{i,n}$ 425 may be expressed as:

$$T2POutflow_{i,n} = \left(\frac{d_{i,n}}{SumPayload_n}\right) \times TxT2P_n. \quad (4)$$

In Equation (4) above, $d_{i,n}$ is the amount of data from flow i that is included in the sub-packet that is transmitted during sub-frame n. (A sub-packet is the portion of a packet that is transmitted during a sub-frame.) SumPayload$_n$ is the sum of $d_{i,n}$. TxT2P represents a transmit traffic-to-pilot channel power ratio and TxT2P$_n$ is the power level 422 of the sub-packet that is transmitted during sub-frame n.

BucketLevelSat$_{i,n+1}$ may be expressed as:

BucketLevelSat$_{i,n+1}$=BurstDurationFactor$_i$×Bucket-
Factor(T2PInflow$_{i,n}$,FRAB$_{i,n}$)×T2PInflow$_{i,n}$ (5).

BurstDurationFactor$_i$ is a limitation on the length of time that flow i is permitted to transmit at the peak power allocation 1238*c*.

Figure 13:
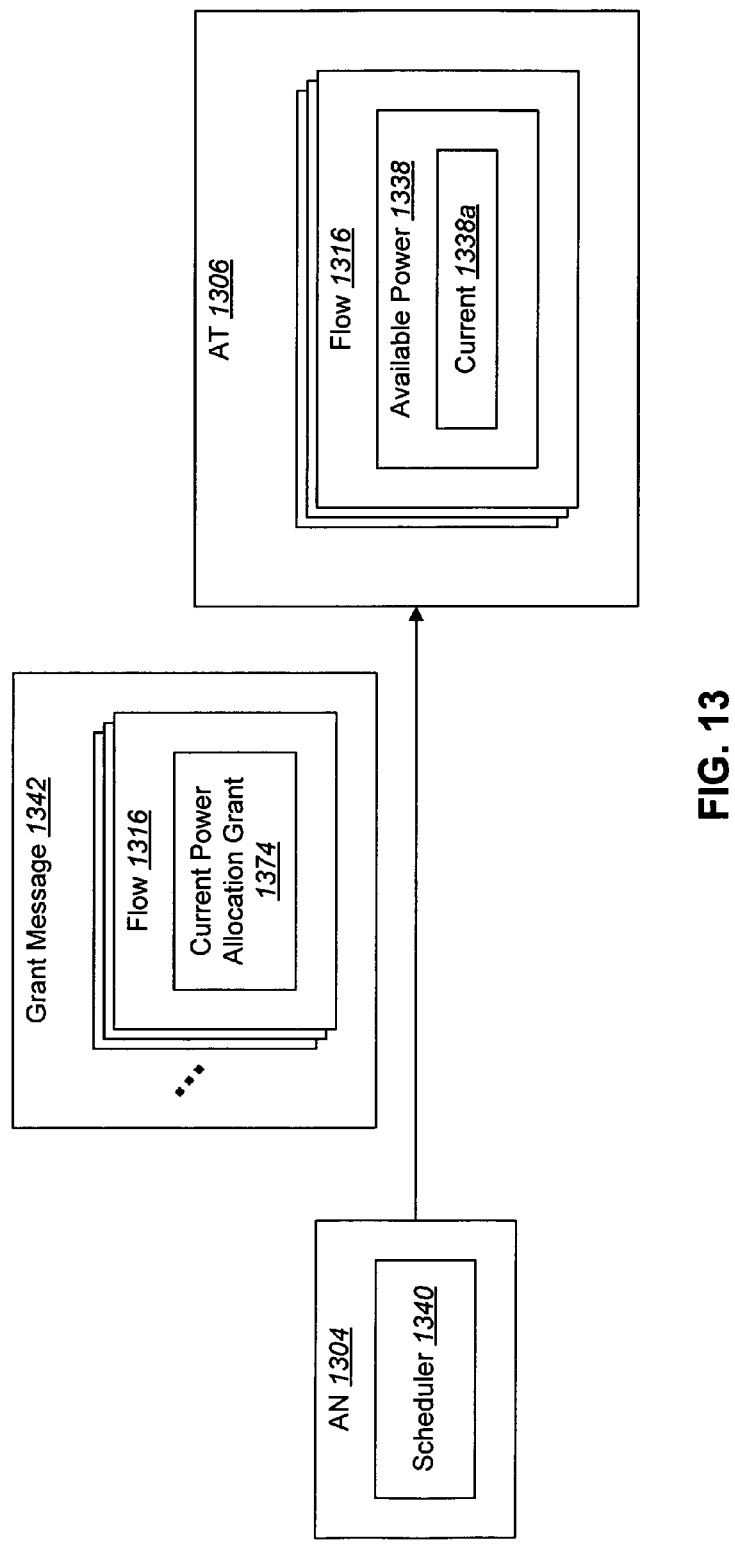
FIG. 13 is a block diagram illustrating one way in which the access terminal may obtain the current power allocation for the flows on the access terminal.

Obtaining Current Power Allocation 1338*a* for Flows 1316 on AT 1306 from AN 1304 for a Given Reverse Link Carrier In some embodiments, obtaining the current power allocation 1338*a* may be a two-step process. Flow resources may either be allocated in a distributed fashion by each AT 1306 (autonomous mode) or from a central controller or scheduler 1340 located in an AN 1304 using a grant 1374. FIG. 13 illustrates one way in which the AT 1306 may obtain the current power allocation 1338*a* for the flows 1316 on the AT 1306 using a form of centralized control of network resource allocation by an AN 1304. As shown, the AT 1306 may receive a grant message 1342 from a scheduler 1340 that is running on the AN 1304. The grant message 1342 may include a current power allocation grant 1374 for some or all of the flows 1316 on the AT 1306. A grant 1374 may be a resource allocation (and not a per-packet allocation), which allows the AN 1304 to provide resource allocation updates and changes. It may also allow for in-band signaling of detailed QoS information. For each current power allocation grant 1374 that is received, the AT 1306 sets the current power allocation 1338*a* for the corresponding flow 1316 equal to the current power allocation grant 1374. The grant 1374 allocates and freezes the power allocation for a time interval. Thus, the AN 1304 controls flow resource allocation during this time interval.

As described above, flow resources may either be allocated in a distributed fashion by each AT 1306 (autonomous mode) or from a central controller or scheduler 1340 located in an AN 1304 using a grant 1374. Thus, the first step involves determining whether a current power allocation grant 1374 for a flow 1316 has been received from the AN 1304. If not, then the AT 1306 autonomously determines the current power allocation 1338*a* for the flow 1216. In other words, the AT 1306 determines the current power allocation 1338*a* for the flow 1216 without intervention from the scheduler 1340. This may be referred to as an autonomous mode. The following discussion relates to exemplary methods for the AT 1306 to autonomously determine the current power allocation 1338*a* for one or more flows 1316 on the AT 1306.

Figure 14:
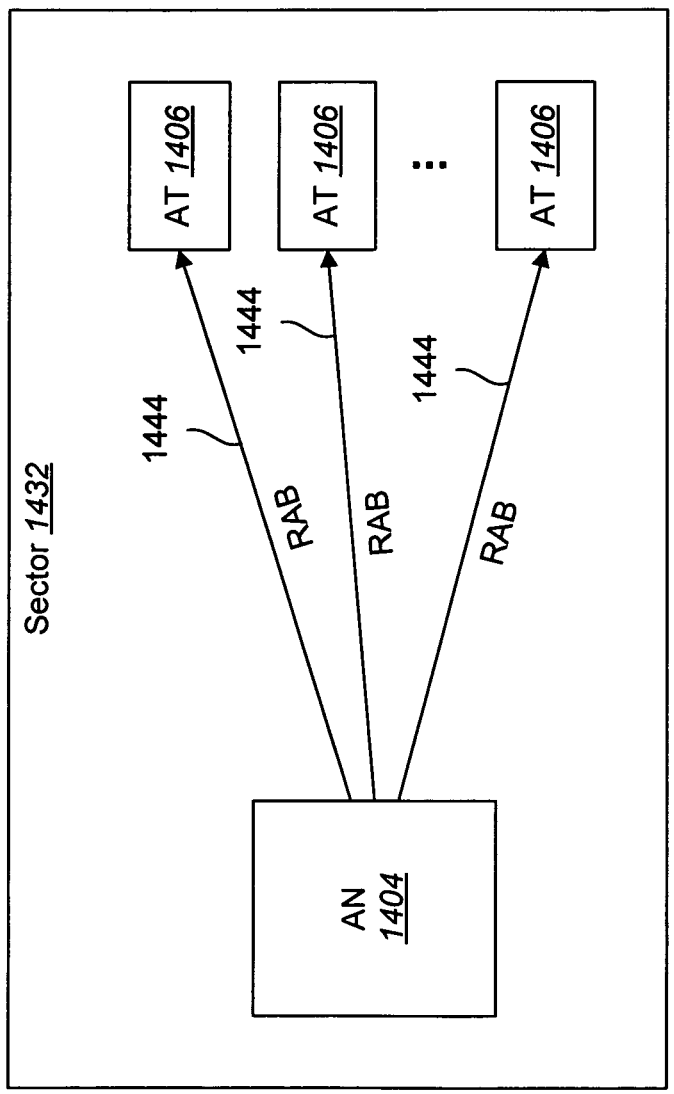
FIG. 14 is a block diagram illustrating a reverse activity bit being transmitted from the access network to the access terminals within a sector.

Autonomously Determining Current Power Allocations 1238*a* for One or More Flows 1216 for Each Reverse Link Carrier FIG. 14 illustrates a reverse activity bit (RAB) 1444 being transmitted from the AN 1404 to the ATs 1406 within a sector 1432. The access node 1404 uses the RAB to inform the ATs 1406 within its coverage area concerning the amount of current traffic activity over the reverse link. Thus, the RAB 1444 is an overload indication. ATs incorporate this information when deciding whether to decrease their traffic rates because of high traffic load over the reverse link or increase their traffic rates because of low traffic load over the reverse link. The RAB 1444 may be one of two values, a first value (e.g., +1) which indicates that the sector 1432 is presently busy, or a second value (e.g., −1) which indicates that the sector 1432 is presently idle. As will be explained below, the RAB 1444 may be used to determine the current power allocations 1238*a* for the flows 1216 on the AT 1206. Note, flows 1216 see the same RAB 1444 in each sector, whether sharing an AT 1406 or across ATs 1406. Such may be a design simplification that scales well in multiflow scenarios.

Figure 15:
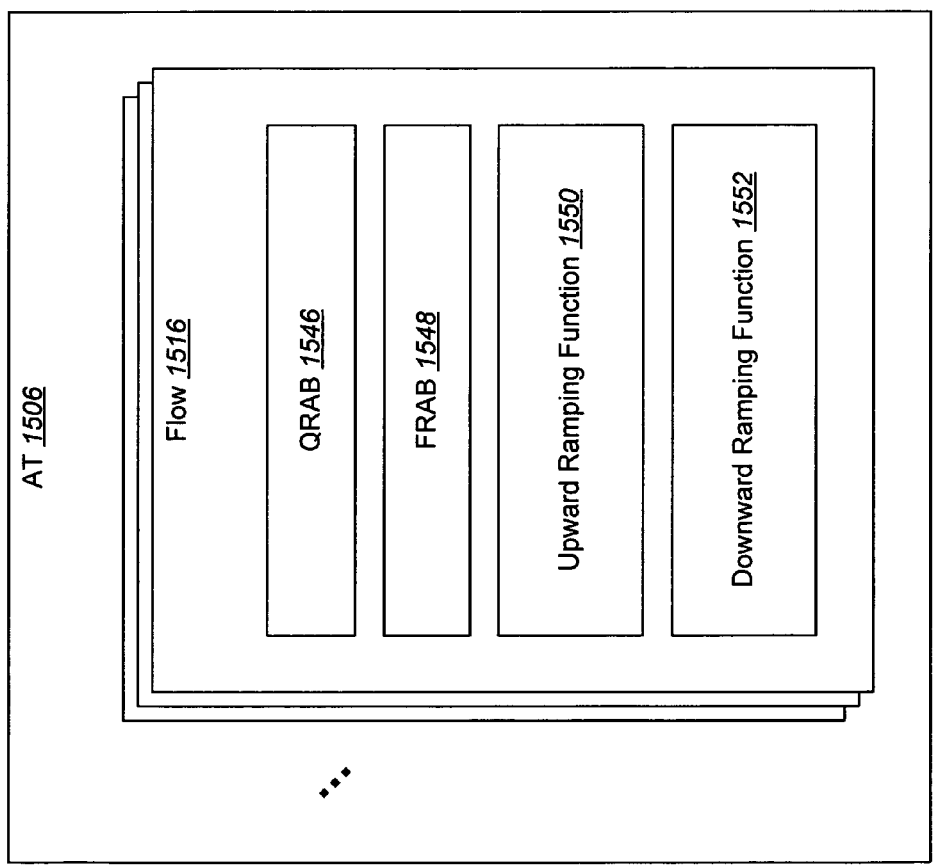
FIG. 15 is a block diagram illustrating information that may be maintained at the access terminal in order to determine the current power allocation for one or more flows on the access terminal.

Autonomously Determining Current Power Allocation 1238*a* Using Short and Long RAB Estimates for Each Reverse Link Carrier FIG. 15 illustrates information that may be maintained at the AT 1506 in order to determine the current power allocation 1238*a* for one or more flows 1516 on the AT 1506. In the illustrated embodiment, each flow 1516 is associated with a "quick" or "short term" estimate of the RAB 1444. This quick estimate will be referred to herein as QRAB 1546. An exemplary method for determining QRAB 1546 will be described below.

Each flow 1516 is also associated with an estimate of the longer-term loading level of the sector 1232, referred to herein as FRAB 1548 (which stands for "filtered" RAB 1444). FRAB is a measure of sector loading similar to QRAB 1546, but with a much longer time constant τ. Thus, QRAB is relatively instantaneous, whereas FRAB 1548 gives longer-term sector loading information. FRAB 1548 is a real number that lies somewhere between the two possible values of the RAB 1444, e.g., +1 and −1. However, other numbers can be used for values of the RAB 1444. The closer FRAB 1548 comes to the value of RAB 1444 which indicates that the sector 1432 is busy, the more heavily loaded the sector 1432 is. Conversely, the closer FRAB 1548 comes to the value of the RAB 1444 which indicates the sector 1432 is idle, the less heavily loaded the sector 1432 is. An example of determining FRAB 1548 is described below.

Each flow 1516 is also associated with an upward ramping function 1550 and a downward ramping function 1552. The upward ramping function 1550 and the downward ramping function 1552 associated with a particular flow 1516 are functions of the current power allocation 1238*a* for the flow 1516. The upward ramping function 1550 associated with a flow 1516 is used to determine an increase in the current power allocation 1238*a* for the flow 1516. Conversely, the downward ramping function 1552 associated with a flow 1516 is used to determine a decrease in the current power allocation 1238*a* for the flow 1516. In some embodiments, both the upward ramping function 1550 and the downward ramping function 1552 depend on the value of FRAB 1548 and the current power allocation 1238*a* for the flow 1516. Because the upward ramping function 1550 and the downward ramping function 1552 depend on the value of FRAB, they are loading dependent ramping functions. Consequently, FRAB allows decoupling of unloaded T2P ramping dynamics from loaded steady-state T2P dynamics. When the sector is unloaded, faster ramping is desired to quickly and smoothly fill sector capacity. When the sector is loaded, slower ramping is desired to reduce Rise-over-Thermal (RoT) variation. The RoT at a sector is defined as the ratio of total received power to thermal noise power. This quantity is measurable and self-calibrating, and provide an estimate of the interference seen by each AT 1506. In other methods, a fixed ramping is used resulting in a tradeoff between these conflicting requirements.

The upward ramping function 1550 and the downward ramping function 1552 are defined for each flow 1516 in the network, and are downloadable from the AN 1404 controlling the flow's AT 1506. The upward ramping function and the downward ramping function have the flow's current power allocation 1238*a* as their argument. The upward ramping function 1550 will sometimes be referred to herein as gu, and the downward ramping function 1552 will sometimes be referred to herein as gd. We refer to the ratio of gu/gd (also a function of current power allocation 1238*a*) as a demand or priority function. It may be demonstrated that, subject to data and access terminal power availability, the reverse link MAC (RLMac) method converges to a current power allocation 1238*a* for each flow 1516 such that all flow demand function values are equal when taken at their flow's allocation. Using this fact and judiciously designing the flow demand functions, it is possible to achieve the same general mapping of flow layout and requirements to resource allocation as that achievable by a centralized scheduler. But the demand function method achieves this general scheduling capability with minimal control signaling and in a decentralized manner. The upward and downward ramping functions allow rapid traffic-to-pilot channel power (T2P) increases in lightly loaded sectors, smooth filing in of sector capacity, lower ramping as the sector load increases and decoupling of T2P dynamics between loaded and unloaded sectors. Here, T2P is used as a sector resource. For a fixed termination goal, T2P increases roughly linearly with flow transmission rate.

Figure 16:
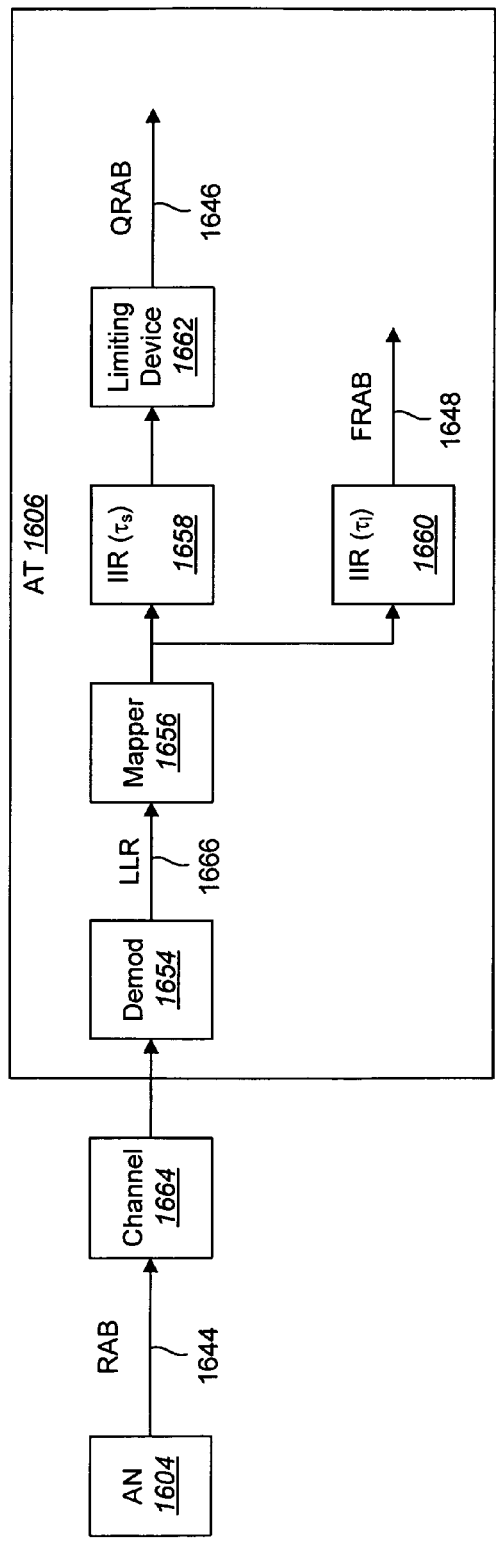
FIG. 16 is a functional block diagram illustrating exemplary functional components in an access terminal that may be used to determine an estimate of the reverse activity bit and an estimate of the current loading level of the sector.

Components in AT 1506 Used to Determine QRAB 1646 and FRAB 1648 for Each Reverse Link Carrier FIG. 16 is a block diagram illustrating exemplary functional components in an AT 1606 that may be used to determine QRAB 1646 and FRAB 1648. As shown, the AT 1606 may include an RAB demodulation component 1654, a mapper 1656, first and second single-pole IIR filters 1658, 1660, and a limiting device 1662.

The RAB 1644 is transmitted from the AN 1604 to the AT 1606 across a communication channel 1664. The RAB demodulation component 1654 demodulates the received signal using standard techniques that are known to those skilled in the art. The RAB demodulation component 1654 outputs a log likelihood ratio (LLR) 1666. The mapper 1656 takes the LLR 1666 as input and maps the LLR 1666 to a value between the possible values of the RAB 1644 (e.g., +1 and −1), which is an estimate of the transmitted RAB for that slot.

The output of the mapper 1656 is provided to the first single-pole IIR filter 1658. The first IIR filter 1658 has a time constant $\tau_s$. The output of the first IIR filter 1658 is provided to a limiting device 1662. The limiting device 1662 converts the output of the first IIR filter 1658 to one of two possible values, corresponding to the two possible values of the RAB 1644. For example, if the RAB 1644 was either a −1 or a +1, then the limiting device 1662 converts the output of the first IIR filter 1658 to either a −1 or a +1. The output of the limiting device 1662 is QRAB 1646. The time constant $\tau_s$ is chosen so that QRAB 1646 represents an estimate of what the current value of the RAB 1644 transmitted from the AN 1604 is. A value for the time constant $\tau_s$ may be four time slots, for example. The QRAB reliability is improved by the filtering of IIR filter 1658. In one example, the QRAB may be updated once every slot.

The output of the mapper 1656 is also provided to a second single-pole IIR filter 1660 having a time constant $\tau_l$. The output of the second IIR filter 1660 is FRAB 1648. The time constant $\tau_l$ is much longer than the time constant $\tau_s$. An exemplary value for the time constant $\tau_s$ is 384 time slots.

The output of the second IIR filter 1660 is not provided to a limiting device. Consequently, as described above, FRAB 1648 is a real number that lies somewhere between a first value of the RAB 1644 which indicates that the sector 1432 is busy and a second value of the RAB 1644 which indicates that the sector 1432 is idle.

Figure 17:
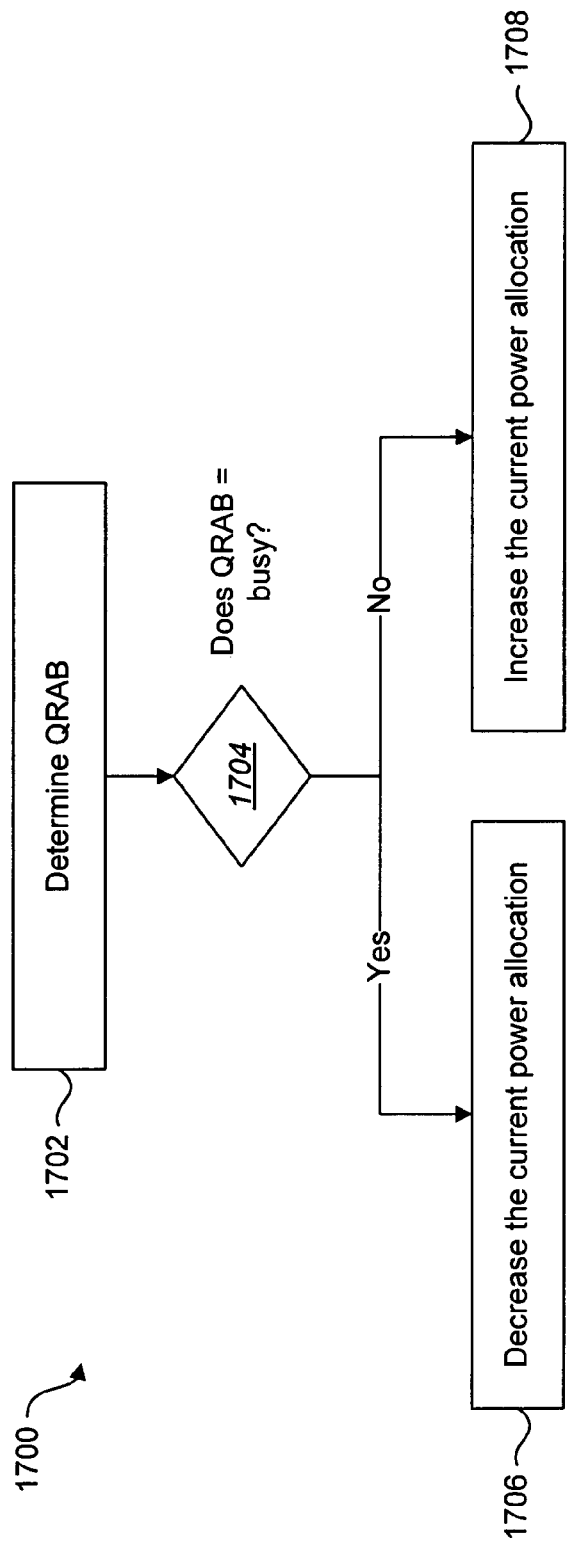
FIG. 17 is a flow diagram illustrating an exemplary method for determining the current power allocation for a flow on the access terminal.

FIG. 17 illustrates an exemplary method 1700 for determining the current power allocation 1238*a* for a flow 1216 on the AT 1206. Step 1702 of the method 1700 involves determining the value of QRAB 1546 that is associated with the flow 1216. In step 1704, it is determined whether QRAB 1546 is equal to a busy value (i.e., a value which indicates that the sector 1432 is presently busy). If QRAB 1546 is equal to a busy value, then in step 1706 the current power allocation 1238*a* is decreased, i.e., the current power allocation 1238*a* for the flow 1216 at time n is less than the current power allocation 1238*a* for the flow 1216 at time n−1. The magnitude of the decrease may be calculated using the downward ramping function 1552 that is defined for the flow 1216.

If QRAB 1546 is equal to an idle value, then in step 1708 the current power allocation 1238*a* is increased, i.e., the current power allocation 1238*a* for the flow 1216 during the current time interval is greater than the current power allocation 1238*a* for the flow 1216 during the most recent time interval. The magnitude of the increase may be calculated using the upward ramping function 1550 that is defined for the flow 1216.

The upward ramping function 1550 and the downward ramping function 1552 are functions of the current power allocation 1238*a*, and are potentially different for each flow 1516 (downloadable by the AN 1404). Thus, the upward 1550 and downward 1552 ramping functions for each flow are used to achieve QoS differentiation per flow with autonomous allocation.

The value of the ramping function may also vary with FRAB 1548, meaning that the dynamics of ramping may vary with loading, which allows for more rapid convergence to the fixed point, e.g., a set of T2PInflow allocations, under less loaded conditions. The convergence time may be related to ramping function magnitude. It may also provide better handling of bursty sources (high peak-to-average throughput) with well-defined restrictions on TxT2P burstiness.

Where the current power allocation 1238*a* is increased, the magnitude of the increase may be expressed as:

$$\Delta T2P\text{Inflow}_{i,n} = +1 \times T2P\text{Up}_i(10 \times \log_{10}(T2P\text{Inflow}_{i,n-1}) + \text{PilotStrength}_i(\text{PilotStrength}_{n,s}), \text{FRAB}_n) \quad (6).$$

Where the current power allocation 1238*a* is decreased, the magnitude of the decrease may be expressed as:

$$\Delta T2P\text{Inflow}_{i,n} = -1 \times T2P\text{Dn}_i(10 \times \log_{10}(T2P\text{Inflow}_{i,n-1}) + \text{PilotStrength}_i(\text{PilotStrength}_{n,s}), \text{FRAB}_n) \quad (7).$$

T2PUp$_i$ is the upward ramping function 1550 for flow i. T2PDn$_i$ is the downward ramping function 1552 for flow i. As described above, each flow may have a priority or demand function, a function of T2PInflow, which is the ratio of the T2Pup and T2Pdn functions. PilotStrength$_{n,s}$ is a measure of the serving sector pilot power versus the pilot power of the other sectors. In some embodiments, it is the ratio of serving sector FL pilot power to the pilot power of the other sectors. PilotStrength$_i$ is a function mapping pilot strength to an offset in the T2P argument of the ramping function, and is downloadable from the AN. T2P represents a traffic-to-pilot power ratio. The offset refers to a gain of the traffic channel relative to the pilot. In this way, priority of the flows at an AT may be adjusted based on the AT's location in the network, as measured by the PilotStrength$_{n,s}$ variable.

The current power allocation 1238a may be expressed as:

$$T2PInflow_{i,n} = \left(1 - \left(\frac{1}{T2PFilterTC}\right)\right) \times T2PInflow_{i,n-1} + \left(\frac{1}{T2PFilterTC}\right) \times T2POutflow_{i,n-1} + \Delta T2PInflow_{i,n}. \quad (8)$$

As illustrated in the foregoing equations, when the saturation level 1135 is reached and the ramping is set to zero, the current power allocation 1238a decays exponentially. This allows for persistence in the value of the current power allocation 1238a for bursty traffic sources, for which the persistence time should be longer than the typical packet interarrival time.

In some embodiments, a QRAB value 1546 is estimated for each sector in the active set of the AT 1206. If QRAB is busy for any of the sectors in the AT's active set, then the current power allocation 1238a is decreased. If QRAB is idle for all of the sectors in the AT's active set, then the current power allocation 1238a is increased. In alternative embodiments, another parameter QRABps may be defined. For QRABps, the measured pilot strength is taken into consideration. (The pilot strength is a measure of the serving sector pilot power versus the pilot power of the other sectors. In some embodiments, it is the ratio of serving sector FL pilot power to the pilot power of the other sectors.) QRABps may be used in interpreting short-term sector loading depending on the AT's 1206 contribution to reverse link interference in sectors in ATs 1206 active set. QRABps is set to a busy value if QRAB is busy for a sector s that satisfies one or more of the following conditions: (1) sector s is the forward link serving sector for the access terminal; (2) the DRCLock bit from sector s is out-of-lock and PilotStrength$_{n,s}$ of sector s is greater than a threshold value; (3) the DRCLock bit from sector s is in-lock and PilotStrength$_{n,s}$ of sector s is greater than a threshold value. Otherwise, QRABps is set to an idle value. (The AN 1204 may use the DRCLock channel to inform the AT 1206 if the AN 1204 is successfully receiving the DRC information sent by the AT 1206. For example, DRCLock bits (e.g., indicating "yes" or "no") are sent over the DRCLock channel.) In embodiments where QRABps is determined, the current power allocation 1238a may be increased when QRABps is idle, and may be decreased when QRABps is busy.

Centralized Control for Each Reverse Link Carrier

Figure 18:
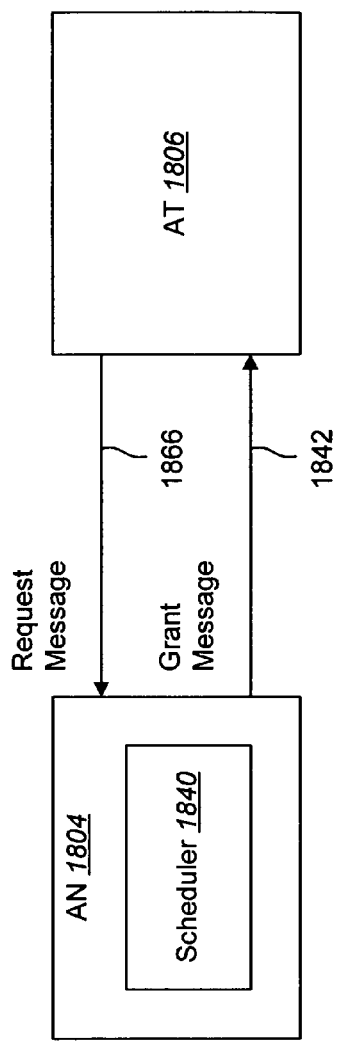
FIG. 18 is a block diagram illustrating an access terminal sending a request message to a scheduler on the access network.

FIG. 18 illustrates an embodiment involving centralized control in which the AT 1806 sends a request message 1866 to the scheduler 1840 on the AN 1804. FIG. 18 also illustrates the scheduler 1840 sending a grant message 1842 to the AT 1806. In some embodiments, the scheduler 1840 may send grant messages 1842 to the AT 1806 on its own initiative. Alternatively, the scheduler 1840 may send grant messages 1842 to the AT 1806 in response to a request message 1866 that is sent by the AT 1806. A request message 1866 contains AT power headroom information as well as per-flow queue length information.

Figure 19:
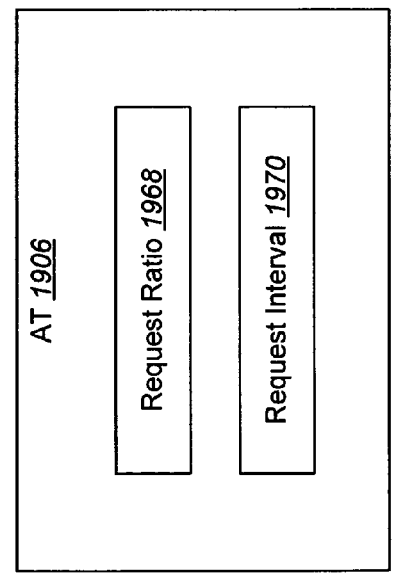
FIG. 19 is a block diagram illustrating information that may be maintained at the access terminal in order for the access terminal to determine when to send a request message to the access network.

FIG. 19 illustrates information that may be maintained at the AT 1906 in order for the AT 1906 to determine when to send a request message 1866 to the AN 1804. As shown, the AT 1906 may be associated with a request ratio 1968. The request ratio 1968 indicates the ratio of request message size 1866 sent on the reverse traffic channel 208 to data sent on the reverse traffic channel 208. In some embodiments, when the request ratio 1968 decreases below a certain threshold value, then the AT 1906 sends a request message 1866 to the scheduler 1840.

The AT 1906 may also be associated with a request interval 1970. The request interval 1970 indicates the period of time since the last request message 1866 was sent to the scheduler 1840. In some embodiments, when the request interval 1970 increases above a certain threshold value, then the AT 1906 sends a request message 1866 to the scheduler 1840. Both methods to trigger request messages 1866 may be used together as well (i.e., a request message 1866 may be sent when either method causes it).

Figure 20:
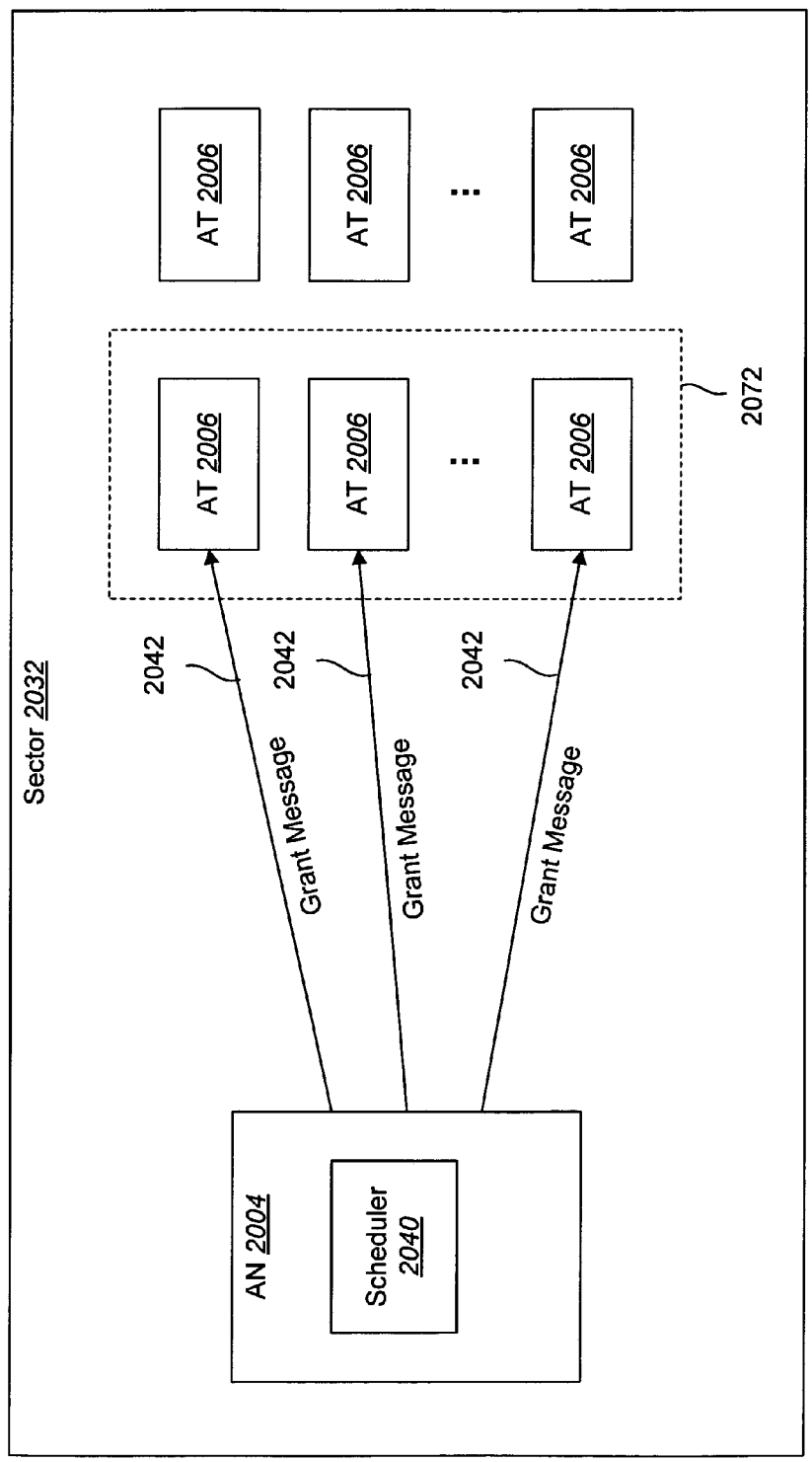
FIG. 20 is a block diagram illustrating an exemplary interaction between a scheduler running on the access network and the access terminals within the sector.

FIG. 20 illustrates an exemplary interaction between a scheduler 2040 running on the AN 2004 and the ATs 2006 within the sector 2032. As shown in FIG. 20, the scheduler 2040 may determine current power allocation grants 1374 for a subset 2072 of the ATs 2006 within the sector 2032. A separate current power allocation grant 1374 may be determined for each AT 2006. Where the ATs 2006 in the subset 2072 include more than one flow 1216, the scheduler 2040 may determine separate current power allocation grants 1374 for some or all of the flows 1216 on each AT 2006. The scheduler 2040 periodically sends grant messages 2042 to the ATs 2006 in the subset 2072. In an embodiment, the scheduler 2040 may not determine current power allocations grants 1374 for the ATs 2006 within the sector 2032 that are not part of the subset 2072. Instead, the remaining ATs 2006 in the sector 2032 autonomously determine their own current power allocations 1038a. The grant messages 2042 may include a holding period for some or all of the current power allocation grants 1374. The holding period for a current power allocation grant 1374 indicates how long the AT 2006 keeps the current power allocation 1238a for the corresponding flow 1216 at the level specified by the current power allocation grant 1374.

In accordance with the approach illustrated in FIG. 20, the scheduler 2040 may not be designed to fill all of the capacity in the sector 2032. Instead, the scheduler 2040 determines the current power allocations 1038a for the ATs 2006 within the subset 2072, and then the remaining sector 2032 capacity is used efficiently by the remaining ATs 2006 without intervention from the scheduler 2040. The subset 2072 may change over time, and may even change with each grant message 2042. Also, the decision to send a grant message 2042 to some subset 2072 of ATs 2006 may be triggered by any number of external events, including detection that some flows 1216 are not meeting certain QoS requirements.

Figure 21:
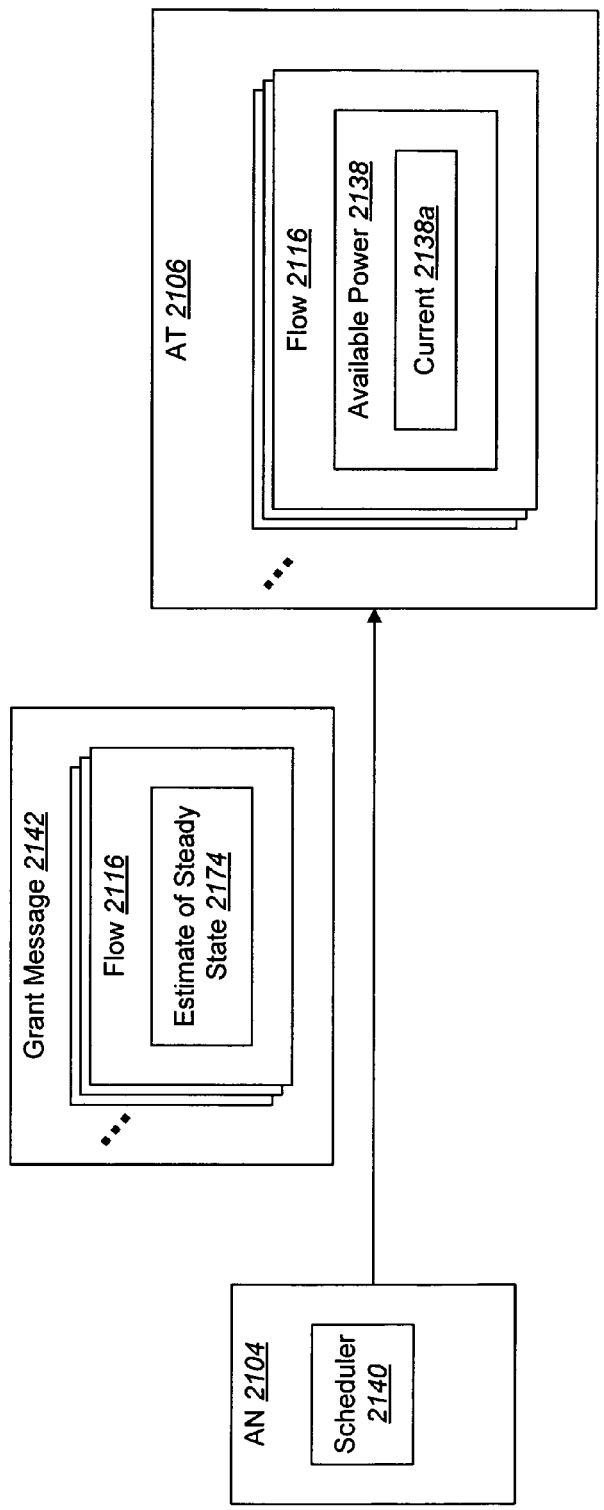
FIG. 21 is a block diagram illustrating another exemplary interaction between a scheduler running on the access network and an access terminal.

FIG. 21 illustrates another exemplary interaction between a scheduler 2140 running on the AN 2104 and an AT 2106. In some embodiments, if the AT 2106 is allowed to determine the current power allocations 2138a for the flows 2116 on the AT 2106, each of the current power allocations 2138a will, over time, converge to a steady-state value. For example, if one AT 2106 enters an unloaded sector 2132 with a flow 2116 that has data to transmit, the current power allocation 2138*a* for that flow 2116 will ramp up until that flow 2116 takes up the entire sector 2132 throughput. However, it may take some time for this to occur.

An alternative approach is for the scheduler 2140 to determine estimates of the steady-state values that the flows in each AT 2106 will ultimately reach. The scheduler 2140 may then send a grant message 2142 to all ATs 2106. In the grant message 2142, the current power allocation grant 2174 for a flow 2116 is set equal to the estimate of the steady-state value for that flow 2116, as determined by the scheduler 2140. Upon receiving the grant message 2142, the AT 2106 sets the current power allocations 2138*a* for the flows 2116 on the AT 2106 equal to the steady-state estimates 2174 in the grant message 2142. Once this is done, the AT 2106 may subsequently be allowed to track any changes in system conditions and autonomously determine the current power allocations 2138*a* for the flows 2116, without further intervention from the scheduler 2140.

Figure 22:
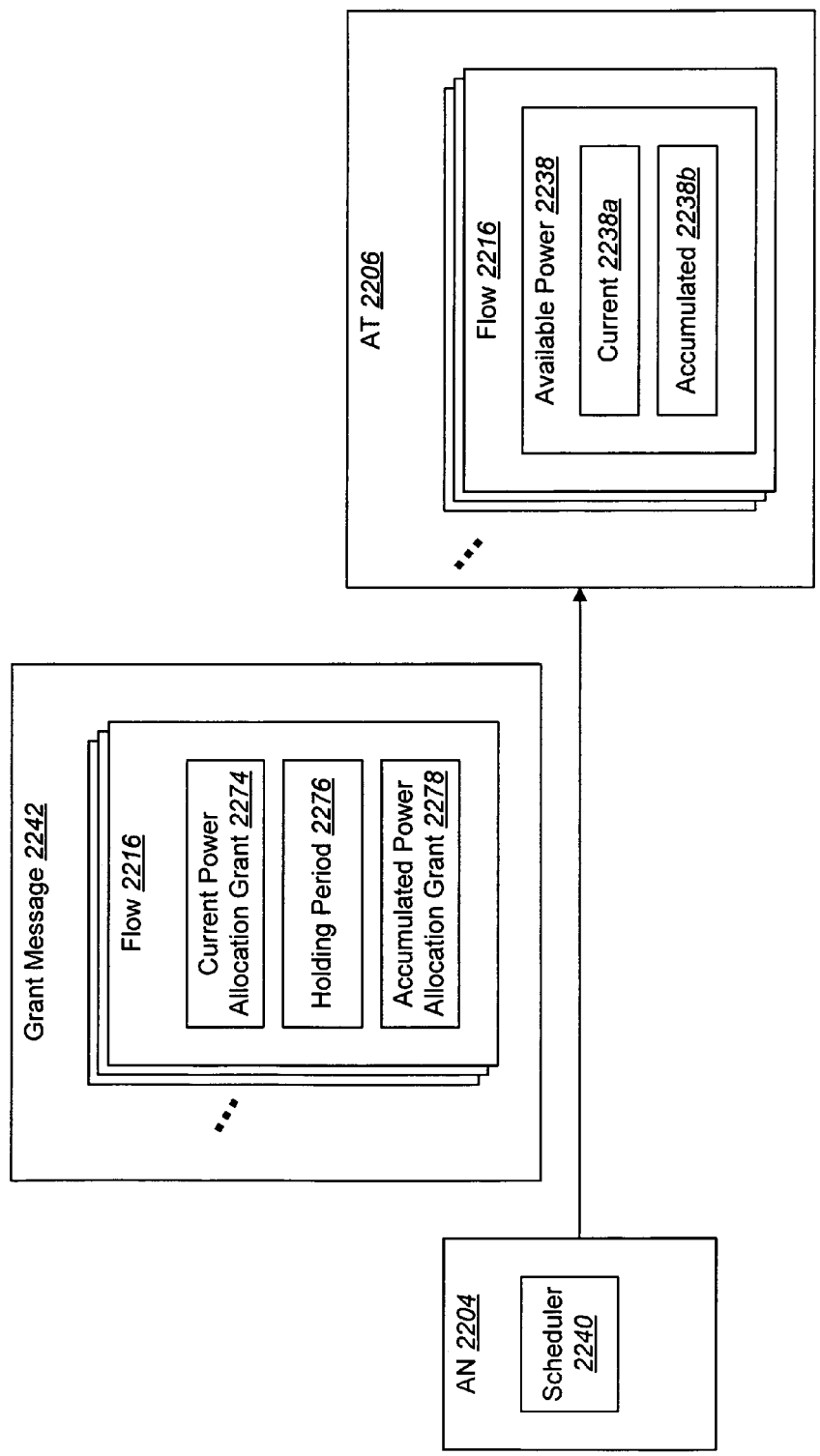
FIG. 22 is a block diagram illustrating another embodiment of a grant message that is transmitted from the scheduler on the access network to the access terminal.

FIG. 22 illustrates another embodiment of a grant message 2242 that is transmitted from the scheduler 2240 on the AN 2204 to the AT 2206. As before, the grant message 2242 includes a current power allocation grant 2274 for one or more of the flows 2216 on the AT 2206. In addition, the grant message includes a holding period 2276 for some or all of the current power allocation grants 2274.

The grant message 2242 also includes an accumulated power allocation grant 2278 for some or all of the flows 2216 on the AT 2206. Upon receiving the grant message 2242, the AT 2206 sets the accumulated power allocations 2238*b* for the flows 2216 on the AT 2206 equal to the accumulated power allocation grants 2278 for the corresponding flows 2216 in the grant message 2242.

FIG. 23 illustrates a power profile 2380 that may be stored at the AT 2306, in some embodiments. The power profile 2380 may be used to determine the payload size 420 and the power level 422 of a packet that is transmitted by the AT 2306 to the AN 204.

The power profile 2380 includes a plurality of payload sizes 2320. The payload sizes 2320 included in the power profile 2380 are the possible payload sizes 2320 for the packets 524 that are transmitted by the AT 2306.

Each payload size 2320 in the power profile 2380 is associated with a power level 2322 for each possible transmission mode. In the illustrated embodiment, each payload size 2320 is associated with a high capacity power level 2322*a* and a low latency power level 2322*b*. The high capacity power level 2322*a* is the power level for a high capacity packet 524*a* with the corresponding payload size 2320. The low latency power level 2322*b* is the power level for a low latency packet 524*b* with the corresponding payload size 2320.

FIG. 24 illustrates a plurality of transmission conditions 2482 that may be stored at the AT 2406. In some embodiments, the transmission conditions 2482 influence the selection of the payload size 420 and the power level 422 for a packet 524.

The transmission conditions 2482 include an allocated power condition 2484. The allocated power condition 2484 relates generally to ensuring that the AT 2406 is not using more power than it has been allocated. More specifically, the allocated power condition 2484 is that the power level 422 of the packet 524 does not exceed the total available power 1034 for the AT 2406. Various exemplary methods for determining the total available power 1034 for the AT 2406 were discussed above.

The transmission conditions 2482 also include a maximum power condition 2486. The maximum power condition 2486 is that the power level 422 of the packet 524 does not exceed a maximum power level that has been specified for the AT 2406.

The transmission conditions 2482 also include a data condition 2488. The data condition 2488 relates generally to ensuring that the payload size 420 of the packet 524 is not too large in view of the total available power 1034 of the AT 2406 as well as the amount of data that the AT 2406 presently has available for transmission. More specifically, the data condition 2488 is that there is not a payload size 2320 in the power profile 2380 that corresponds to a lower power level 2322 for the transmission mode of the packet 524 and that is capable of carrying the lesser of (1) the amount of data that is presently available for transmission, and (2) the amount of data that the total available power 1034 for the AT 2406 corresponds to.

The following provides a mathematical description of the transmission conditions 2482. The allocated power condition 2484 may be expressed as:

$$\text{TxT2PNominal}_{PS,TM} \leq \Sigma_{i \in F}(\text{PotentialT2POutflow}_{i,TM}) \qquad (9).$$

$\text{TxT2PNominal}_{PS,TM}$ is the power level 2322 for payload size PS and transmission mode TM. F is the flow set 418.

The maximum power condition 2486 may be expressed as:

$$\max(\text{TxT2PPreTransition}_{PS,TM},\\ \text{TxT2PPostTransition}_{PS,TM}) \leq \text{TxT2Pmax} \qquad (10).$$

In some embodiments, the power level 422 of a packet 524 is permitted to transition from a first value to a second value at some point during the transmission of the packet 524. In such embodiments, the power level 2322 that is specified in the power profile 2380 includes a pre-transition value and a post-transition value. $\text{TxT2PPreTransition}_{PS,TM}$ is the pre-transition value for payload size PS and transmission mode TM. $\text{TxT2PPostTransition}_{PS,TM}$ is the post-transition value for payload size PS and transmission mode TM. TxT2Pmax is a maximum power level that is defined for the AT 206, and may be a function of the PilotStrength measured by the AT 206. PilotStrength is a measure of the serving sector pilot power versus the pilot power of the other sectors. In some embodiments, it is the ratio of serving sector FL pilot power to the pilot power of the other sectors. It may also be used to control the up and down ramping that the AT 206 performs autonomously. It may also be used to control TxT2Pmax, so that ATs 206 in poor geometries (e.g., at the edge of sectors) may restrict their maximum transmit power, to avoid creating unwanted interference in other sectors. In an embodiment, this may be achieved by adjusting the gu/gd ramping based on the forward link pilot strength.

In some embodiments, the data condition 2488 is that there is not a payload size 2320 in the power profile 2380 that corresponds to a lower power level 2322 for the transmission mode of the packet 524 and that is capable of carrying a payload of size given by:

$$\Sigma_{i \in F} \min(d_{i,n}, \text{T2PConversionFactor}_{TM} \times \text{PotentialT2POutflow}_{i,TM}) \qquad (11).$$

In Equation (11), $d_{i,n}$ is the amount of data from flow i (2616) that is included in the sub-packet that is transmitted during sub-frame n. The expression $\text{T2PConversionFactor}_{TM} \times \text{PotentialT2POutflow}_{i,TM}$ is the transmittable data for flow i, i.e., the amount of data that the total available power 1034 for the AT 2406 corresponds to.

T2PConversionFactor$_{TM}$ is a conversion factor for converting the total available power 1238 for flow i (2616) into a data level.

Figure 25:
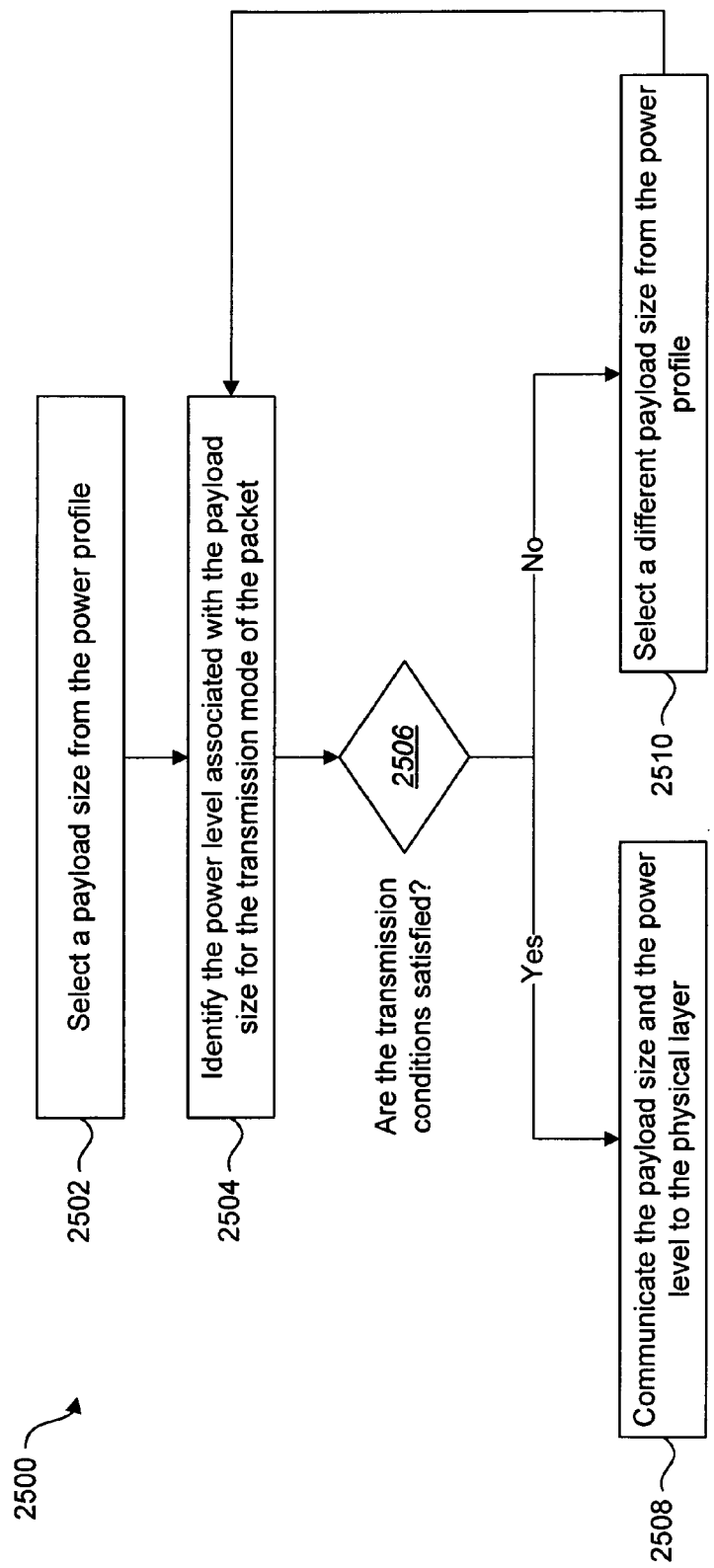
FIG. 25 is a flow diagram illustrating an exemplary method that the access terminal may perform in order to determine the payload size and the power level for a packet.

FIG. 25 illustrates an exemplary method 2500 that the AT 206 may perform in order to determine the payload size 420 and the power level 422 for a packet 524. Step 2502 involves selecting a payload size 2320 from the power profile 2380. Step 2504 involves identifying the power level 2322 associated with the selected payload size 2320 for the transmission mode of the packet 524. For example, if the packet 524 is going to be transmitted in high capacity mode, then step 2504 involves identifying the high capacity power level 2322a associated with the selected payload size 2320. Conversely, if the packet is going to be transmitted in low latency mode, then step 2504 involves identifying the low latency power level 2322b associated with the selected payload size 2320.

Step 2506 involves determining whether the transmission conditions 2482 are satisfied if the packet 524 is transmitted with the selected payload size 2320 and the corresponding power level 2322. If it is determined that the transmission conditions 2482 are satisfied at step 2506, then at step 2508 the selected payload size 2320 and the corresponding power level 2322 are communicated to the physical layer 312.

If it is determined that the transmission conditions 2482 are not satisfied at step 2506, then at step 2510 a different payload size 2320 is selected from the power profile 2380. The method 2500 then returns to step 2504 and proceeds as described above.

The underlying design mechanism associated with multiflow allocation is that the total power available is equal to the sum of the power available for each flow in the access terminal 2606. Such may work well up to the point that the access terminal 2606 itself runs out of transmit power, either due to hardware limits (PA headroom limited), or due to TxT2Pmax limits. When transmit power is limited, further arbitration of flow power allocation in the access terminal 2606 is necessary. As discussed above, when there are no power limits, the gu/gd demand function determines each flow's current power allocation through normal function of the RAB and flow ramping.

In situations where AT 2606 power is limited, one method to set flow 2616 allocation is to consider the AT 2606 power limit as strictly analogous to the sector power limit. Generally the sector has a max receive power criterion that is used to set the RAB, which then leads to each flow's power allocation. The idea is that when the AT 2606 is power limited, each flow in that AT 2606 is set to the power allocation that it would receive if the AT's 2606 power limit were actually the corresponding limit of the sector's received power. This flow power allocation may be determined directly from the gu/gd demand functions, either by running a virtual RAB inside the AT 2606, or by other equivalent algorithms. In this way, intra-AT 2606 flow priority is maintained and is consistent with inter-AT 2606 flow priority. Further, no information beyond the existing gu and gd functions is necessary.

A summary of various features of some or all of the embodiments described herein will now be provided. The system allows for a decoupling of the mean resource allocation (T2PInflow 2635) and how this resource is used for packet allocation (including control of peak rate and peak burst duration).

Packet 524 allocation may remain autonomous in all cases. For mean resource allocation, either scheduled or autonomous allocation is possible. This allows seamless integration of scheduled and autonomous allocation, as the packet 524 allocation process behaves the same in both cases, and mean resource may be updated as often or not as desired.

Control of hold time in the grant message allows precise control of resource allocation timing with minimal signaling overhead.

BucketLevel control in the grant message allows for a quick injection of resource to a flow without affecting its mean allocation over time. This is a kind of 'one-time use' resource injection.

The scheduler 2640 may make an estimate of the 'fixed-point', or the proper resource allocation for each flow 2616, and then download these values to each flow 2616. This reduces the time for the network to get close to its proper allocation (a 'coarse' allocation), and then the autonomous mode rapidly achieves the ultimate allocation (the 'fine' allocation).

The scheduler 2640 may send grants to a subset of the flows 2616, and allow the others to run autonomous allocation. In this way, resource guarantees may be made to certain key flows, and then the remaining flows then autonomously 'fill-in' the remaining capacity as appropriate.

The scheduler 2640 may implement a 'shepherding' function where transmission of a grant message only occurs when a flow is not meeting QoS requirements. Otherwise, the flow is allowed to autonomously set its own power allocation. In this way, QoS guarantees may be made with minimal signaling and overhead. Note that in order to achieve a QoS target for a flow, the shepherding scheduler 2640 may grant a power allocation different from the fixed-point solution of the autonomous allocations.

The AN 2604 may specify per-flow design of the ramping functions, up and down. Appropriate choice of these ramping functions allows precise specifying of any per-flow 2616 mean resource allocation with purely autonomous operation only, using 1-bit of control information in each sector.

The very rapid timing implied in the QRAB design (updated every slot and filtered with a short time constant at each AT 2606) allows for very tight control of each flow's power allocation, and maximizes overall sector capacity while maintaining stability and coverage.

Per-flow 2616 control of the peak power is allowed as a function of the mean power allocation and the sector loading (FRAB). This allows for trading off timeliness of bursty traffic with the effect on overall sector 1432 loading and stability.

Per-flow 2616 control of the max duration of transmission at the peak power rate is allowed, through the use of BurstDurationFactor. In conjunction with the peak rate control, this allows for control of sector 1432 stability and peak loading without central coordination of autonomous flow allocation, and allows for tuning requirements to specific source types.

Allocation to bursty sources is handled by the bucket mechanism and persistence of T2PInflow 2635, which allows for mapping of the mean power allocation to bursty source arrivals while maintaining control of the mean power. The T2PInflow 2635 filter time constant controls the persistence time over which sporadic packet 524 arrivals are allowed, and beyond which T2PInflow 2635 decays to a minimal allocation.

The dependence of T2PInflow 2635 ramping on FRAB 1548 allows for higher ramping dynamics in less loaded sectors 1432, without affecting the final mean power allocation. In this way aggressive ramping may be implemented when a sector is less loaded, while good stability is maintained at high load levels by reducing ramping aggressiveness.

T2PInflow 2635 is self-tuning to the proper allocation for a given flow 2616 via autonomous operation, based on flow priority, data requirements, and available power. When a flow 2616 is over-allocated, the BucketLevel reaches the BucketLevelSat value or level 2635, the up-ramping stops, and the T2PInflow 2635 value will decay down to the level at which BucketLevel is less than BucketLevelSat 2635. This is then the appropriate allocation for T2PInflow 2635.

Besides the per-flow QoS differentiation available in autonomous allocation based on up/down ramping function design, it is also possible to control flow 2216 power allocation based on channel conditions, via QRAB or QRABps and the dependency of ramping on PilotStrength. In this way flows 2616 in poor channel conditions may get lower allocation, reducing interference and improving the overall capacity of the system, or may get full allocation independent of channel condition, which maintains uniform behavior at the expense of system capacity. This allows control of the fairness/general welfare tradeoff.

As far as possible, both inter-AT 2606 and intra-AT 2606 power allocation for each flow 2216 is as location-independent as possible. This means that it doesn't matter what other flows 2616 are at the same AT 2606 or other AT's 2606, a flow's 2216 allocation only depends on the total sector loading. Some physical facts limit how well this goal may be attained, particularly the max AT 2606 transmit power, and issues about merging high capacity (HiCap) and low latency (LoLat) flows 2616.

In keeping with this approach, the total power available for an AT 2606 packet allocation is the sum of the power available to each flow in the AT 2606, subject to the AT's 2606 transmit power limitation.

Whatever rule is used to determine data allocation from each flow 2216 included in a packet allocation, precise accounting of the flow's 2216 resource usage is maintained in terms of bucket withdrawal. In this way, inter-flow 2216 fairness is guaranteed for any data allocation rule.

When the AT 2606 is power limited and can't accommodate the aggregate power available to all its flows 2616, power is used from each flow appropriate to the lesser power available within the AT 2606. That is, the flows within the AT 2606 maintain the proper priority relative to each other, as though they were sharing a sector with just those AT's 2606 and that max power level (the AT 2606 power limit is analogous to the power limit of the sector as a whole). The power remaining in the sector not used up by the power-limited AT 2606 is then available for the other flows 2616 in the sector as usual.

High capacity flows 2216 may be merged into low latency transmissions when the sum of high capacity potential data usage in one AT 2606 is high enough that not merging would lead to a large power differential across packets 524. This maintains smoothness in transmitted power appropriate to a self-interfering system. High capacity flows 2216a may be merged into low latency transmissions when a specific high capacity flow 2216a has delay requirements such that it can't wait for all low latency flows 2216b in the same AT 2606 to transmit, then upon reaching a threshold of potential data usage, the flow may merge its data into low latency transmissions. Thus, delay requirements for high capacity flows 2216a may be met when sharing an AT 2606 with persistent low latency flows 2216b. High capacity flows may be merged into low latency transmissions when a sector is lightly loaded, the efficiency loss in sending high capacity flows 2216a as low latency is not important, and hence merging may always be allowed.

A set of high capacity flows 2216a may be transmitted in low latency mode even if there are no active low latency flows 2216b, when the packet size for high capacity mode would be at least PayloadThresh in size. This allows for high capacity mode flows to achieve the highest throughput when their power allocation is high enough, as the highest throughput for an AT 2606 occurs at the largest packet 524 size and low latency transmission mode. To say it another way, the peak rate for high capacity transmission is much lower than that of low latency transmission, so a high capacity mode flow 2216a is allowed to use low latency transmission when it is appropriate that it achieves the highest throughput.

Each flow 216 has a T2Pmax parameter which restricts its maximum power allocation. It may also be desirable to restrict an AT's 2606 aggregate transmit power, perhaps dependent on its location in the network (e.g., when at the boundary of two sectors an AT 2606 creates added interference and affects stability). The parameter TxT2Pmax may be designed to be a function of PilotStrength, and limits the AT's 2606 maximum transmit power.

Figure 26:
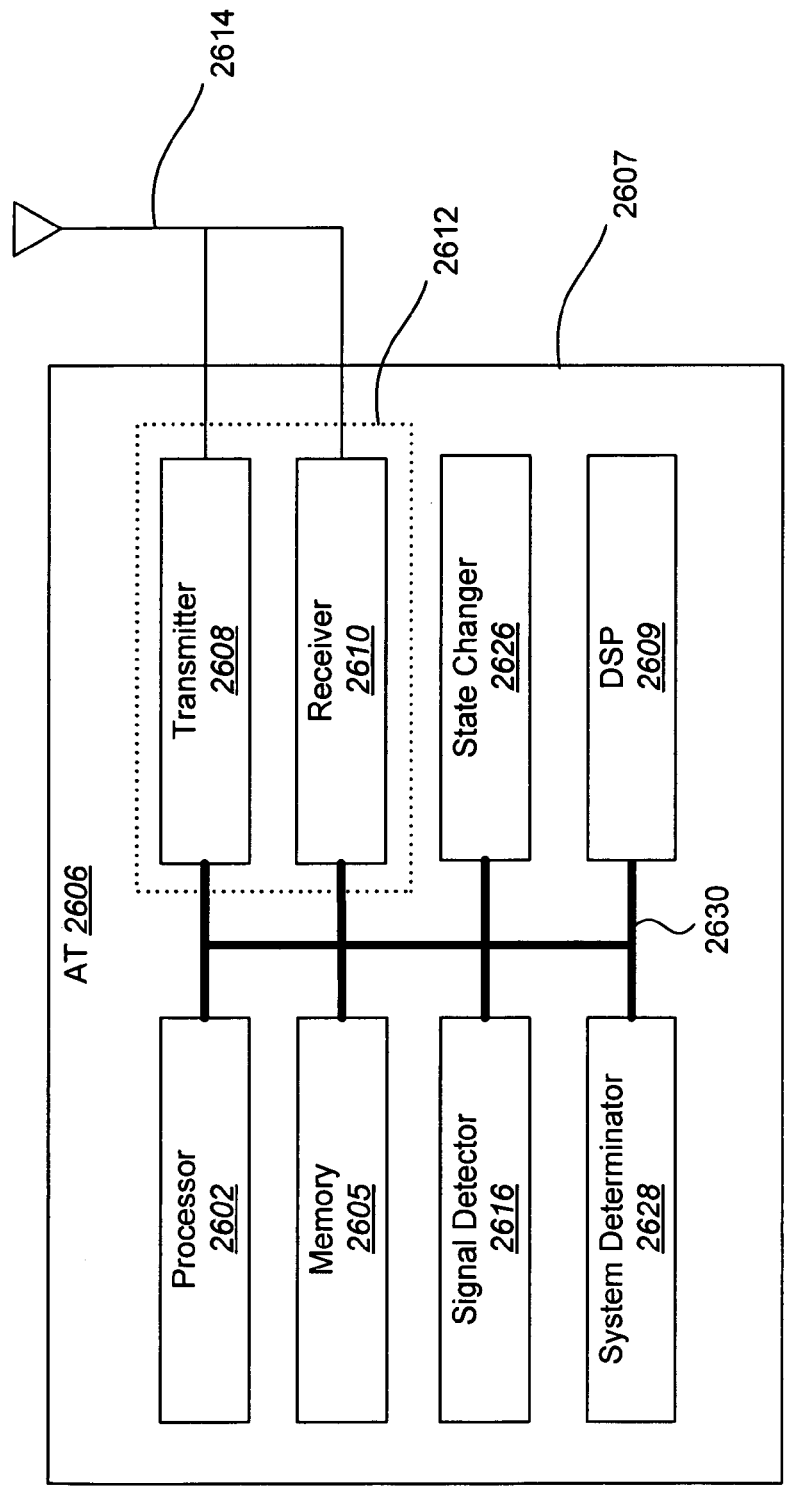
FIG. 26 is a functional block diagram illustrating an embodiment of an access terminal.

FIG. 26 is a functional block diagram illustrating an embodiment of an AT 2606. The AT 2606 includes a processor 2602 which controls operation of the AT 2606. The processor 2602 may also be referred to as a CPU. Memory 2605, which may include both read-only memory (ROM) and random access memory (RAM), provides instructions and data to the processor 2602. A portion of the memory 2605 may also include non-volatile random access memory (NVRAM).

The AT 2606, which may be embodied in a wireless communication device such as a cellular telephone, may also include a housing 2607 that contains a transmitter 2608 and a receiver 2610 to allow transmission and reception of data, such as audio communications, between the AT 2606 and a remote location, such as an AN 2604. The transmitter 2608 and receiver 2610 may be combined into a transceiver 2612. An antenna 2614 is attached to the housing 2607 and electrically coupled to the transceiver 2612. Additional antennas (not shown) may also be used. The operation of the transmitter 2608, receiver 2610 and antenna 2614 is well known in the art and need not be described herein.

The AT 2606 also includes a signal detector 2616 used to detect and quantify the level of signals received by the transceiver 2612. The signal detector 2616 detects such signals as total energy, pilot energy per pseudonoise (PN) chips, power spectral density, and other signals, as is known in the art.

A state changer 2626 of the AT 2606 controls the state of the wireless communication device based on a current state and additional signals received by the transceiver 2612 and detected by the signal detector 2616. The wireless communication device is capable of operating in any one of a number of states.

The AT 2606 also includes a system determinator 2628 used to control the wireless communication device and determine which service provider system the wireless communication device should transfer to when it determines the current service provider system is inadequate.

The various components of the AT 2606 are coupled together by a bus system 2630 which may include a power bus, a control signal bus, and a status signal bus in addition to a data bus. However, for the sake of clarity, the various busses are illustrated in FIG. 26 as the bus system 2630. The AT 2606 may also include a digital signal processor (DSP)

2609 for use in processing signals. One skilled in the art will appreciate that the AT 2606 illustrated in FIG. 6 is a functional block diagram rather than a listing of specific components.

Multi-Carrier, Multi-Flow, Reverse Link Medium Access Control

Embodiments described above may be related to a single-carrier systems where a RLMAC bucket may be used for each flow 2216 to police and control access in the T2P domain. Various devices and processes described herein may also be implemented in a multi-carrier, multi-flow system, where each access terminal may transmit pilot, overhead and traffic signals, separately or together, on multiple carriers (e.g., frequency bands). For example, if a carrier has a frequency band of 1.25 MHz (megahertz), a 5 MHz frequency band may include 3 or 4 carriers.

In one multi-carrier embodiment, an AT 2606 may have multiple application flows 2216 running concurrently. These application flows may map to MAC layer flows in the AT 2606, where the mapping may be controlled by an AN 2604 (e.g., under centralized control). The AT 2606 may have a maximum total amount, of power available for transmission across all the assigned carriers. The MAC at the AT 2606 determines the amount of power to be allocated for transmission to each flow 2616 on each assigned carrier, so as to satisfy various constraints, such as the QoS constraints of the flow 2216 (e.g., delay, jitter, error rate, etc.), the loading constraints of the network (e.g., RoT, load in each sector, etc.), and so on.

The MAC may be designed such that the AN 2604 determines a centralized set of parameters, some of which are flow-dependent while others are carrier-dependent, while the AT 2606 determines the per-physical-layer-packet power allocation for each flow 2216 in each carrier. Depending on various design goals, the AN 2604 may choose to control the flow 2216 allocations, for flows residing in the same AT 2606 as well as for flows 2216 residing in different ATs 2606, across different carriers in the network by determining an appropriate set of centralized parameters.

Policine Data Flow in a Multi-Carrier System

Figure 27:
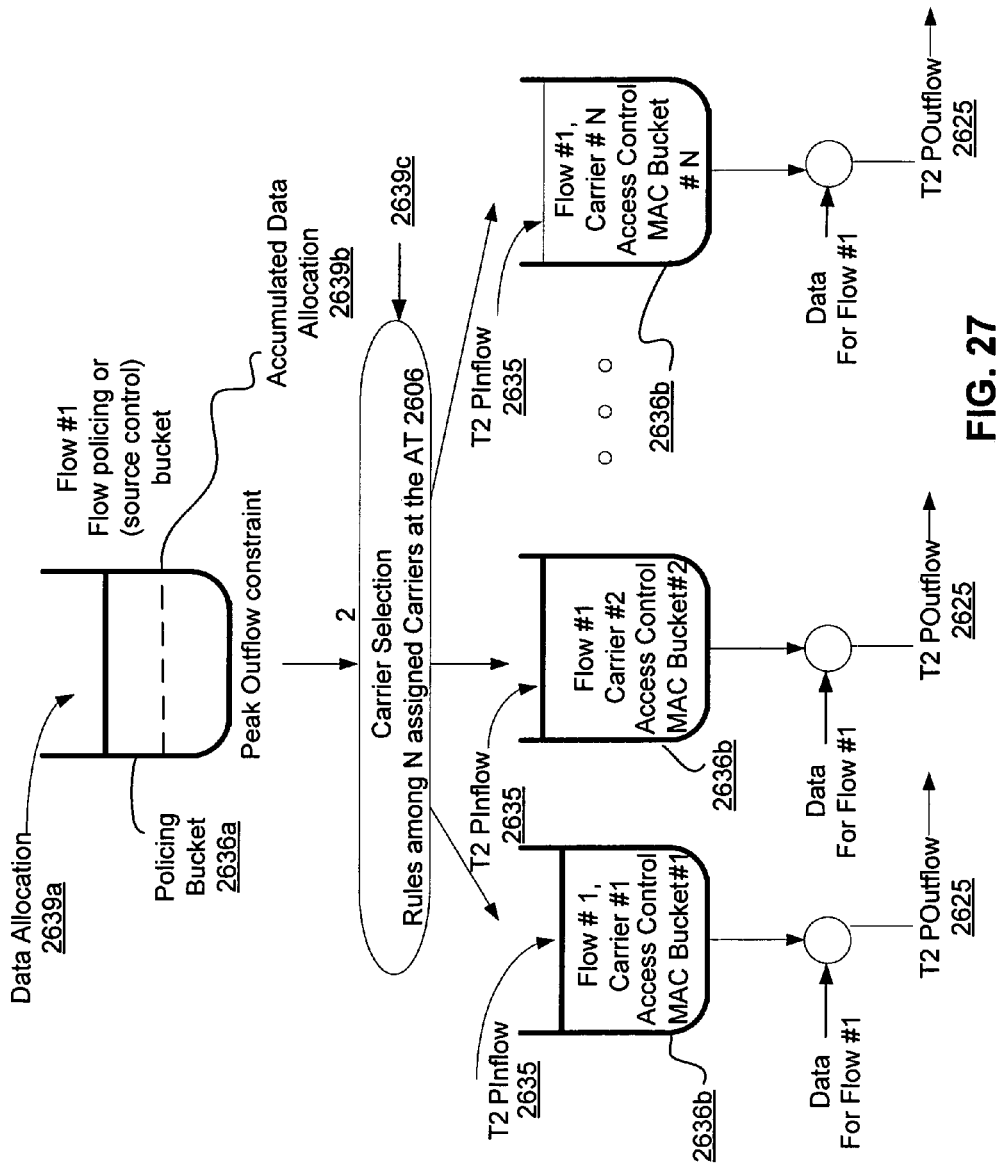
FIG. 27 illustrates an example of decoupling flow access control from flow data policing at the access terminal by using two separate sets of token buckets for each MAC layer flow.

When an AT 2606 is assigned multiple RL carriers, the data flow 2216 access control in each RL carrier assigned to the AT 2606 is decoupled from flow 2216 data policing at the AT 2606 by using two separate sets of token buckets for each MAC layer flow 2216, such as illustrated in FIG. 27. (This may differ from the single-carrier embodiment in which flow 2216 access control and flow 2216 data policing are coupled by a single bucket mechanism). The data generated by an application flow 2216 is first regulated by a policing token bucket 2636a defined in the data domain (for policing of the data flow 2216). In an embodiment, there is a single policing function per flow 2216. The policing function ensures that average and peak resources utilized by a flow 2216 is less than or equal to a limit. In an embodiment, the flow 2216 (or AT 2606) may not abuse the additional allocation in a multi-carrier system and the policing is performed in the data domain.

Figure 28:
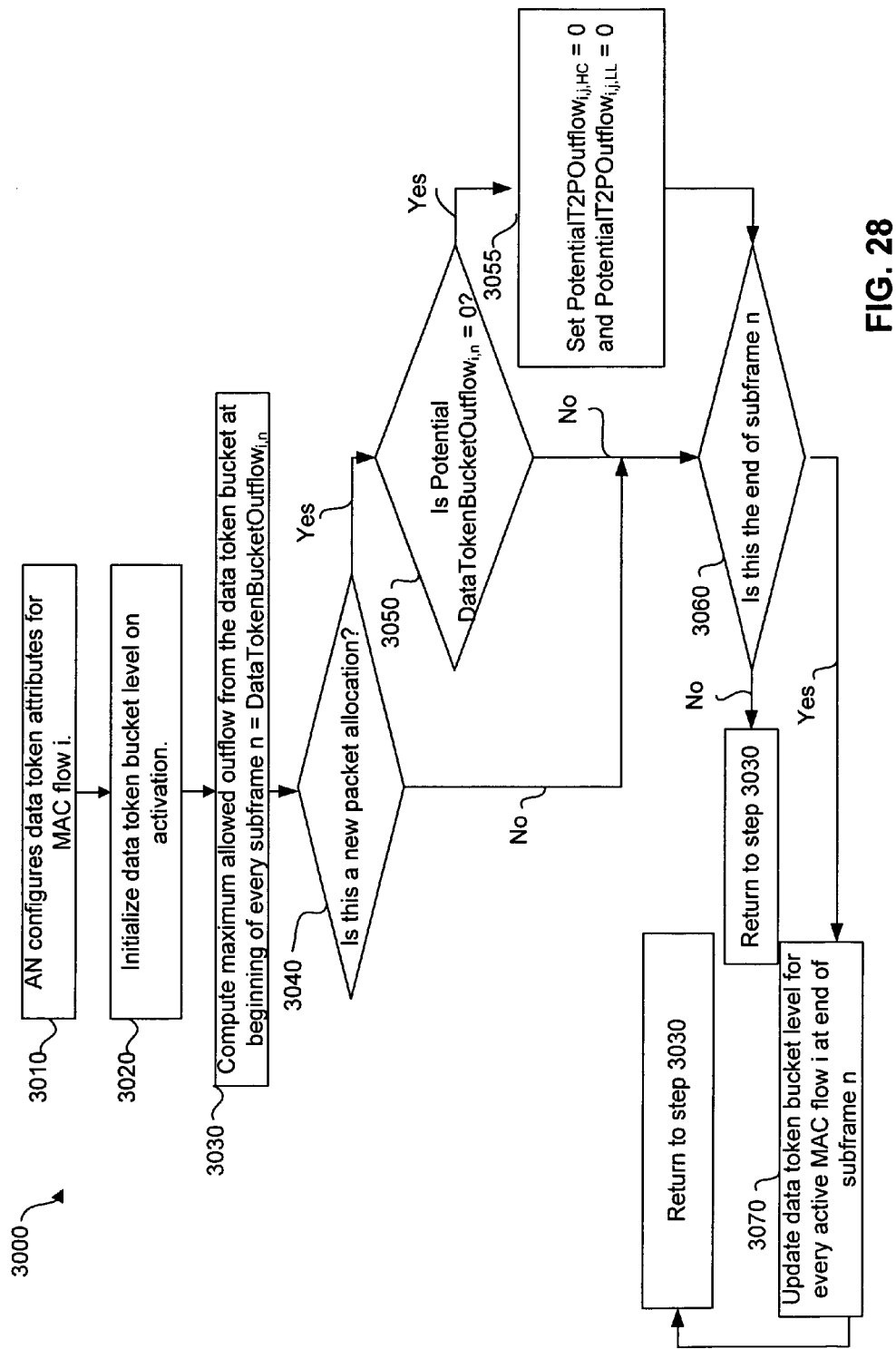
FIG. 28 is a flowchart illustrating the steps executed when policing flow data in the RTC MAC layer.

The following steps shown in FIG. 28 are executed when policing flow 2216 data in the RTC MAC layer. To begin with, the AN 2604 configures the following data token bucket attributes (step 3010):

DataBucketLevelMax$_i$=Data token bucket 2636a maximum size for MAC flow i (2216) (in Octets).

DataTokenInflow$_i$=Data token inflow into the policing bucket 2636a per subframe (in Octets) for MAC flow i (2216).

DataTokenOutflow$_i$=Data token outflow out of the policing bucket 2636a per subframe (in Octets) for MAC flow i (2216).

Next, the data token bucket (or policing bucket 2636a) level, DataTokenBucketlevel$_i$, is initialized on activation for MAC flow i (2216) by setting it to a maximum bucket level, DataBucketLevelMax$_i$, (step 3020), which may expressed as:

$$\text{DataTokenBucketlevel}_i = \text{DataBucketLevelMax}_i \quad (12).$$

Subsequently, at the beginning of every subframe n, compute a maximum allowed outflow from the data token bucket (or policing bucket) 2636a for every active MAC flow i (2216) and set the total available power for the policing bucket 2636a equal to either to this maximum value or zero if this maximum value is negative (step 3030). The total available power for the data outflow of the policing bucket 2636a may be expressed as:

$$\text{PotentialDataTokenBucketOutflow}_{i,n} = \max(\text{DataTokenInflow}_i + \text{DataTokenBucketLevel}_{i,n}, 0) \quad (13),$$

where i represents the MAC flow 2216, n represents the subframe, DataTokenInflow$_i$ represents the is the current data allocation 2639a for flow i (2216) and DataTokenBucketLevel$_{i,n}$ is the accumulated data allocation 2639b for data flow i (2216) at subframe n.

Next, determine if this a new packet allocation (step 3040). If the answer to step 3040 is no, then go to step 3060. If the outcome of step 3040 is yes, then execute the following step 3050 during new packet allocation in every assigned carrier j at subframe n. If the total available data of the policing bucket 2639a for flow i (2216), subframe n, PotentialDataTokenBucketOutflow$_{i,n}$, equals zero (step 3050), which may be expressed as:

$$\text{PotentialDataTokenBucketOutflow}_{i,n} = 0 \quad (14).$$

Subsequently, set the total available power 1238 for the ith flow on the jth carrier for high capacity packets 524a, PotentialT2POutflow$_{i,j,HC}$ equal to zero and the total available power 1238 for the ith flow (2216) on the jth carrier for low latency packets 524a, PotentialT2POutflow$_{i,j,LL}$ equal to zero (step 3055). These equalities may be expressed as:

$$\text{PotentialT2POutflow}_{i,j,HC} = 0 \quad (15)$$

$$\text{PotentialT2POutflow}_{i,j,LL} = 0 \quad (16),$$

where i represents the MAC flow 2216, j represents the jth carrier, n represents the subframe, HC represents High Capacity and LL represents Low Latency.

If the outcome of step 3050 is no, then go to step 3060. This ensures that the power allocated to a flow in every assigned RL carrier at the AT is set to zero when the flow exceeds the data bucket allocation.

Next, it is determined if this is the end of a subframe n (step 3060). If the answer to step 3060 is no, then return to step 3030. If the answer to step 3060 is yes, then at the end of every subframe n, update the data token bucket level for every active MAC flow i (2216) by setting the data token bucket level for frame n+1 equal to the minimum of the current data allocation 2639a for flow i (2216), DataTokenInflow$_i$, plus the accumulated data allocation 2639b for data flow i (2216) at subframe n (2216), DataTokenBucketLevel$_{i,n}$, minus the number of octets from MAC flow i (2216) contained in the payload in all carriers j at subframe n, $\Sigma_{j \in C} d_{i,j,n}$, or the data token bucket 2636a maximum size for flow i (2216), DataBucketLevelMax$_i$ (step 3070). This may be expressed as:

$$\text{DataTokenBucketLevel}_{i,n+1} = \min(\text{DataTokenInflow}_i + \text{DataTokenBucketLevel}_{i,n} - \Sigma_{j \in C} d_{i,j,n}, \text{DataBucketLevelMax}_i) \quad (17)$$

where $d_{i,j,n}$=number of octets from MAC flow i (2216) contained in the payload in carrier j at subframe n, C=set of all carriers assigned to the AT 2606, $\Sigma_{j \in C} d_{i,j,n}$ is the number of octets from MAC flow i (2216) contained in the payload in all carriers j at subframe n, DataTokenInflow$_i$ is the current data allocation 2639a for flow i (2216), DataTokenBucketLevel$_{i,n}$ is the accumulated data allocation 2639b for data flow i (2216) at subframe n, and DataBucketLevelMax$_i$ is the data token bucket 2636a maximum size for flow i (2216). Return to step 3030.

The output of this data-domain token bucket 2636a is then regulated by a second set of token buckets 2636b which is defined in the T2P or power domain. These second buckets, or flow access buckets 2636b, determine the potential allowed transmission power for each MAC flow 2216 in each assigned carrier. Thus, each of the second buckets 2636b represents an assigned carrier and the flow 2216 located on the carrier. Thus, under multi-carrier, flow 2216 access is controlled on a per carrier basis in which the number of assigned RLMAC buckets may be set equal to the number of carriers assigned to each flow 2216.

FIG. 27 illustrates an example of decoupling flow policing from access control in which data is first placed into a flow policing (or source control) bucket 2636a for that flow 2616, and then, subject to a peak outflow constraint, allocated to the different carriers using a set of carrier selection rules 2639c that, in one embodiment, may be stored in memory as instructions which may be executed by a processor or processor means. Each of the N carriers has its own access control bucket 2636b labeled 1 through N which correspond to the 1 through N carriers. Thus, the number of buckets 2636b may be set equal to the number of assigned carriers for each flow 2216.

The final power allocation for each flow 2216 in each carrier is then determined by using the output of the second T2P domain based token bucket 2636b, and a set of rules as defined below.

Carrier Selection Policy at the AT 2606

The AT 2606 ranks all assigned carriers based on a metric. In an embodiment, the average transmit power of the pilot signal of the AT 2606 (TxPilotPower) may be used as a carrier ranking metric. If the carrier with the lowest average TxPilotPower is unavailable for a new packet allocation at a given subframe, then use other lower ranked carriers. The filter time constant for averaging TxPilotPower has the following effect—the AT 2606 can gain from exploiting short term fading variations by using a small filter time constant. On the other hand, a longer time constant reflects long time variations in total interference seen by the AT 2606 in each assigned RL carrier. Note that average FRAB 1548 or a function of average TxPilotPower and average FRAB 1548 are also possible metrics. The AT 2606 allocates packets on each carrier based on their ranking until the AT 2606 runs out of data, PA headroom, or carriers. The multi-carrier RTC MAC of the present method and apparatus may iterate (add or drop) over assigned carriers based on their ranking until the AT 2606 is out of data or out of PA headroom.

A signal-to-noise ratio (SNR) may also be used as a metric. The AT 2606 achieves load balancing by favoring carriers with lower interference. The AT 2606 transmits over a subset of assigned carriers in order to operate in a more $E_b/N_0$ efficient mode to minimize the energy required per transmitted bit summed over all the assigned carriers for the same achieved data rate.

Another metric that may be used is interference. The AT 2606 exploits frequency selective fading across assigned carriers to get multi-frequency diversity gain when possible by favoring power allocation to carriers with lower interference measured over a small time scale. The AT 2606 tries to maximize the number of bits transmitted per unit power by favoring power allocation (or first allocating power) to carriers with lower interference measured over a large time scale. Alternatively, the AT 2606 achieves interference efficient transmission by minimizing the transmit power for a given packet 524 size and termination target when possible by appropriately choosing the carriers.

The interference seen by the AT 2606 on each said assigned carrier may be indirectly measured by measuring a transmit pilot power or a reverse activity bit. These two metrics can be averaged over a time scale. The time scale determines the trade-off between reacting to noisy metrics due to lesser averaging, versus, reacting to overly smoothened metrics due to over filtering.

In another embodiment, the AT 2606 may rank all assigned carriers using a combination of metrics including, but not limited to, the metrics discussed above.

AT 2606 may decide to drop a carrier based on PA headroom, and maybe data considerations. In one embodiment, the AT 2606 chooses the carrier with highest TxPilotPower (averaged over some time period) to drop.

Transmitting across a number of assigned carriers in an $E_b/N_0$ efficient mode comprises for the same total data rate of the access terminal, transmitting across a greater number of carriers using packet sizes for which the energy required per bit in the linear region is favored, as opposed to transmitting in a lesser number of carriers using packet sizes for which energy required per bit is in the non-linear (convex) region.

The MAC layer achieves load balancing across carriers with AN 2604-AT 2606 cooperation. The load balancing time scale can be broken down into two parts—short term load balancing and long term average load balancing. ATs 2606 achieve short term load balancing in a distributed manner by appropriately choosing amongst assigned carriers for transmissions on a per packet basis. Examples of short term load balancing include: i) The AT 2606 water fills power across all assigned carriers when RAB 1444 or packet 524 are size limited in every assigned carrier; and ii) The AT 2606 transmits over a subset of assigned carriers when power (i.e., PA headroom) limited.

The AN 2604 achieves long term load balancing by appropriately determining the MAC parameters for flows across carriers, and by appropriately allocating carriers to ATs 2606 in the time scale of active set management and new flow arrivals. The AN 2604 controls fairness and long term power allocation for each flow 2216 in the network across each assigned carrier by appropriately determining the MAC flow 2216 parameters as discussed above.

Carrier Allocation Using Grant Messages 2642

Figure 29:
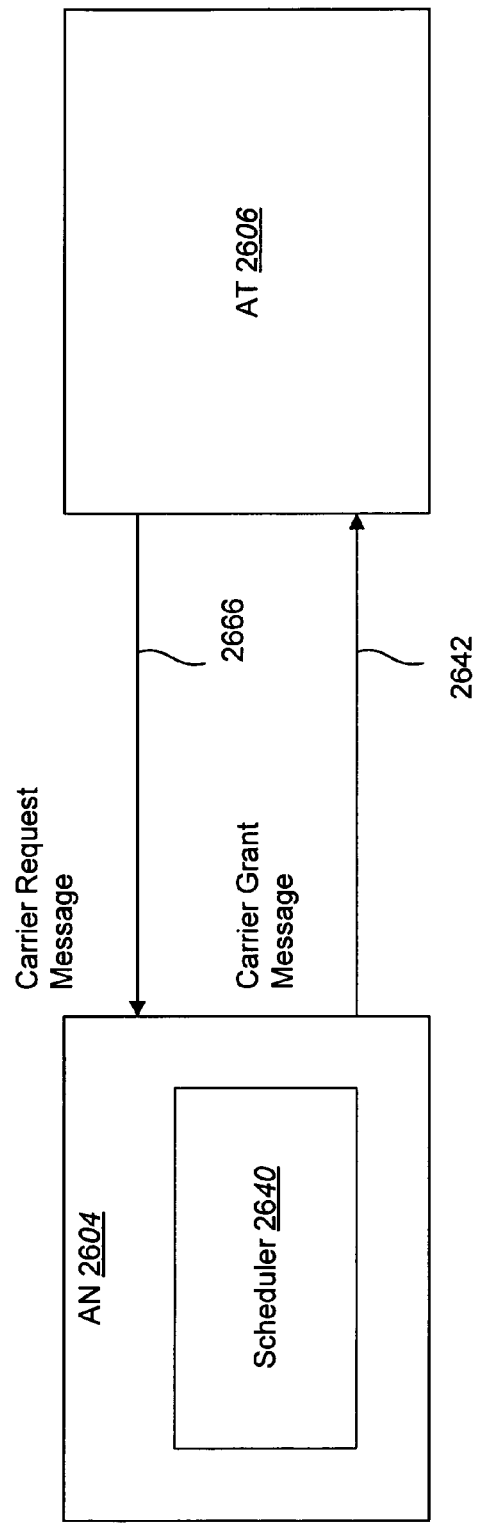
FIG. 29 is a block diagram illustrating an access terminal sending a carrier request message to a scheduler on the access network and receiving a carrier grant message.
Figure 30:
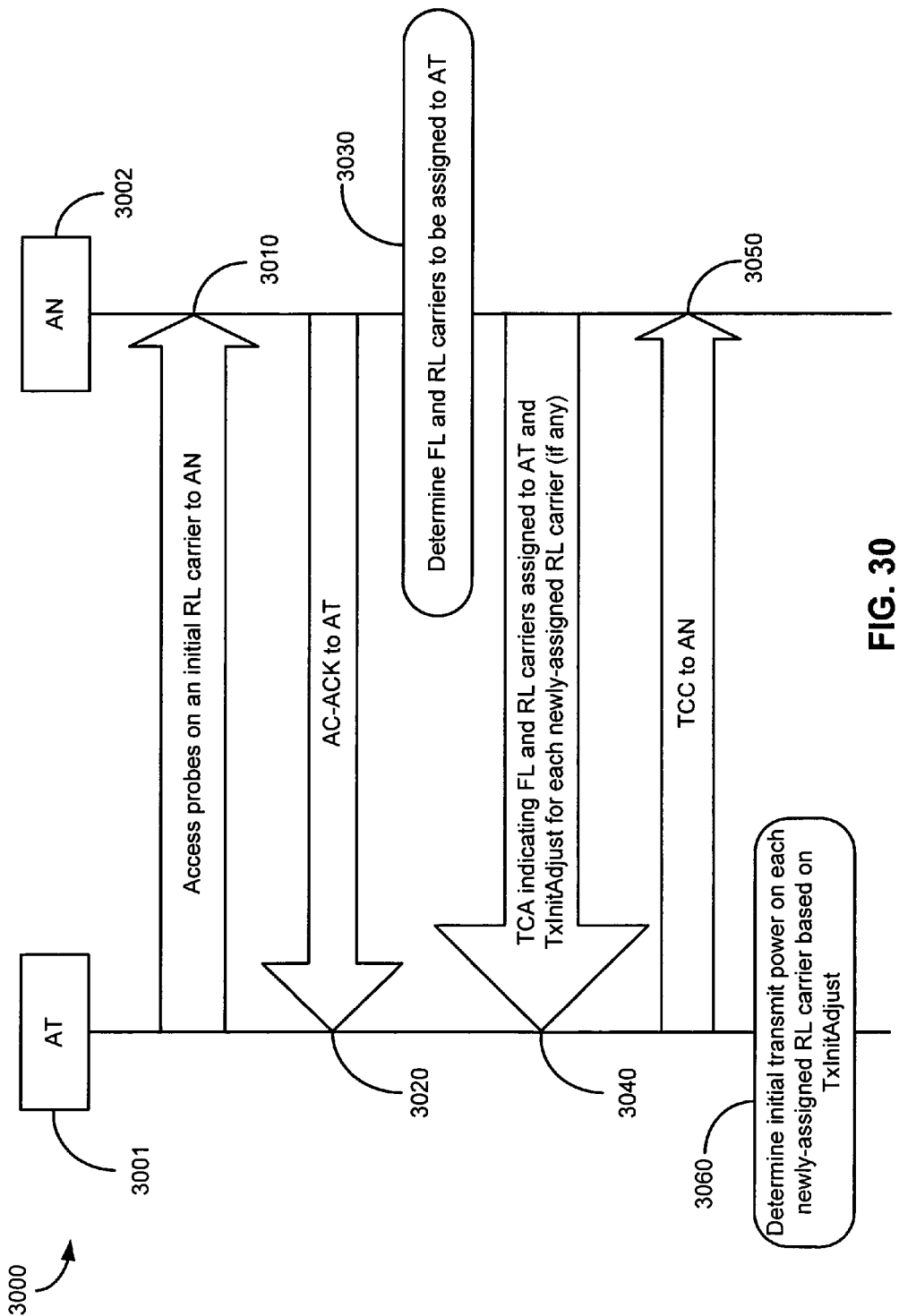
FIG. 30 shows a call flow diagram, illustrating an example of carrier allocation and management in a multi-carrier communication.

FIG. 29 illustrates an embodiment involving centralized control in which the AT 2606 sends a carrier request message 2666 to the scheduler 2640 on the AN 2604. FIG. 30 also illustrates the scheduler 2640 sending a carrier grant message 2642 to the AT 2606. The AN 2604 and AT 2606 may cooperate to find the best carrier allocation for the network using a message driven scheme. Similar to existing T2PInflow request-grant mechanism used in single carrier embodiments discussed earlier, the AT 2606 and AN 2604 use Carrier Request 2666 and Carrier Grant 2642 messages respectfully. In an AT 2606—driven mode, the AN 2604 relies on ATs 2606 requesting additional carriers when data and PA headroom justifies. In an AN 2604—driven mode, the AN 2604 may have all ATs 2606 periodically pass data, TxPilotPower, FL pilot strength and PA headroom information which the AN 2604 uses to when allocating carriers to ATs 2606. The Carrier Request 2666 and Carrier Grant 2642 messages can be asynchronous. AT 2606 may send a Carrier Request message 2666 to the AN 2604 for an increase/decrease in the number of carriers. Also, the AT 2606 can autonomously decrease the number of assigned carriers when the AT 2606 is link budget limited, but informs the AN 2604 after dropping a carrier. The AT 2606 sends a Carrier Request message 2666 to increase number of assigned carriers when data and PA headroom justify and decrease number of assigned carriers when PA headroom or data makes current number of carriers inefficient. The AT 2606 Carrier Request message 2666 may contain flow QoS requirements, average queue length, average TxPilotPower in each carrier, FL pilot strength in each carrier and PA headroom related information.

The AN 2604 may grant carriers based on AT 2606 request message information and load balancing FL overhead etc. criterions using the Carrier Grant message 2642. The AN 2604 may choose not to send a Carrier Grant message 2642 in response to a Carrier Request message 2666. The AN 2604 may increase/decrease/reassign the assigned carriers for each AT 2606 at any time using the Carrier Grant message 2642. Also, the AN 2604 may reassign carriers for each AT 2606 at any time to ensure load balancing and efficiency or based on FL requirements. The AN 2604 may decrease the number of carriers for each AT 2606 at any time. The AN 2604 may drop one carrier and assign another one for a given AT 2606 at any time—AT 2606 service is not interrupted when other carriers are enabled at the AT 2606 during the switching process. The ATs 2606 follow AN 2604 carrier grants 2642.

In one embodiment, the flow access control per carrier may be performed using priority functions. The per carrier allocation is similar to that used for single carrier systems and may be the same across all carriers. As the number of carriers assigned to a terminal changes, it is not required to change the RTC MAC bucket parameters.

As with the single carrier embodiments, the ramping rate on each carrier is limited by the maximum permissible interference.

Carrier Allocation and Management

In multi-carrier systems, the number of carriers assigned to an AT on the forward link (FL) may be determined by an AN, e.g., based on the AN's information of data and QoS requirements associated with the AT on the FL. The number of carriers assigned to the AT on the reverse link (RL) may be based on a cooperative process between the AT and the AN, e.g., based on the AN's information of the RL load on each carrier, the AT's information of its transmit power (or power headroom), its buffer status, data and QoS requirements on the RL, etc. The number of RL carriers assigned to the AT may also be determined by the AN, e.g., in relation to the scheduling information received from the AT, as further described below.

For example, there may be multiple FL carriers and multiple RL carriers associated with an AT. The number of FL carriers may be the same as the number of the RL carriers (e.g., in a symmetric mode of operation), or different from that of the RL carrier (e.g., in an asymmetric mode of operation). There may also be a single RL carrier and multiple FL carriers associated with an AT (e.g., a special case of the asymmetric mode of operation), or a single RL carrier and a single FL carrier (e.g., a special case of the symmetric mode of operation). The allocation and management of FL and RL carriers may be carried out dynamically, as examples described below further illustrate.

In an embodiment, an AN may determine the number of FL carriers to be assigned to AT as a function of one or more carrier-allocation parameters, and send an assignment message (e.g., a traffic channel assignment (TCA) message in an IS-856 type system, or a radio bearer reconfiguration message in a W-CDMA type system) to the AT based on the determination.

A carrier-allocation parameter disclosed herein may include one of the data requirement associated with the AT on the FL (e.g., based on data queue lengths at the AN), the QoS requirement in connection with at least one flow associated with the AT on the FL (e.g., based on the QoS type or application type associated with one or more flows), the amount of RL-related overhead information to be transmitted on the FL (e.g., based on the number of RL carriers assigned to the AT), the location of the AT and intra-sector interference on the FL (which may be inferred by the AN, e.g., based on the average data rate control (DRC) value or pilot strength reported by the AT), the sector loading (or the average sector loading per carrier) on the FL (which may be estimated for example by monitoring the FL usage in the sector on a per-carrier basis), the hardware constraint associated with the AN (e.g., in relation to the AN's ability to transmit, track, and manage multiple FL carriers), etc.

The AN may also determine the number of RL carriers to be assigned to the AT, e.g., based on the scheduling information received from the AT, along with the RL-related information available at the AN (e.g., the sector loading or RoT), as further described below.

In an embodiment, an AT may transmit the scheduling information to an AN, and receive an assignment message indicating the number of carriers assigned to the AT in relation to the scheduling information.

The scheduling information disclosed herein may for example include at least one of the data requirement associated with the AT on the RL, the QoS requirement in connection with one or more flows associated with the AT on the RL (e.g., based on the QoS type or application type associated with one or more flows), the transmit power (or power headroom) available at the AT for RL transmissions (which may be determined, e.g., based on the average transmit pilot power associated with each of the RL carriers assigned to the AT), the buffer status associated with the AT (e.g., in a W-CDMA type system), the amount of FL-related overhead information to be transmitted on the RL (e.g., based on the number of FL carriers assigned to the AT), the location of the AT and the total (including intra-sector and inter-sector) interference seen by the AT on the RL, the sector loading (or average sector loading per carrier) on the RL (which the AT may determine by monitoring the RL usage in the sector on a per-carrier basis), the hardware constraint associated with the AT (e.g., the AT's ability to transmit, track, and manage multiple carriers), etc.

The scheduling information may also include the number of additional RL carriers the AT desires to have, or a subset of previously-assigned RL carriers the AT intends to drop (or has dropped). For example, the AT may determine the number of RL carriers as required as a function of one or more carrier-determination parameters, as further described below.

A carrier-determination parameter disclosed herein may include one of the data requirement associated with the AT on the RL, the QoS requirement in connection with one or more flows associated with the AT on the RL (e.g., based on the QoS type or application type associated with one or more flows), the transmit power (or power headroom) available at the AT for RL transmissions (which may be determined, e.g., based on the average transmit pilot power associated with each of the RL carriers assigned to the AT), the buffer status associated with the AT (e.g., in a W-CDMA type system), the amount of FL-related overhead information to be transmitted on the RL (e.g., based on the number of FL carriers assigned to the AT), the location of the AT and the total (including intra-sector and inter-sector) interference seen by the AT on the RL, the sector loading (or average sector loading per carrier) on the RL (which the AT may determine by monitoring the RL usage in the sector on a per-carrier basis), the hardware constraint associated with the AT (e.g., in relation to the AT's ability to transmit, track, and manage multiple carriers), etc.

The term "drop" in connection with a carrier disclosed herein may refer to stopping (or terminating) all transmissions (e.g., associated with pilot, traffic/data, and overhead channels) on the carrier.

Examples of carrier allocation and management are further described below.

In an example, an AT may initially send a plurality of access probes on a randomly-hashed RL carrier (e.g., as an attempt to uniformly distribute the RL load created by access probes from different ATs across all the available RL carriers). In response, an AN may decide to assign one or more carriers to the AT, which may be different from the carrier on which the AT previously sent the access probes, as further illustrated below.

FIG. 30 shows a call flow diagram 3000, illustrating an example of carrier allocation and management in a multi-carrier communication system. At step 3010, AT 3001 sends access probes on an initial or pre-determined RL carrier (e.g., by way of hash function) to AN 3002. At step 3020, AN 3002 sends an access channel acknowledgement (shown as "AC-ACK" herein for abbreviation and simplicity) to AT 3001, upon decoding the access probes. At step 3030, AN 3002 determines (e.g., by executing a carrier management algorithm) the number of FL and RL carriers to be assigned to AT 3001. AN 3002 may also identify the FL and RL carriers to be assigned to the AT which are different from the carrier on which AT 3001 initially probed. At step 3040, AN 3002 sends an assignment message (shown as "TCA" herein for abbreviation and simplicity) to AT 3001, indicating the FL and RL carriers assigned to AT 3001 and a reference value (termed "TxInitAjust" herein) which AT 3001 may use to determine the initial transmit pilot power on each newly-assigned RL carrier. At step 3050, AT 3001 sends an ACK to TCA (shown as "TCC" herein for abbreviation and simplicity) to AN 3002. At step 3060, AT 3001 determines the initial transmit pilot power on each newly-assigned RL carrier based on TxInitAjust.

In FIG. 30, for example, AT 3001 may initially send access probes on a first RL carrier. AN 3002 may subsequently assign a second RL carrier (different from the first RL carrier) to AT 3001, in addition to the first RL carrier. AN 3002 may also allocate the second RL carrier to AT 3001 in lieu of the first RL carrier. In such cases, AN 3002 may send TxInitAjust (e.g., included in TCA) for AT 3001 to determine the initial transmit power on the second RL carrier.

In an example, an AT may initially be assigned a single carrier on each of the FL and RL. Subsequently, more carriers need to be added on the FL and/or the RL. The trigger for adding more carriers may be initiated by the AT, e.g., in connection with a new active MAC flow with more data, and/or improved available transmit power, etc. The trigger for adding more carriers may also be initiated by the AN, e.g., in connection with the loading condition changes on the RL, and/or a new active MAC flow on the FL for the AT, etc.

Figure 31:
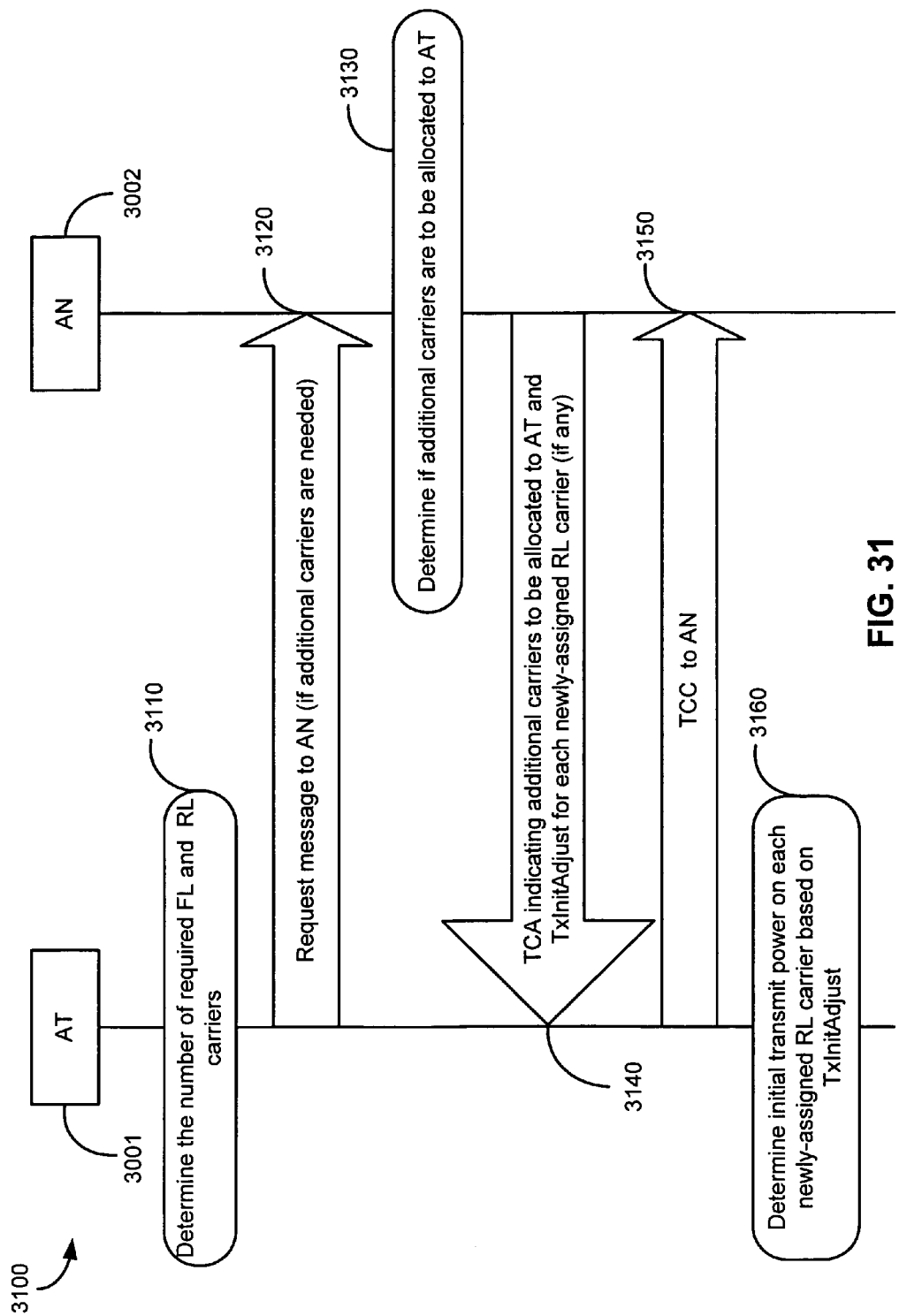
FIG. 31 shows a call flow diagram, illustrating an example of carrier allocation and management in a multi-carrier communication.

FIG. 31 shows a call flow diagram 3100, illustrating an example of adding more carriers to an AT. At step 3110, AT 3001 determines (e.g., by executing a carrier management algorithm) the number of FL and RL carriers as required. If the outcome indicates that more carriers are needed, at step 3120, AT sends a request message to AN 3002. At step 3130, AN 3002 determines if additional carriers are to be allocated to AT 3001. At step 3140, AN 3002 sends TCA to AT 3001 indicating additional carriers to be assigned to AT 3001 and TxInitAjust associated with each newly-assigned RL carrier (if any). At step 3150, AT 3001 sends TCC to AN 3002. At step 3160, AT 3001 determines the initial transmit power on each newly-assigned RL carrier based on TxInitAjust.

In the event that AN 3002 may initiate the addition of more carriers, AN 3002 may obtain the FL and RL related information from a message (e.g., a route update message in an IS-856 type system) received from AT 3001. AN 3002 may subsequently determine (e.g., by executing a carrier management algorithm) the new set of FL and RL carriers to be allocated to AT 3001. AN 3002 may further send TCA to AT 3001 indicating the new carrier assignment (along with TxInitAjust for each newly-assigned RL carrier), such as described above.

In an example, an AT may initially (or previously) be assigned multiple carriers on both the FL and the RL. The AT may subsequently decide to drop a subset of previously-assigned RL carriers. The trigger for dropping carriers at the AT may be due to various factors, including (but not limited to):

The AT is link budget limited and may not be able to successfully close the RL (in other words, successfully maintain a predetermined packet error rate on the RL) on all the assigned RL carriers. For example, due to transmit power limitations, the AT may not be able to communicate with the AN successfully on all the assigned RL carriers. This may prompt the AT to drop a subset of the previously-assigned RL carriers and use the available transmit power to communicate successfully with the AN on the remaining RL carriers.

Transmit power inefficiency exists on the RL. For example, the AT may have sufficient power to close the link and communicate with the AN; however, supporting multiple RL carriers may be inefficient in terms of the AT's power usage. In such cases, the AT may be better off by not paying the cost of the RL overhead channels being transmitted on multiple RL carriers, instead using the available power to transmit on a subset of the assigned RL carriers.

AT is data limited and may not want to pay the cost of transmitting extra overhead channels associated with the un-used RL carriers.

Figure 32:
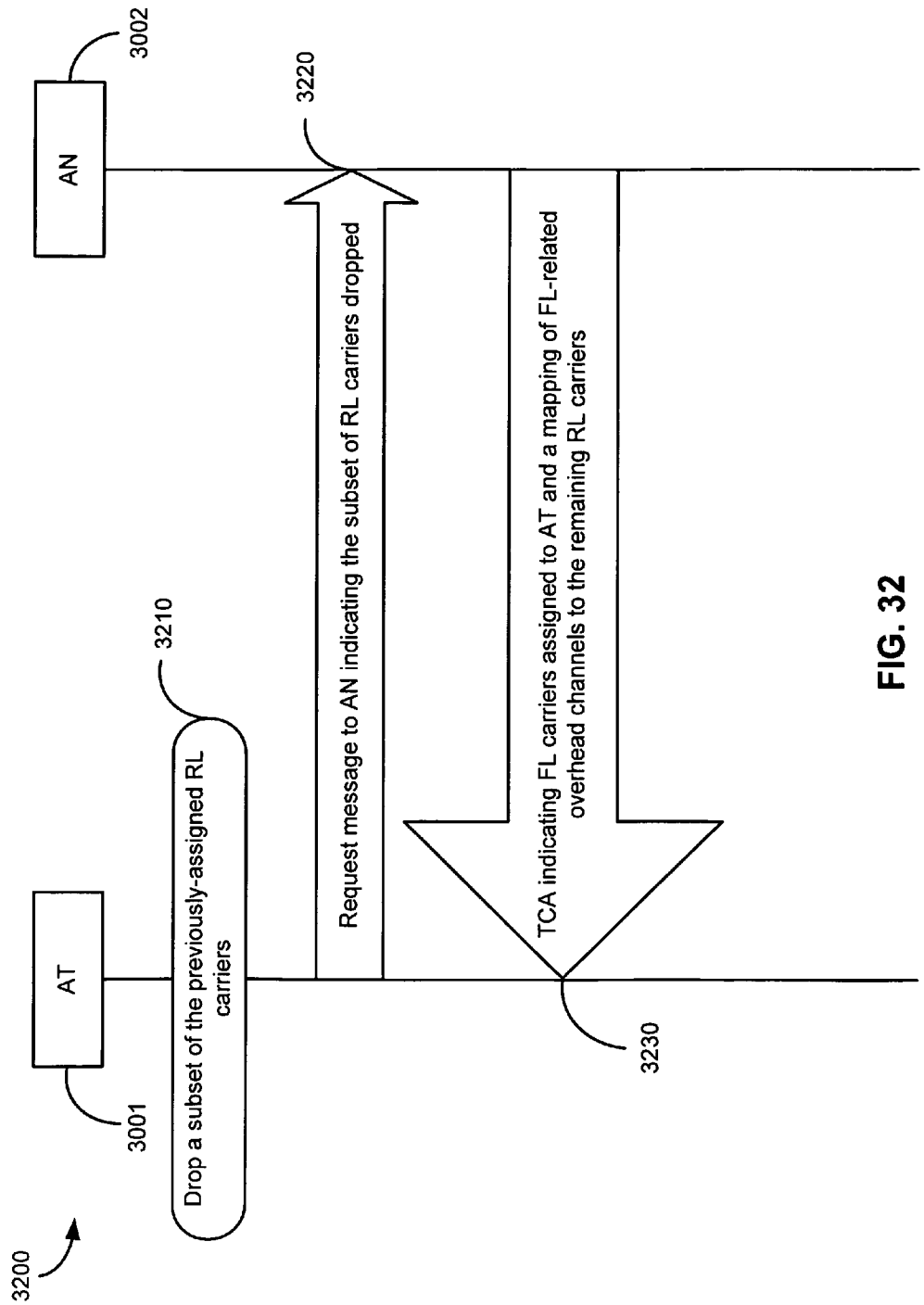
FIG. 32 shows a call flow diagram, illustrating an example of carrier allocation and management in a multi-carrier communication.

FIG. 32 shows a call flow diagram 3200, illustrating an example where a limited link budget may initiate the trigger for dropping some RL carriers. At step 3210, AT 3001 drops a subset of previously-assigned RL carriers, such that the available transmit power is sufficient to close the link successfully on one or more remaining RL carriers. At step 3220, AT 3001 sends a request message to AN 3002 indicating the subset of previously-assigned RL carriers being dropped and the underlying cause. In response, at step 3230, AN 3002 sends TCA to AT 3001 indicating the number of FL carriers assigned to the AT and a mapping of FL-related overhead channels to the remaining RL carriers associated with AT 3001.

Figure 33:
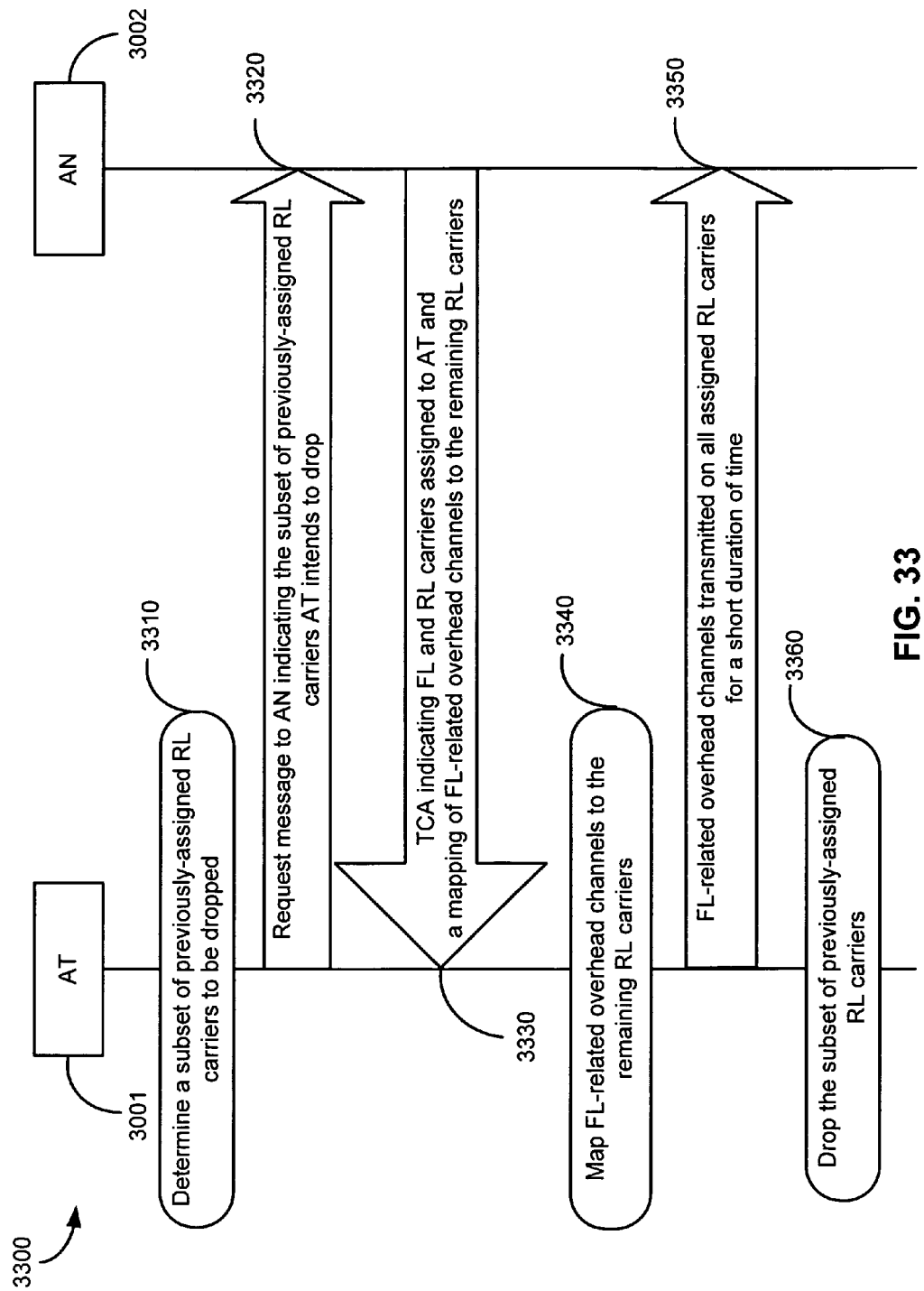
FIG. 33 shows a call flow diagram, illustrating an example of carrier allocation and management in a multi-carrier communication.

FIG. 33 shows a call flow diagram 3300, illustrating an example where the transmit power inefficiency may initiate the trigger for dropping some RL carriers. At step 3310, AT 3001 determines the number of previously-assigned RL carriers it needs to drop. At step 3320, AT 3001 sends a request message to AN 3002 indicating the number of previously-assigned RL carriers it intends to drop and the underlying cause. AT 3001 may wait for a confirmation (or verification) from AN 3002 before actually dropping any RL carriers. At step 3330, AN 3002 sends TCA to AT 3001 indicating the number of FL and RL carriers assigned to AT 3001 and a mapping of FL-related overhead channels to the remaining RL carriers associated with AT 3001. Upon receiving TCA, at step 3340, AT 3001 performs the mapping of the FL-related overhead channels. To provide for smooth transmissions, at step 3350, AT 3001 simultaneously transmit the FL-related overhead channels on all assigned RL carriers for some (e.g., short) duration of time. Thereafter, AT 3001 drops all of the subset of previously-assigned RL carriers, as illustrated in step 3360.

In the event that the data limitation may initiate the trigger for dropping some RL carriers, AT 3001 may decide to drop only the RL carriers that do not carry the FL-related overhead channels. For example, AT 3001 may first indicate such in a request message to AN 3002, and refrain from dropping any RL carriers until getting a confirmation (e.g., TCA) from AN 3002, such as described above.

In an example, an AT may initially be assigned a single carrier on each of the FL and the RL. An AN may subsequently decide to change the previously-assigned RL carrier to a new (or different) one. The trigger for changing the RL carrier assignment by the AN may be due to a change in the AT's location, while the AN is using a location-based carrier allocation algorithm, for example.

Figure 34:
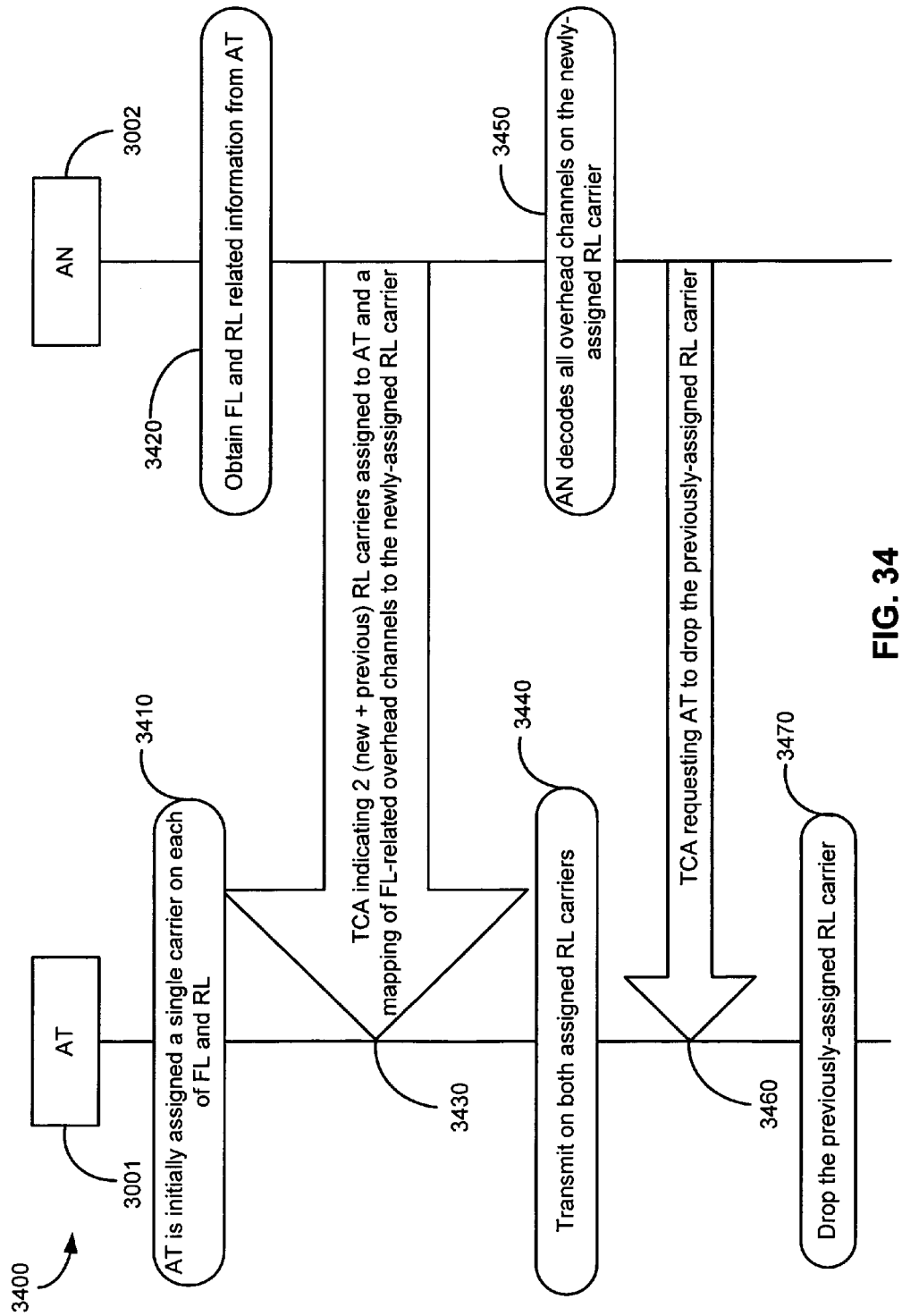
FIG. 34 shows a call flow diagram, illustrating an example of carrier allocation and management in a multi-carrier communication.

FIG. 34 shows a call flow diagram 3400, illustrating an example where an AN may initiate a new RL carrier assignment. At step 3410, AT 3001 is initially (or previously) assigned a single carrier on each of the FL and the RL. At step 3420, AN 3002 obtains FL and RL related information (e.g., transmit power availability at the AT 3001, the AT's location based on its average FL signal-to-interference-and-noise ratio (SINR), etc.), e.g., obtained from a message (e.g., a route update message) received from AT 3001. Based on such information, AN 3002 decides to change the AT's RL carrier (e.g., by executing a carrier management algorithm). To ensure a smooth transition, at step 3430, AN sends TCA to AT 3001 indicating two (new plus previous) RL carriers assigned to AT 3001 and a mapping of FL-related overhead channels to the newly-assigned RL carrier, e.g., for a short duration of time. After ensuring that AN 3002 is able to efficiently decode all FL-related overhead channels on the newly-assigned RL carrier, as illustrated in step 3450, AN 3002 sends TCA requesting AT 3001 to drop the previously-assigned RL carrier, as illustrated in step 3460. At step 3470, AT 3001 drops the previously-assigned RL carrier.

Examples described above provide some embodiments of carrier allocation and management in multi-carrier communication systems. There are other examples and implementations. In some embodiments, for example, the FL and RL carrier assignment (along with adding or dropping some carriers) may be unilaterally determined by the AN, e.g., in relation to the scheduling information provided by the AT (such as described above).

Figure 35:
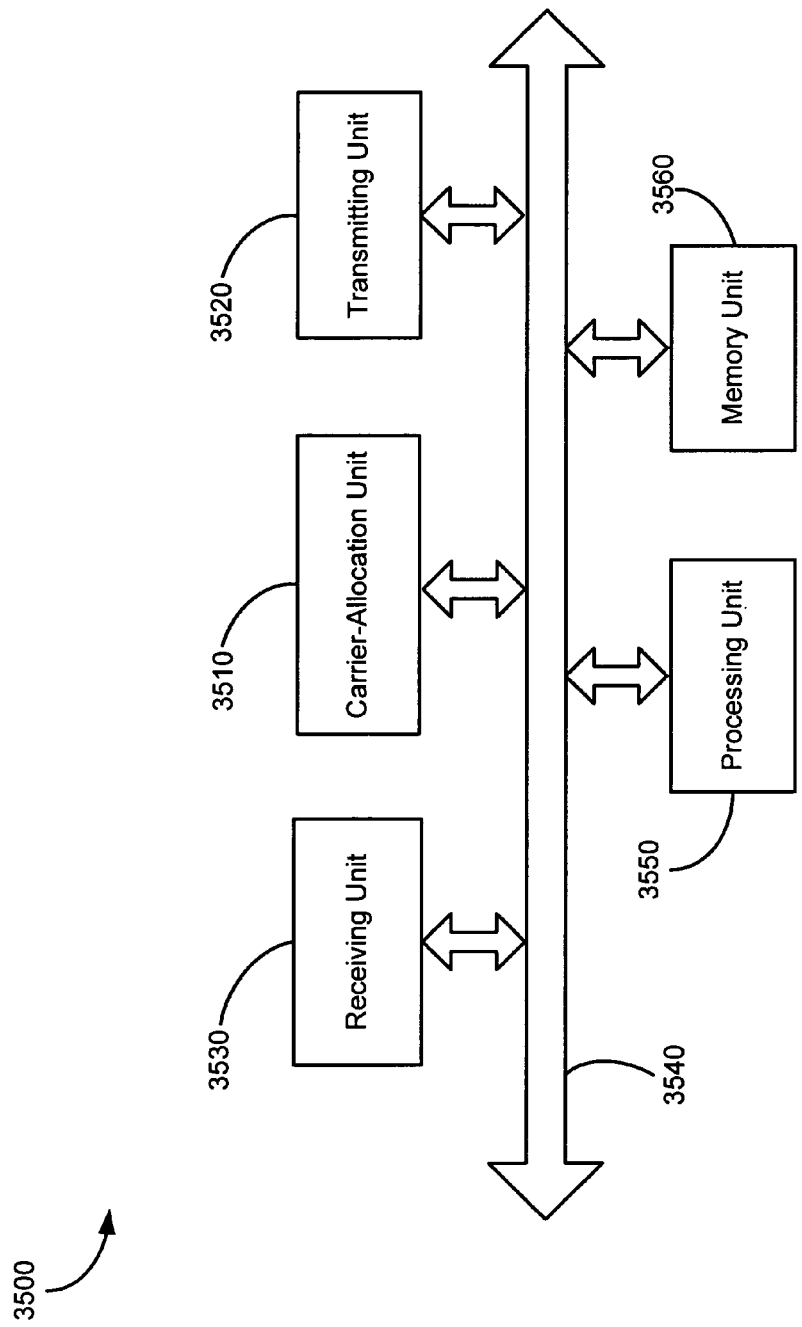
FIG. 35 illustrates a block diagram, which may be used to implement some disclosed embodiments.

FIG. 35 illustrates a block diagram of an apparatus 3500, which may be used to implement some embodiments disclosed herein. By way of example, apparatus 3500 may include a carrier-allocation unit 3510 configured to determine a number of carriers to be assigned to an AT (e.g., as a function of one or more carrier-allocation parameters, such as described above); and a transmitting unit 3520 configured to send an assignment message to the AT based on the determination of carrier-allocation unit 3510.

Apparatus 3500 may further include a receiving unit 3530 configured to receive scheduling information, access probes, and other information from the AT (such as described above). Carrier-allocation unit 3510 may be further configured to determine the number of FL and/or RL carriers to be assigned to the AT, e.g., in relation to the scheduling information, access probes, and/or other information received from the AT.

In apparatus 3500, carrier-allocation unit 3510, transmitting unit 3520, and receiving unit 3530 may be coupled to a communication bus 3540. A processing unit 3550 and a memory unit 3560 may also be coupled to communication bus 3540. Processing unit 3550 may be configured to control and/or coordinate the operations of various units. Memory unit 3560 may embody instructions to be executed by processing unit 3550.

Figure 36:
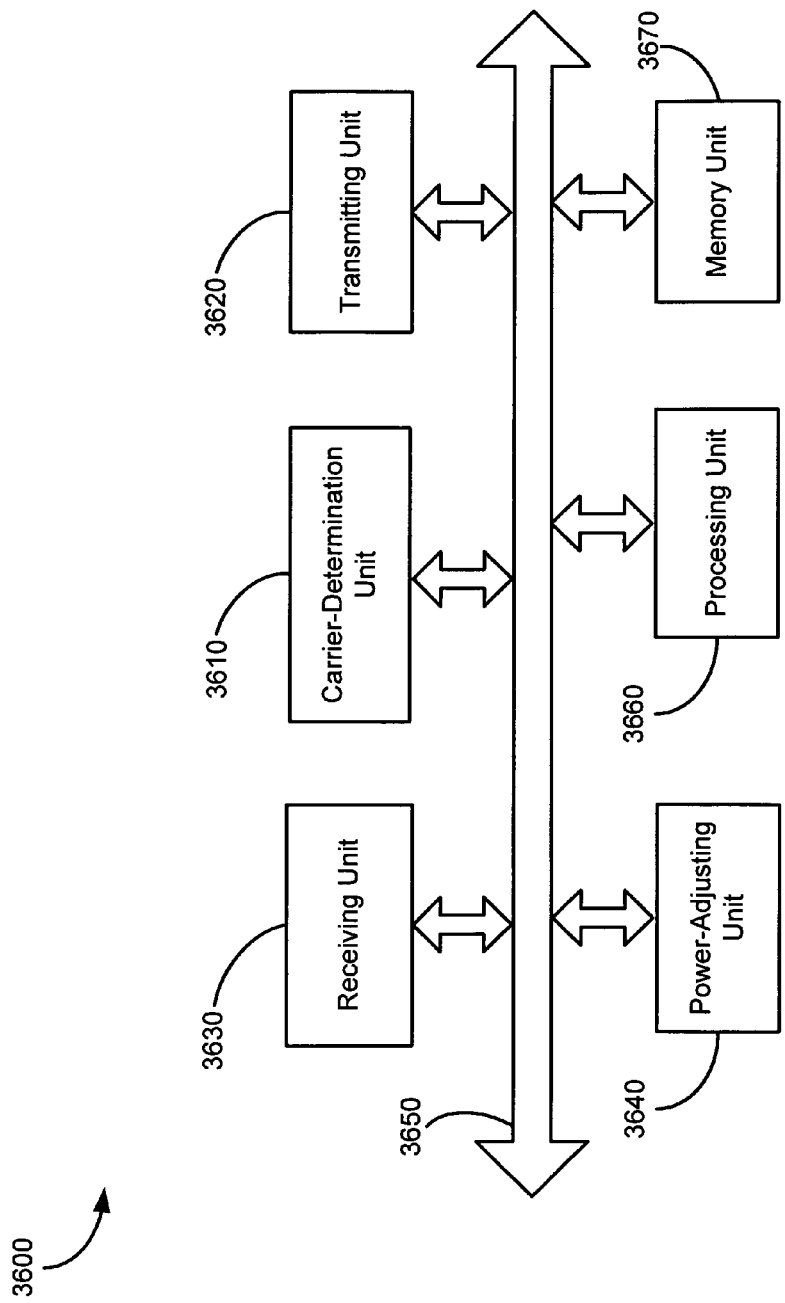
FIG. 36 illustrates a block diagram, which may be used to implement some disclosed embodiments.

FIG. 36 illustrates a block diagram of an apparatus 3600, which may be used to implement some embodiments disclosed herein. By way of example, apparatus 3600 may include a carrier-determination unit 3610 configured to determine a number of RL carriers required by an AT (e.g., as a function of one or more carrier-determination parameters, such as described above); and a transmitting unit 3620 configured to send a request message to an AN based on the determination of carrier-determination unit 3610.

Apparatus 3600 may further include a receiving unit 3630 configured to receive an assignment message from the AN, e.g., indicating the number of carriers assigned to the AT, along with TxInitAdjust for any newly-assigned RL carrier (such as described above). Apparatus 3600 may also include a power-adjusting unit 3640 configured to determine an initial transmit power for each newly-assigned RL carrier based on TxInitAdjust (and other transmit power adjustment). Transmitting unit 3620 may be further configured to transmit the scheduling information, access probes, and other information from the AT to the AN.

In apparatus 3600, carrier-determination unit 3610, transmitting unit 3620, receiving unit 3630, and power-adjusting unit 3640 may be coupled to a communication bus 3650. A processing unit 3660 and a memory unit 3670 may also be coupled to communication bus 3650. Processing unit 3660 may be configured to control and/or coordinate the operations of various units. Memory unit 3670 may embody instructions to be executed by processing unit 3660.

Various disclosed embodiments may be implemented in an AN, an AT, and other elements in multi-carrier communication systems.

Various units/modules in FIGS. 35-36 and other embodiments disclosed herein may be implemented in hardware, software, firmware, or a combination thereof. In a hardware implementation, various units may be implemented within one or more application specific integrated circuits (ASIC), digital signal processors (DSP), digital signal processing devices (DSPDs), field programmable gate arrays (FPGA), processors, microprocessors, controllers, microcontrollers, programmable logic devices (PLD), other electronic units, or any combination thereof. In a software implementation, various units may be implemented with modules (e.g., procedures, functions, and so on) that perform the functions described herein. The software codes may be stored in a memory unit and executed by a processor (or a processing unit). The memory unit may be implemented within the processor or external to the processor, in which case it can be communicatively coupled to the processor via various means known in the art.

Various disclosed embodiments may be implemented in a controller, an AT, and other means for providing broadcast/multicast services. Embodiments disclosed herein may be applicable to a data processing system, a wireless communication system, a unidirectional broadcast system, and any other system desiring efficient transmission of information.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), electrically programmable ROM (EPROM), electrically erasable programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in an AT. In the alternative, the processor and the storage medium may reside as discrete components in an AT.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for multi-carrier communications, comprising:
   transmitting to an access network an interference indicator indicating an amount of interference on a reverse link, wherein the amount of interference on the reverse link is determined based on at least one of a transmit pilot power or a reverse activity bit; and
   receiving an assignment message indicating a number of carriers assigned to the access terminal based on the amount of interference on the reverse link.

2. The method of claim 1, further comprising transmitting to the access network a number of reverse link carriers requested by the access terminal.

3. The method of claim 2, further comprising determining a number of reverse link carriers required by the access terminal as a function of at least one carrier-determination parameter.

4. The method of claim 3, wherein the at least one carrier-determination parameter includes at least one of a data requirement associated with the access terminal on the reverse link, a quality of service (QoS) requirement in connection with at least one flow associated with the access terminal on the reverse link, a transmit power available on the reverse link, an amount of forward-link-related overhead information to be transmitted on the reverse link, an amount of interference on the reverse link, a location of the access terminal, a sector loading on the reverse link, and a hardware constraint associated with the access terminal.

5. The method of claim 2, further comprising transmitting to the access network a number of additional reverse link carriers required by the access terminal.

6. The method of claim 5, wherein the assignment message further includes a number of newly-assigned reverse link carriers allocated to the access terminal and a reference value associated with an initial transmit power on each newly-assigned reverse link carrier.

7. The method of claim 6, further comprising determining the initial transmit power based on the reference value.

8. The method of claim 1, further comprising transmitting to the access network an indication of a subset of previously-assigned reverse link carriers dropped by the access terminal.

9. The method of claim 8, wherein the assignment message further includes a number of forward link carriers assigned to the access terminal and a mapping of forward-link-related overhead channels to one or more remaining reverse link carriers associated with the access terminal.

10. The method of claim 1, further comprising transmitting to the access network an indication of a subset of previously-assigned reverse link carriers the access terminal intends to drop.

11. The method of claim 10, wherein the assignment message further includes a number of forward link carriers and reverse link carriers assigned to the access terminal and a mapping of forward-link-related overhead channels to one or more remaining reverse link carriers associated with the access terminal.

12. The method of claim 11, further comprising transmitting the forward-link-related overhead channels on each of the reverse link carriers assigned to the access terminal for a duration of time.

13. The method of claim 1, further comprising transmitting to the access network at least one of:
a data queue length associated with the access terminal on the reverse link,
a quality of service (QoS) type associated with at least one flow associated with the access terminal on the reverse link,
a buffer status associated with the access terminal,
an amount of forward-link-related overhead information to be transmitted on the reverse link,
a sector loading on the reverse link,
a transmit power available on the reverse link, or
a hardware constraint associated with the access terminal.

14. The method of claim 1, further comprising:
transmitting to an access a location of an access terminal; and
receiving an assignment message indicating a number of carriers assigned to the access terminal based on the location of the access terminal.

15. The method of claim 1, wherein a location of the access terminal is determined by measuring a signal-to-interference-and-noise ratio on a forward link.

16. A method for multi-carrier communications, comprising:
determining a number of forward link carriers to be assigned to an access terminal as a function of an amount of interference on a reverse link, wherein the amount of interference on the reverse link is determined based on at least one of a transmit pilot power or a reverse activity bit; and
sending an assignment message to the access terminal based on the determination.

17. The method of claim 16, further comprising:
receiving scheduling information from the access terminal; and
determining a number of reverse link carriers associated with the access terminal in relation to the scheduling information.

18. The method of claim 17, wherein the scheduling information includes at least one of a data requirement associated with the access terminal on the reverse link, a quality of service (QoS) requirement in connection with at least one flow associated with the access terminal on the reverse link, a transmit power available on the reverse link, a buffer status associated with the access terminal, an amount of forward-link-related overhead information to be transmitted on the reverse link, an interference indicator indicating an amount of interference on the reverse link, a location of the access terminal, a sector loading on the reverse link, and a hardware constraint associated with the access terminal.

19. The method of claim 17, wherein the scheduling information includes the number of reverse link carriers requested by the access terminal.

20. The method of claim 19, wherein the scheduling information further includes a number of additional reverse link carriers required by the access terminal.

21. The method of claim 20, wherein the assignment message further includes a number of newly-assigned reverse link carriers allocated to the access terminal and a reference value associated with an initial transmit power on each newly-assigned reverse link carrier.

22. The method of claim 17, wherein the scheduling information indicates a subset of previously-assigned reverse link carriers dropped by the access terminal.

23. The method of claim 22, wherein the assignment message further includes the number of forward link carriers assigned to the access terminal and a mapping of forward-link-related overhead channels to one or more remaining reverse link carriers associated with the access terminal.

24. The method of claim 17, wherein the scheduling information indicates a subset of previously-assigned reverse link carriers the access terminal intends to drop.

25. The method of claim 24, wherein the assignment message further includes the number of forward link carriers and reverse link carriers assigned to the access terminal and a mapping of forward-link-related overhead channels to one or more remaining reverse link carriers associated with the access terminal.

26. The method of claim 16, further comprising determining if a new reverse link carrier is to be assigned to the access terminal, based in part on forward-link-related and reverse-link-related information obtained from the access terminal.

27. The method of claim 26, wherein the forward-link-related and reverse-link-related information is obtained from a route update message transmitted by the access terminal.

28. The method of claim 26, wherein the assignment message further includes a newly-assigned reverse link carrier and a previously-assigned reverse link carrier allocated to the access terminal, and a mapping of forward-link-related overhead channels to the newly-assigned reverse link carrier.

29. The method of claim 28, further comprising decoding the forward-link-related overhead channels transmitted on the newly-assigned reverse link carrier.

30. The method of claim 16, further comprising receiving a plurality of access probes on a reverse link carrier from the access terminal.

31. The method of claim 30, further comprising determining a number of reverse link carriers to be assigned to the access terminal, in response to the plurality of access probes.

32. The method of claim 31, wherein the assignment message further includes the number of forward link carriers and reverse link carriers assigned to the access terminal.

33. The method of claim 32, wherein the assignment message further includes a reference value associated with an initial transmit power on a newly-assigned reverse link carrier.

34. The method of claim 16: wherein:
the determining of the number of forward-link carriers to be assigned to the access terminal is further based on a location of the access terminal; and
the sending of the assignment message is further based on the location of the access terminal.

35. A method for multi-carrier communications, comprising:
receiving a plurality of access probes transmitted on a first reverse link carrier from an access terminal;
assigning a second reverse link carrier to the access terminal; and sending to the access terminal a reference value specifying an initial transmit power on the second reverse link carrier.

36. The method of claim 35, further comprising determining a number of forward link carriers to be assigned to the access terminal.

37. A method for multi-carrier communications, comprising:
transmitting a plurality of access probes on a first reverse link carrier to an access network; and
receiving a message from the access network, indicating a second reverse link carrier assigned to an access terminal and a reference value specifying an initial transmit power on a second reverse link carrier.

38. The method of claim 37, further comprising determining the initial transmit power on the second reverse link carrier based on the reference value.

39. An apparatus adapted for multi-carrier communications, comprising:
means for transmitting to an access network an interference indicator indicating an amount of interference on a reverse link, wherein the amount of interference on the reverse link is determined based on at least one of a transmit pilot power or a reverse activity bit; and
means for receiving an assignment message indicating a number of carriers assigned to the access terminal based on the amount of interference on the reverse link.

40. The apparatus of claim 39, further comprising means for transmitting to the access network a number of reverse link carriers requested by the access terminal.

41. The apparatus of claim 40, further comprising means for determining a number of reverse link carriers required by the access terminal as a function of at least one carrier-determination parameter.

42. The apparatus of claim 41, wherein the at least one carrier-determination parameter includes at least one of a data requirement associated with the access terminal on the reverse link, a quality of service (QoS) requirement in connection with at least one flow associated with the access terminal on the reverse link, a transmit power available on the reverse link, an amount of forward-link-related overhead information to be transmitted on the reverse link, an amount of interference on the reverse link, a location of the access terminal, a sector loading on the reverse link, and a hardware constraint associated with the access terminal.

43. The apparatus of claim 40, further comprising means for transmitting to the access network a number of additional reverse link carriers required by the access terminal.

44. The apparatus of claim 43, wherein the assignment message further includes a number of newly-assigned reverse link carriers allocated to the access terminal and a reference value associated with an initial transmit power on each newly-assigned reverse link carrier.

45. The apparatus of claim 44, further comprising means for determining the initial transmit power based on the reference value.

46. The apparatus of claim 39, further comprising means for transmitting to the access network an indication of a subset of previously-assigned reverse link carriers dropped by the access terminal.

47. The apparatus of claim 46, wherein the assignment message further includes a number of forward link carriers assigned to the access terminal and a mapping of forward-link-related overhead channels to one or more remaining reverse link carriers associated with the access terminal.

48. The apparatus of claim 39, further comprising means for transmitting to the access network an indication of a subset of previously-assigned reverse link carriers the access terminal intends to drop.

49. The apparatus of claim 48, wherein the assignment message further includes a number of forward link carriers and reverse link carriers assigned to the access terminal and a mapping of forward-link-related overhead channels to one or more remaining reverse link carriers associated with the access terminal.

50. The apparatus of claim 49, further comprising means for transmitting the forward-link-related overhead channels on each of the reverse link carriers assigned to the access terminal for a duration of time.

51. The apparatus of claim 39, further comprising:
means for transmitting to an access a location of an access terminal; and
means for receiving an assignment message indicating a number of carriers assigned to the access terminal based on the location of the access terminal.

52. An apparatus adapted for multi-carrier communications, comprising:
means for determining a number of forward link carriers to be assigned to an access terminal as a function of an amount of interference on a reverse link, wherein the amount of interference on the reverse link is determined based on at least one of a transmit pilot power or a reverse activity bit;
and
means for sending an assignment message to the access terminal based on the determination.

53. The apparatus of claim 52, further comprising:
means for receiving scheduling information from the access terminal; and
means for determining a number of reverse link carriers associated with the access terminal in relation to the scheduling information.

54. The apparatus of claim 53, wherein the scheduling information includes at least one of a data requirement associated with the access terminal on the reverse link, a quality of service (QoS) requirement in connection with at least one flow associated with the access terminal on the reverse link, a transmit power available on the reverse link, a buffer status associated with the access terminal, an amount of forward-link-related overhead information to be transmitted on the reverse link, interference indicator indicating an amount of interference on the reverse link, a location of the access terminal, a sector loading on the reverse link, and a hardware constraint associated with the access terminal.

55. The apparatus of claim 53, wherein the scheduling information includes the number of reverse link carriers requested by the access terminal.

56. The apparatus of claim 55, wherein the scheduling information further includes a number of additional reverse link carriers required by the access terminal.

57. The apparatus of claim 56, wherein the assignment message further includes a number of newly-assigned reverse link carriers allocated to the access terminal and a reference value associated with an initial transmit power on each newly-assigned reverse link carrier.

58. The apparatus of claim 53, wherein the scheduling information indicates a subset of previously-assigned reverse link carriers dropped by the access terminal.

59. The apparatus of claim 58, wherein the assignment message further includes the number of forward link carriers assigned to the access terminal and a mapping of forwardlink-related overhead channels to one or more remaining reverse link carriers associated with the access terminal.

60. The apparatus of claim 53, wherein the scheduling information indicates a subset of previously-assigned reverse link carriers the access terminal intends to drop.

61. The apparatus of claim 60, wherein the assignment message further includes the number of forward link carriers and reverse link carriers assigned to the access terminal and a mapping of forward-link-related overhead channels to one or more remaining reverse link carriers associated with the access terminal.

62. The apparatus of claim 52, further comprising means for determining if a new reverse link carrier is to be assigned to the access terminal, based in part on forward-link-related and reverse-link-related information obtained from the access terminal.

63. The apparatus of claim 62, wherein the assignment message further includes a newly-assigned reverse link carrier and a previously-assigned reverse link carrier allocated to the access terminal, and a mapping of forward-link-related overhead channels to the newly-assigned reverse link carrier.

64. The apparatus of claim 52, further means for comprising receiving a plurality of access probes on a reverse link carrier from the access terminal.

65. The apparatus of claim 64, wherein the assignment message further includes a number of forward link carriers and reverse link carriers assigned to the access terminal, in response to the plurality of access probes.

66. The apparatus of claim 65, wherein the assignment message further includes a reference value associated with an initial transmit power on a newly-assigned reverse link carrier.

67. The apparatus of claim 52, wherein:
means for determining of the number of forward-link carriers to be assigned to the access terminal further comprises means for determining the number of forward-link carriers based further on a location of the access terminal; and
means for sending of the assignment message further comprises means for sending the assignment message based further on the location of the access terminal.

68. An apparatus adapted for multi-carrier communications, comprising:
means for receiving a plurality of access probes transmitted on a first reverse link carrier from an access terminal;
means for assigning a second reverse link carrier to the access terminal; and
means for sending to the access terminal a reference value specifying an initial transmit power on the second reverse link carrier.

69. An apparatus adapted for multi-carrier communications, comprising:
means for transmitting a plurality of access probes on a first reverse link carrier to an access network; and
means for receiving a message from the access network, indicating a second reverse link carrier assigned to an access terminal and a reference value specifying an initial transmit power on a second reverse link carrier.

70. The apparatus of claim 69, further comprising means for determining the initial transmit power on the second reverse link carrier based on the reference value.

71. A non-transitory computer-readable storage medium comprising code, which, when executed by a processor, cause the processor to perform operations for multi-carrier communications, the non-transitory computer-readable storage medium comprising:
code for transmitting to an access network an interference indicator indicating an amount of interference on a reverse link, wherein the amount of interference on the reverse link is determined based on at least one of a transmit pilot power or a reverse activity bit; and
code for receiving an assignment message indicating a number of carriers assigned to the access terminal based on the amount of interference on the reverse link.

72. The non-transitory computer-readable storage medium of claim 71, further comprising:
code for transmitting to an access a location of an access terminal; and
code for receiving an assignment message indicating a number of carriers assigned to the access terminal based on the location of the access terminal.

73. A non-transitory computer-readable storage medium comprising code, which, when executed by a processor, cause the processor to perform operations for multi-carrier communications, the non-transitory computer-readable storage medium comprising:
code for transmitting a plurality of access probes on a first reverse link carrier to an access network; and
code for receiving a message from the access network, indicating a second reverse link carrier assigned to an access terminal and a reference value specifying an initial transmit power on a second reverse link carrier.

74. A non-transitory computer-readable storage medium comprising code, which, when executed by a processor, causes the processor to perform operations for multi-carrier communications, the non-transitory computer-readable storage medium comprising:
code for determining a number of forward link carriers to be assigned to an access terminal as a function of
an amount of interference on a reverse link, wherein the amount of interference on the reverse link is determined based on at least one of a transmit pilot power or a reverse activity bit;
and
code for sending an assignment message to the access terminal based on the determination.

75. The non-transitory computer-readable storage medium of claim 74, wherein:
code for determining of the number of forward-link carriers to be assigned to the access terminal further comprises code for determining the number of forward-link carriers based further on a location of the access terminal; and
code for sending of the assignment message further comprises code for sending the assignment message based further on the location of the access terminal.

76. A non-transitory computer-readable storage medium comprising code, which, when executed by a processor, causes the processor to perform operations for multi-carrier communications, the non-transitory computer-readable storage medium comprising:
code for receiving a plurality of access probes transmitted on a first reverse link carrier from an access terminal;
code for assigning a second reverse link carrier to the access terminal; and
code for sending to the access terminal a reference value specifying an initial transmit power on the second reverse link carrier.

77. An apparatus adapted for multi-carrier communications, comprising:
a transceiver system;
a memory system; and
a processing system coupled to the transceiver system and the memory system, wherein one or more of the transceiver system, the memory system, and the processing system are configured to:
transmit to an access network an interference indicator indicating an amount of interference on a reverse link, wherein the amount of interference on the reverse link is determined based on at least one of a transmit pilot power or a reverse activity bit; and
receive an assignment message indicating a number of carriers assigned to the access terminal based on the amount of interference on the reverse link.

78. The apparatus of claim 77, wherein one or more of the transceiver system, the memory system, and the processing system are further configured to:
transmit to an access a location of an access terminal; and
receive an assignment message indicating a number of carriers assigned to the access terminal based on the location of the access terminal.

79. An apparatus adapted for multi-carrier communications, comprising:
a transceiver system;
a memory system; and
a processing system coupled to the transceiver system and the memory system, wherein one or more of the transceiver system, the memory system, and the processing system are configured to:
determine a number of forward link carriers to be assigned to an access terminal as a function of an interference indicator indicating an amount of interference on a reverse link, wherein the amount of interference on the reverse link is determined based on at least one of a transmit pilot power or a reverse activity bit
send an assignment message to the access terminal based on the determination.

80. The apparatus of claim 79, wherein
to determine the number of forward-link carriers to be assigned to the access terminal, one or more of the transceiver system, the memory system, and the processing system are further configured to determine the number of forward-link carriers based further on a location of the access terminal; and
to send the assignment message, one or more of the transceiver system, the memory system, and the processing system are further configured to send the assignment message based further on the location of the access terminal.

81. An apparatus adapted for multi-carrier communications, comprising:
a transceiver system;
a memory system; and
a processing system coupled to the transceiver system and the memory system, wherein one or more of the transceiver system, the memory system, and the processing system are configured to:
receive a plurality of access probes transmitted on a first reverse link carrier from an access terminal;
assign a second reverse link carrier to the access terminal; and
send to the access terminal a reference value specifying an initial transmit power on the second reverse link carrier.

82. An apparatus adapted for multi-carrier communications, comprising:
a transceiver system;
a memory system; and
a processing system coupled to the transceiver system and the memory system, wherein one or more of the transceiver system, the memory system, and the processing system are configured to
transmit a plurality of access probes on a first reverse link carrier to an access network; and
receive a message from the access network, indicating a second reverse link carrier assigned to an access terminal and a reference value specifying an initial transmit power on the second reverse link carrier.

83. A method, comprising:
receiving a transmission from an access terminal, wherein the transmission includes one or more indicators, the one or more indicators including one or more of:
a transmission pilot power indicator;
a forward link pilot strength indicator; or
a power amplifier headroom indicator; and
assigning one or more carriers to the access terminal based on the one or more indicators.

84. The method of claim 83, further comprising:
transmitting a carrier grant message to the access terminal, wherein the carrier grant message indicates the assigned one or more carriers.

85. The method of claim 83, wherein the transmission received from the access terminal is one of a plurality of periodic transmissions, each transmission of the plurality of periodic transmissions including the one or more indicators.

86. An apparatus, comprising:
one or more transceivers configured to receive a transmission from an access terminal, wherein the transmission includes one or more indicators, the one or more indicators including one or more of:
a transmission pilot power indicator;
a forward link pilot strength indicator; or
a power amplifier headroom indicator; and
a processor configured to assign one or more carriers to the access terminal based on the one or more indicators; and
memory coupled to the processor and configured to store data, instructions, or a combination thereof.

87. The apparatus of claim 86, wherein the one or more transceivers are further configured to transmit a carrier grant message to the access terminal, wherein the carrier grant message indicates the assigned one or more carriers.

88. The apparatus of claim 86, wherein the one or more transceivers are further configured to receive a plurality of periodic transmissions, each transmission of the plurality of periodic transmissions including the one or more indicators.

89. An apparatus, comprising:
means for receiving a transmission from an access terminal, wherein the transmission includes one or more indicators, the one or more indicators including one or more of:
a transmission pilot power indicator;
a forward link pilot strength indicator; or
a power amplifier headroom indicator; and
means for assigning one or more carriers to the access terminal based on the one or more indicators.

90. The apparatus of claim 89, further comprising:
means for transmitting a carrier grant message to the access terminal, wherein the carrier grant message indicates the assigned one or more carriers.

91. The apparatus of claim 89, wherein the means for receiving a transmission comprises means for receiving a plurality of periodic transmissions, each transmission of the plurality of periodic transmissions including the one or more indicators.

92. A non-transitory computer-readable medium comprising at least one instruction for causing a processor to perform operations, comprising:
- code for receiving a transmission from an access terminal, wherein the transmission includes one or more indicators, the one or more indicators including one or more of:
  - a transmission pilot power indicator;
  - a forward link pilot strength indicator; or
  - a power amplifier headroom indicator; and
- code for assigning one or more carriers to the access terminal based on the one or more indicators.

93. The non-transitory computer-readable medium of claim 92, further comprising:
- code for transmitting a carrier grant message to the access terminal, wherein the carrier grant message indicates the assigned one or more carriers.

94. The non-transitory computer-readable medium of claim 92, wherein the code for receiving a transmission comprises code for receiving a plurality of periodic transmissions, each transmission of the plurality of periodic transmissions including the one or more indicators.

\* \* \* \* \*